(12) United States Patent
Khoyilar et al.

(10) Patent No.: US 12,001,419 B1
(45) Date of Patent: Jun. 4, 2024

(54) DATABASE SYSTEM FOR TRIGGERING EVENT NOTIFICATIONS BASED ON UPDATES TO DATABASE RECORDS IN AN ELECTRONIC FILE

(71) Applicant: AnyQpon Inc., Irvine, CA (US)

(72) Inventors: Michael Khoyilar, Newport Coast, CA (US); Piotr Szreder, San Diego, CA (US)

(73) Assignee: AnyQpon Inc., Irvine, CA (US)

( * ) Notice: Subject to any disclaimer, the term of this patent is extended or adjusted under 35 U.S.C. 154(b) by 0 days.

(21) Appl. No.: 18/178,399

(22) Filed: Mar. 3, 2023

Related U.S. Application Data

(63) Continuation-in-part of application No. 17/814,361, filed on Jul. 22, 2022, now abandoned, which is a
(Continued)

(51) Int. Cl.
*G06F 16/23* (2019.01)
*G06F 9/445* (2018.01)
(Continued)

(52) U.S. Cl.
CPC .......... *G06F 16/2358* (2019.01); *G06F 9/445* (2013.01); *G06F 9/542* (2013.01);
(Continued)

(58) Field of Classification Search
CPC ...... G06F 16/2358; G06F 9/445; G06F 9/542; G06F 16/219; G06F 16/2365; G06F 16/24565; G06F 16/9537; G06F 16/9535; G06Q 10/02; G06Q 10/10; G06Q 30/02; G06Q 30/06; G06Q 50/01; H04L 51/216; H04L 51/224; H04L 51/52; H04L 67/1046; H04L 67/52; H04W 4/02
(Continued)

(56) References Cited

U.S. PATENT DOCUMENTS 5,642,485 A   6/1997   Deaton et al.
5,644,723 A   7/1997   Deaton et al.
(Continued)

OTHER PUBLICATIONS

"U.S. Appl. No. 16/244,463, Advisory Action dated Feb. 6, 2020", 5 pgs.
(Continued)

*Primary Examiner* — Michael Pham
(74) *Attorney, Agent, or Firm* — Schwegman Lundberg & Woessner, P.A.

(57) ABSTRACT

A database processing system is disclosed for accessing databases and updated data items and triggering event notifications. The data processing system may comprise a records database including a plurality of data records, and a triggers database including a plurality of trigger indicators. The database system may further include a hardware processor that can execute computer-executable instructions in order to: receive an update on a data record, identify a type of change corresponding to change in the data record, cause an update to the records database based on information included with the updated data record, identify a trigger corresponding to the type of update to the data record, and generate an event notification including information included in the update.

27 Claims, 53 Drawing Sheets

Related U.S. Application Data continuation of application No. 17/504,397, filed on Oct. 18, 2021, now Pat. No. 11,397,719, which is a continuation-in-part of application No. 17/249,639, filed on Mar. 8, 2021, now abandoned, which is a continuation of application No. 16/867,415, filed on May 5, 2020, now Pat. No. 10,942,913, which is a continuation-in-part of application No. 16/244,463, filed on Jan. 10, 2019, now Pat. No. 10,679,239.

(60) Provisional application No. 62/616,292, filed on Jan. 11, 2018.

(51) Int. Cl.
*G06F 9/54* (2006.01)
*G06F 16/21* (2019.01)
*G06F 16/2455* (2019.01)
*G06F 16/9537* (2019.01)

(52) U.S. Cl.
CPC ........ *G06F 16/219* (2019.01); *G06F 16/2365* (2019.01); *G06F 16/24565* (2019.01); *G06F 16/9537* (2019.01)

(58) Field of Classification Search
USPC .......................................................... 707/702
See application file for complete search history.

(56) References Cited

U.S. PATENT DOCUMENTS

| | | | |
|---|---|---|---|
| 5,649,114 A | 7/1997 | Deaton et al. | |
| 5,687,322 A | 11/1997 | Deaton et al. | |
| 6,334,108 B1 | 12/2001 | Deaton et al. | |
| 6,377,935 B1 | 4/2002 | Deaton et al. | |
| 6,415,262 B1 | 7/2002 | Walker et al. | |
| 6,424,949 B1 | 7/2002 | Deaton et al. | |
| 6,516,302 B1 | 2/2003 | Deaton et al. | |
| 6,609,104 B1 | 8/2003 | Deaton et al. | |
| 6,611,811 B1 | 8/2003 | Deaton et al. | |
| 6,684,195 B1 | 1/2004 | Deaton et al. | |
| 6,687,679 B1 | 2/2004 | Van et al. | |
| 7,194,423 B2 | 3/2007 | Walker et al. | |
| 7,240,021 B1 | 7/2007 | Walker et al. | |
| 7,406,438 B2 | 7/2008 | Walker et al. | |
| 7,593,862 B2 | 9/2009 | Mankoff | |
| 7,870,021 B2 | 1/2011 | Mankoff | |
| 8,036,934 B2 | 10/2011 | Mankoff | |
| 8,140,386 B2 | 3/2012 | Mankoff | |
| 8,140,403 B2 | 3/2012 | Ramalingam et al. | |
| 8,244,580 B2 | 8/2012 | Mankoff | |
| 8,467,807 B1 | 6/2013 | Dalit et al. | |
| RE45,006 E | 7/2014 | Deaton et al. | |
| 8,825,522 B2 | 9/2014 | Mankoff | |
| 9,258,296 B2 | 2/2016 | Juthani | |
| 9,600,674 B2 | 3/2017 | Coffing et al. | |
| 9,690,820 B1 | 6/2017 | Girulat, Jr. | |
| 10,339,548 B1* | 7/2019 | Kumar .................. | G06Q 20/20 |
| 10,528,545 B1 | 1/2020 | Girulat, Jr. | |
| 10,679,239 B2 | 6/2020 | Khoyilar et al. | |
| 10,942,913 B1 | 3/2021 | Khoyilar et al. | |
| 11,397,719 B1 | 7/2022 | Khoyilar et al. | |
| 2001/0047308 A1* | 11/2001 | Kaminsky .............. | G06Q 30/08 |
| | | | 705/26.1 |
| 2003/0004802 A1 | 1/2003 | Callegari | |
| 2003/0154125 A1* | 8/2003 | Mittal ................. | G06Q 30/0222 |
| | | | 705/14.23 |
| 2005/0071230 A1 | 3/2005 | Mankoff | |
| 2005/0075932 A1 | 4/2005 | Mankoff | |
| 2006/0223505 A1 | 10/2006 | Starr et al. | |
| 2007/0130016 A1 | 6/2007 | Walker et al. | |
| 2007/0130090 A1* | 6/2007 | Staib .................. | G06Q 30/0222 |
| | | | 705/14.69 |
| 2008/0033816 A1 | 2/2008 | Miller et al. | |
| 2008/0065484 A1 | 3/2008 | Miller et al. | |
| 2008/0262920 A1 | 10/2008 | O'Neill et al. | |
| 2008/0268868 A1 | 10/2008 | Maitland | |
| 2009/0018919 A1 | 1/2009 | Walker et al. | |
| 2009/0117883 A1 | 5/2009 | Coffing et al. | |
| 2010/0042476 A1 | 2/2010 | Gauri | |
| 2011/0028160 A1 | 2/2011 | Roeding et al. | |
| 2011/0029362 A1 | 2/2011 | Roeding et al. | |
| 2011/0029364 A1 | 2/2011 | Roeding et al. | |
| 2011/0153407 A1 | 6/2011 | Walker et al. | |
| 2011/0231238 A1 | 9/2011 | Khan et al. | |
| 2012/0109752 A1 | 5/2012 | Strutton et al. | |
| 2012/0185355 A1 | 7/2012 | Kilroy | |
| 2012/0203634 A1* | 8/2012 | Bennett .............. | G06Q 30/0244 |
| | | | 705/14.54 |
| 2013/0090957 A1 | 4/2013 | Popkey et al. | |
| 2013/0268357 A1 | 10/2013 | Heath | |
| 2013/0268364 A1 | 10/2013 | Gildfind | |
| 2013/0268365 A1 | 10/2013 | Gildfind | |
| 2013/0297416 A1 | 11/2013 | Dipaola et al. | |
| 2014/0108260 A1 | 4/2014 | Poole et al. | |
| 2014/0156368 A1 | 6/2014 | Wen et al. | |
| 2014/0164120 A1 | 6/2014 | Payne et al. | |
| 2014/0172535 A1 | 6/2014 | Matthews | |
| 2014/0229323 A1 | 8/2014 | Or et al. | |
| 2014/0279015 A1 | 9/2014 | Root et al. | |
| 2014/0297406 A1 | 10/2014 | Manning et al. | |
| 2014/0324566 A1 | 10/2014 | Mankoff | |
| 2015/0019338 A1 | 1/2015 | Sotomayor | |
| 2015/0100398 A1 | 4/2015 | Narayanaswami et al. | |
| 2015/0193784 A1 | 7/2015 | Gao et al. | |
| 2015/0193791 A1 | 7/2015 | Gao et al. | |
| 2015/0254704 A1 | 9/2015 | Kothe et al. | |
| 2015/0269607 A1 | 9/2015 | Steube et al. | |
| 2015/0294344 A1 | 10/2015 | Popomaronis et al. | |
| 2015/0310475 A1 | 10/2015 | Feldman | |
| 2015/0317654 A1 | 11/2015 | Unser et al. | |
| 2015/0348219 A1 | 12/2015 | Unser et al. | |
| 2016/0012465 A1 | 1/2016 | Sharp | |
| 2016/0066140 A1 | 3/2016 | Gnanasekaran | |
| 2016/0189174 A1 | 6/2016 | Heath | |
| 2016/0269485 A1 | 9/2016 | Briant | |
| 2016/0321635 A1 | 11/2016 | Gao et al. | |
| 2017/0018013 A1* | 1/2017 | Faust ................. | G06Q 30/0283 |
| 2017/0032288 A1 | 2/2017 | Popkey et al. | |
| 2017/0103408 A1 | 4/2017 | Mazuera | |
| 2017/0169463 A1 | 6/2017 | Couvillon et al. | |
| 2018/0069937 A1 | 3/2018 | Kolleri | |
| 2019/0213626 A1 | 7/2019 | Khoyilar et al. | |
| 2020/0167699 A1 | 5/2020 | Cohen | |

OTHER PUBLICATIONS

"U.S. Appl. No. 16/244,463, Applicant's Summary of Examiner Interview filed Jan. 31, 2020", 1 pg.
"U.S. Appl. No. 16/244,463, Examiner Interview Summary dated Dec. 4, 2019", 3 pgs.
"U.S. Appl. No. 16/244,463, Final Office Action dated Nov. 1, 2019", 23 pgs.
"U.S. Appl. No. 16/244,463, Non Final Office Action dated Apr. 12, 2019", 23 pgs.
"U.S. Appl. No. 16/244,463, Notice of Allowance dated Apr. 16, 2020", 12 pgs.
"U.S. Appl. No. 16/244,463, Response filed Jan. 27, 2020 to Final Office Action dated Nov. 1, 2019", 14 pgs.
"U.S. Appl. No. 16/244,463, Response filed Jul. 12, 2019 to Non Final Office Action dated Apr. 12, 2019", 13 pgs.
"U.S. Appl. No. 16/867,415, Examiner Interview Summary dated Sep. 29, 2020", 3 pgs.
"U.S. Appl. No. 16/867,415, Non Final Office Action dated Jun. 11, 2020", 14 pgs.
"U.S. Appl. No. 16/867,415, Non Final Office Action dated Aug. 13, 2020", 32 pgs.
"U.S. Appl. No. 16/867,415, Notice of Allowance dated Nov. 19, 2020", 15 pgs.
"U.S. Appl. No. 16/867,415, Preliminary Amendment filed Jun. 8, 2020", 7 pgs.

(56) References Cited

OTHER PUBLICATIONS

"U.S. Appl. No. 16/867,415, Response filed Oct. 20, 2020 to Non Final Office Action dated Aug. 13, 2020", 12 pgs.
"U.S. Appl. No. 17/504,397, Examiner Interview Summary dated Mar. 7, 2022", 2 pgs.
"U.S. Appl. No. 17/504,397, Non Final Office Action dated Dec. 9, 2021", 9 pgs.
"U.S. Appl. No. 17/504,397, Notice of Allowance dated Apr. 11, 2022", 12 pgs.
"U.S. Appl. No. 17/504,397, Preliminary Amendment filed Dec. 1, 2021", 7 pgs.
"U.S. Appl. No. 17/504,397, Response filed Mar. 8, 2022 to Non Final Office Action dated Dec. 9, 2021", 10 pgs.
Hui, Sam, "Personalization and context awareness in social local search: State of the art and future research challenges", Journal of American Marketing Association, (2013).
Hui, Sam, et al., "The Effect of In-Store Travel Distance on Unplanned Spending: Applications to Mobile Promotion Strategies", Journal of American Marketing Association, (2013).

* cited by examiner

DATABASE SYSTEM FOR TRIGGERING EVENT NOTIFICATIONS BASED ON UPDATES TO DATABASE RECORDS IN AN ELECTRONIC FILE

CROSS-REFERENCE TO RELATED APPLICATIONS

The present application continuation-in-part of U.S. patent application Ser. No. 17/814,361, filed Jul. 22, 2022, which is a continuation of U.S. patent application Ser. No. 17/504,397, filed Oct. 18, 2021, which is a continuation-in-part of U.S. patent application Ser. No. 17/249,639, filed Mar. 8, 2021, which is a continuation of U.S. patent application Ser. No. 16/867,415, filed May 5, 2020, which is a continuation-in-part of U.S. patent application Ser. No. 16/244,463, filed Jan. 10, 2019, which claims benefit to U.S. Provisional Patent App. No. 62/616,292, filed Jan. 11, 2018, the entirety of each of which are incorporated herein by reference.

TECHNICAL FIELD

The present disclosure relates to data processing, including database and file management, as well as a database system for accessing one or more databases or other data structures, and triggering event notifications based on updates to database records.

Electronic databases provide for storage and retrieval of digital data records. Data records in such databases may be electronically updated.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to a database system (also herein referred to as "the system") for triggering event notifications (also referred to herein as "notifications" or "alerts") based on updates to database records. The system may advantageously provide notifications to interested users of certain types of changes to certain database records. For example, a database system may determine that the user is interested in a particular database record, and more specifically to a particular type of change to the particular database record. The system advantageously, upon a change to the particular database record, may determine that the user is interested in changes to the particular database record, and may thus generate a log of the change. The system may then determine that the change that was logged is of the particular type, and may thus generate and send a notification to the user. Further, advantageously, the notification may include information about the change that may be quite useful to the user.

In some embodiments, the system may store a history of previous notifications. Thus, for example, the system may advantageously avoid sending out duplicate notifications, and/or may prioritize particular notifications. Further, the system may determine that notifications are to be generated based on historical data.

In some embodiments, the system may receive, from various users, indications of triggers that may be implemented by the system. A trigger may be associated with a particular user, such that notifications resulting from that trigger are sent to the user. In some embodiments, the notification may cause activation of a device or software application, enabling rapid notification and/or automation activities.

In some embodiments, the system may process, e.g., hundreds of millions (or more) of data record updates each day and may determine and generate millions (or more) of triggers and event notifications each day. Accordingly, in various embodiments, large amounts of data are automatically and dynamically processed in response to user inputs.

Various embodiments of the present disclosure provide improvements to various technologies and technological fields. For example, existing database systems may lack notifications. The present disclosure describes improvements to, and useful applications of, database systems. For example, the database system disclosed here, according to various embodiments, efficiently monitors a database for triggering events, and dynamically generates notifications in response to those triggering events. Additionally, various embodiments of the present disclosure are inextricably tied to computer technology. In particular, various systems and methods discussed herein provide monitoring of electronic databases, processing of large volumes of data items, generation and transmission of electronic notifications, and the like. Such features and others are intimately tied to, and enabled by, computer technology, and would not exist except for computer technology. Further, the implementation of the various embodiments of the present disclosure via computer technology enables many of the advantages described herein, including more efficient processing of various types of electronic data.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings.

DETAILED DESCRIPTION

Overview

Figure 1A:
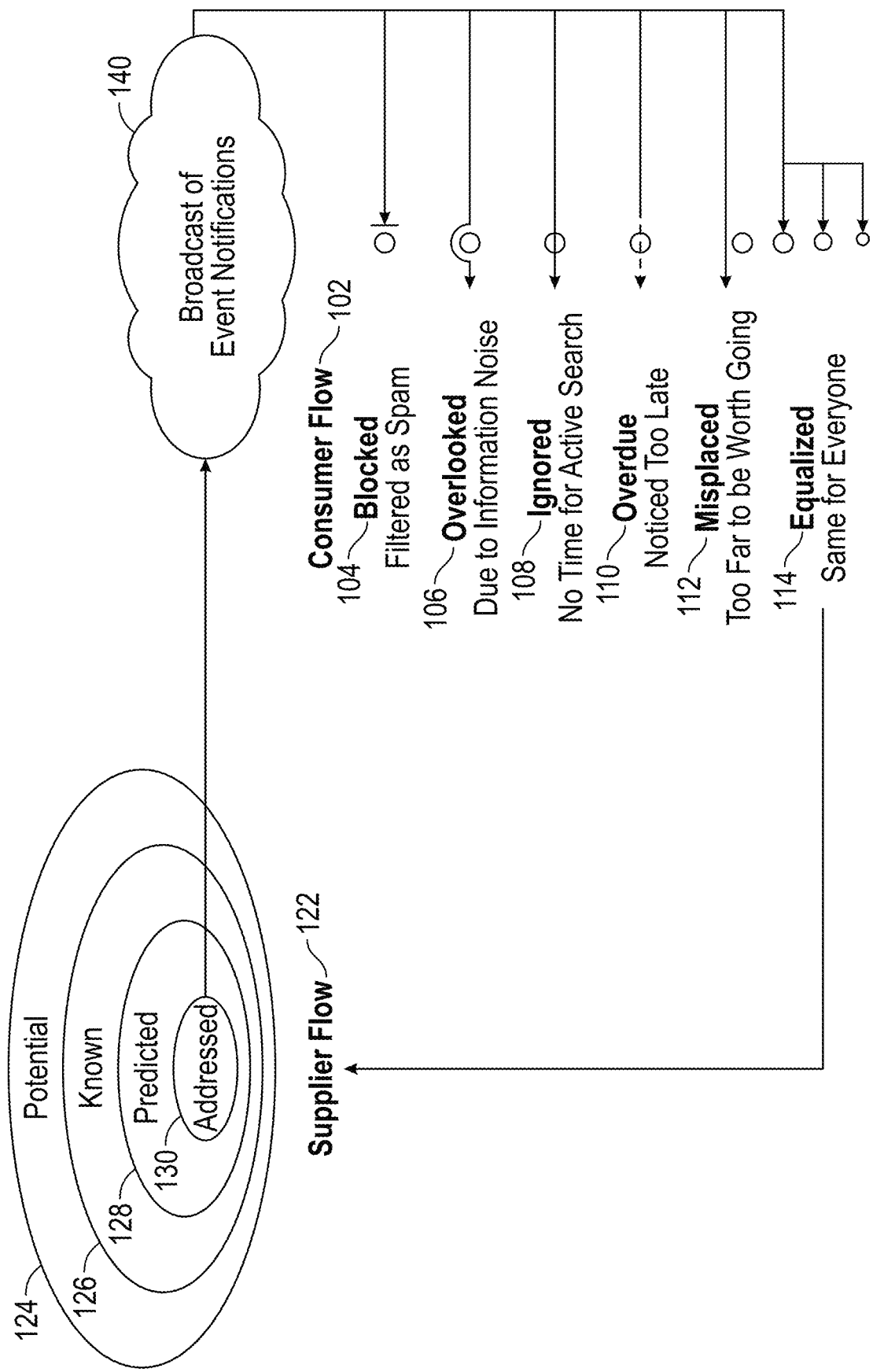
FIG. 1A illustrates an example of a traditional process of a database system for triggering event notifications based on updates to database records.

Increasing numbers of businesses are using special content items, such as special offers, event notifications (e.g., vouchers or alerts), loyalty and referral programs, and product or services discounts to attract users (e.g., customers). Retailers are providing digital event notifications to users without the need for event notifications to clip or emails to print. Users can simply display an event notification on a mobile device or enter a code online to redeem the event notification. Event notifications can include a buy-one-get-one-free or free shipping. Other event notifications can include a percentage discount, a bundling offer, or a free gift. As such, retailers can entice new users to a business, as well as re-attract previous users.

Described herein are systems and methods that facilitate the delivery of targeted content (e.g., digital event notifications) via a targeting campaign to provide a personalized user-vendor experience. The targeting content can include dynamically generating an event notification based on a certain type of update to a data record. For example, the database system can dynamically determine rates for discounts and/or event notifications based on changes to distances between a user (or consumer) driving on a highway with a vendor such as a car wash for improved targeted marketing. The targeting content can include a single platform for suppliers, users, and producers, instead of providing separate platforms in traditional targeting campaigns that facilitate communication to and from users and vendors (e.g., content item providers). As such, the database system can maximize sharing of relevant event notification contents and vendor event notification values to users, and match the user's unique needs with customized discounts.

The database system can generate event notifications based on user queries. The database system can receive a database inquiry, and in response to receiving the database inquiry, the database system can request to receive an update on a data record. The inquiry can include a user's request to receive coupons or promotions in the area. The database system can identify a data record for the user and determine updates to the data record. The changes to the data records can correspond to a type of change, such as a change in GPS location or a distance from certain vendors. The database system can identify a trigger corresponding to the type of change, such as if the distance from a vendor meets a distance threshold. The database system can then generate an event notification, such as an alert that includes rates and promotions based on distances to the vendors.

The rates for the event notifications, discounts, bundle options, and/or the like can be customized to a particular user and/or a particular merchant based on loyalty and/or referral programs, user ratings, supplier ratings, producer ratings, user queries and/or transactions, user conversion rates, distances from certain locations, and/or the like. For example, the database system can identify a user query history for car washes, match with a merchant with available event notifications remaining for the remainder of the month, and push the event notification to the user (or shopper) when the user's geographical location is within a defined distance (e.g., 5 miles) from a car wash. Accordingly, the event notifications can be uniquely customized based on the user needs rather than suppliers broadcasting general event notifications to a group of individuals based on a supplier's prediction of a user's needs. Moreover, users can be incentivized to provide referrals to their friends and family by providing the users with points and/or discounts of their own.

In some embodiments, the database system can include infrastructure to facilitate the determination and/or distribution of the dynamically determined event notification. The infrastructure can include one or more of web servers, databases, web API calls, executable software instructions including algorithmic processing, mobile devices, mobile applications, and/or the like. In some embodiments, mobile applications can retrieve geolocation information of a user's mobile device. The database system can provide a downloadable electronic file to the user's mobile device. The user's mobile device can install the downloadable electronic file. Then, the electronic file can access geolocation data from the mobile device's global positioning system to identify a geolocation of the mobile device. The electronic file can transmit the geolocation back to the database system.

In some embodiments, the database system deploys an executable instruction set via a downloadable electronic file by transmitting the executable instruction set to the client device (e.g., a client mobile device). Transmitting the executable instruction set can include pushing the executable instruction set to the client device in the form of an update and/or a downloadable file. Accordingly, in some embodiments, the executable instruction set can be downloaded and performed on the client computing device, separate from the database system, to perform the one or more processes on an event notifications and/or event notification related processes. Thus, the executable instruction set can perform the one or more processes locally to the client computing device, enabling faster response time by performing the processes locally and reducing network throughput by reducing and/or eliminating sending data back and forth to the database system. Moreover, the executable file enables the secure retrieving of internet activity data, such as cookie data on the mobile device, that can be used for event notification generation (e.g., a user's online activity indicates a preference for Italian restaurants, and thus, event notification contents are generated for Italian restaurants). Moreover, sensitive information retrieved at the mobile device can be processed within the mobile device without having to send the sensitive data to and from the database system, thus improving sensitive data security.

In some embodiments, the database system can identify and determine an optimal event notification amount or rate for a user based on historical data records (such as a past conversion performance across various event notification amounts), a change in data records (such as a change in distances to vendor locations, loyalty points, last visit time or dates, referrals, etc), and/or a combination thereof. The database system can retrieve a user's previous data record, such as the user's historical conversion rate for a particular event notification discount percentage over certain distances, such as a positive conversion for 30% discount at 5 miles but a negative conversion for 20% at 6 miles. The database system can retrieve a user's data record, such as the user's profile information which can include the user's conversion rates, via API calls to various databases. Accordingly, the database system can dynamically determine an event notification rate (e.g., 30%) based on the profile information. In some embodiments, the database system can determine a content item, such as an event notification, a coupon, a rate, a price, a discount, and/or the like, based on a user profile and current geolocation (e.g., a higher percentage discount voucher based on a conversion rate at a certain distance and the current distance of the user). The database system can then identify a trigger, such as if the geolocation is of a certain distance to the vendor, if the conversion rate is above a certain threshold, other factors tested as described herein, and/or a combination thereof (e.g., 20% conversion at 6 miles distance). Upon identification of a trigger, the database system can cause the mobile device to display the event notification to the user. The event notification can be transmitted over a wireless communication channel to activate the installed electronic file (e.g., a mobile application) on the user's mobile device, to cause connection between the electronic file of the remote user mobile device and the dynamic generation and distribution system over the Internet, and to display details of the event notification to the user.

Advantageously, the dynamic generation of the event notification and the automatic distribution of the event notification improves an Internet-centric, technical problem that is rooted in computer technology. In the example of dynamically generating the event notification based on the geolocation relative to the vendor, the user can be immediately notified of an event notification in the nearby vicinity when the event notification is the most relevant to the user. Thus, the user can be alerted of time and/or distance sensitive location when the user is away from a web browser and/or not using the user's mobile phone, providing a practical solution to the technical problem of the user being away from a computing device, such as a home desktop or mobile phone, and/or a user device not specifically using a communication network (such as a user not using the wireless network on the mobile phone).

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Traditional platforms separate the supplier targeting campaign and user profile, such that a supplier's targeting campaigns are directed to user databases that are sometimes accessible, static, and known, and that must be created and maintained/updated. Such separation of the supplier campaign and user profile of traditional systems often require suppliers to focus their event notifications to users that are known upfront. Suppliers may need to create and maintain user database by their own. Such approaches are very cost restrictive for small businesses and even large corporations to reach a reasonably sized audience that can benefit from the event notification valueal campaign. Furthermore, such approaches restrict targeting campaigns to known users. New users (e.g., new to the area, visitors, tourists, and/or the like) may be missed by suppliers due to the static nature of user databases that need to be maintained in order to be current. Advantageously, embodiments of this disclosure include systems and methods that establish a shared/common platform for suppliers to run campaigns and users to receive and redeem offers from the suppliers. As such, the shared platform has access to the most up-to-date customer information across multiple supplier channels, thereby providing a solution to the technical problem of database storage of user data. User data in today's internet of things world can be scattered across hundreds of different databases/platforms and quickly outdated. By providing a combined database, the database can aggregate user information, including information of users and vendors, to provide a practical solution of having an up-to-date customer information database for vendors and users to use, instead of having to rely on their own database and/or perform collection of data across thousands of databases on their own.

Furthermore, additional challenges may be associated with having to maintain and update user information in response to user profile changes. Traditional systems often do not update information related to currently known users and/or require large amount of processing and/or data transmission to maintain real-time up-to-date user information. Finally, such systems focus on gathering large amount of indirect information about the user, often without his knowledge (e.g., user browsing history) and use complex and computation exhaustive algorithms to determine user needs to properly targeting campaign. Such approach requires large amount of storage, computation and bandwidth and thus is costly. On top they must consider legal issues of gathering information about users without their consent (e.g., geographic location or browsing history). Advantageously, embodiments of the current disclosure include systems and methods that minimize and/or eliminate those costs by shared platform shared by suppliers and users and using information consciously provided by users about their current needs from user queries. The shared platform can also provide information of user event notifications that were delivered and used. Thus, the shared platform can apply user conversion statistics across different suppliers.

Traditional systems often focus on informing potential users regarding an offer by offering a wide broadcasting of an offer to all users meeting certain criteria, limits, and/or known characteristics of the users, and/or the like. Such broadcasting methods and systems can generate a lot of undesired messages for a user, such as many alerts on a mobile device or many emails. Furthermore, such broadcasting methods and systems increase the usage of network bandwidth, especially if many sources are broadcasting messages to a large and wide audience. Moreover, messages are increasingly including enhanced content requiring the transmission of larger data files. In addition, broadcasting information often are not filtered on the supplier end and thus are not noticed immediately. Accordingly, this type of system puts the effort on the user to filter the messages and find the offers that meet the preferences and/or desires of the user. Furthermore, in this type of system, users have to check the validity of the date and/or store location. Broadcasting unfiltered messages creates information noise and often results in a situation where a user misses an interesting offer or the user's attention is detracted to a potentially irrelevant offer. It can also reduce the overall effectiveness of all targeting campaigns by numbing the effect of the event notification to the user. Moreover, traditional systems often extend event notifications for a long period of time, such as a few days or weeks. By broadcasting to distribute event notifications, suppliers cannot predict whether the user will notice them immediately. Such systems do not react to dynamic market changes and thus, cannot customize event notifications to custom tailor them to a smaller time window. Accordingly, supplier campaigns cannot therefore easily customize to specific geographical locations and/or narrow the event notification to a smaller time window.

Traditional systems currently available and used for finding offers and event notifications also fall short of dynamic event notification generation. Even though such systems provide categorized search of offers available in the web, they are based on web content analysis rather than based on information directly sourced or dynamically customized by suppliers. Thus, users often must verify the validity of found offers themselves and are able to find only publicly available offers not tailored for their unique user profile.

An additional limitation includes the complexity of identifying interesting and applicable offers at a particular time and/or a location, which can often discourage users from looking for them in the first place as the effort spent may not be worth the gain. This in turn limits the effectiveness of the targeting campaign as a whole. Users receiving a large number of offers become desensitized to offer content, treating the event notifications as spam. Another limitation is the overflow of multiple offers leading to overlooking an offer that the user would have otherwise use. Finding applicable offers that have already been expired and/or are too distant of a location can also further limit the reach of targeted marketing.

Another limitation to traditional systems is the inability to target specific users based on loyalty and/or a personal user profile. Existing loyalty programs provide appreciation to valued users, but suppliers cannot generate dedicated offers for each individual user. Instead, systems implement threshold-based groupings of users averaging offer benefits over particular groups that meet certain thresholds. This limits the generation of dynamic event notification generation custom tailored to individual users.

FIG. 1A illustrates an example of a traditional process of a database system for triggering event notifications based on updates to database records. The process in this traditional targeting campaign can be very inefficient. For example, traditional systems can broadcast event notifications (such as vouchers) 140. On the user flow side 102, the event notifications can be blocked 104 (e.g., filtered as spam), overlooked 106 (e.g., due to information noise), ignored 108 (e.g., when users do not bother actively searching for the vouchers), overdue 110 (e.g., when vouchers are noticed too late such as when expired), misplaced 112 (e.g., when the location for voucher use is too far), and/or equalized 114 (e.g., same for a group of users and not custom tailored).

A part of the reason for this is due to the fact that on the supplier flow 112, the event notifications are created based on static information that is imprecise for both user targeting and analysis. Furthermore, the static information includes a lot of overhead and requiring human analysis. On the supplier flow, users are categorized based on potential users 124 (e.g., all users interested in the event notifications), known users 126 (e.g., supplier knows the user's email address), predicted users 128 (e.g., user current need predicted by the supplier), and addressed users 130 (e.g., selected needs addressed by event notifications). The addressed users 130 are a subset of the predicted users 128, the predicted users 128 are a subset of known users 126, and the known users 126 are a subset of the potential users 124. In traditional campaigns, only the addressed users 130 are the ones that supplier is able to target, which is small subset of all potential users 124.

Figure 1B:
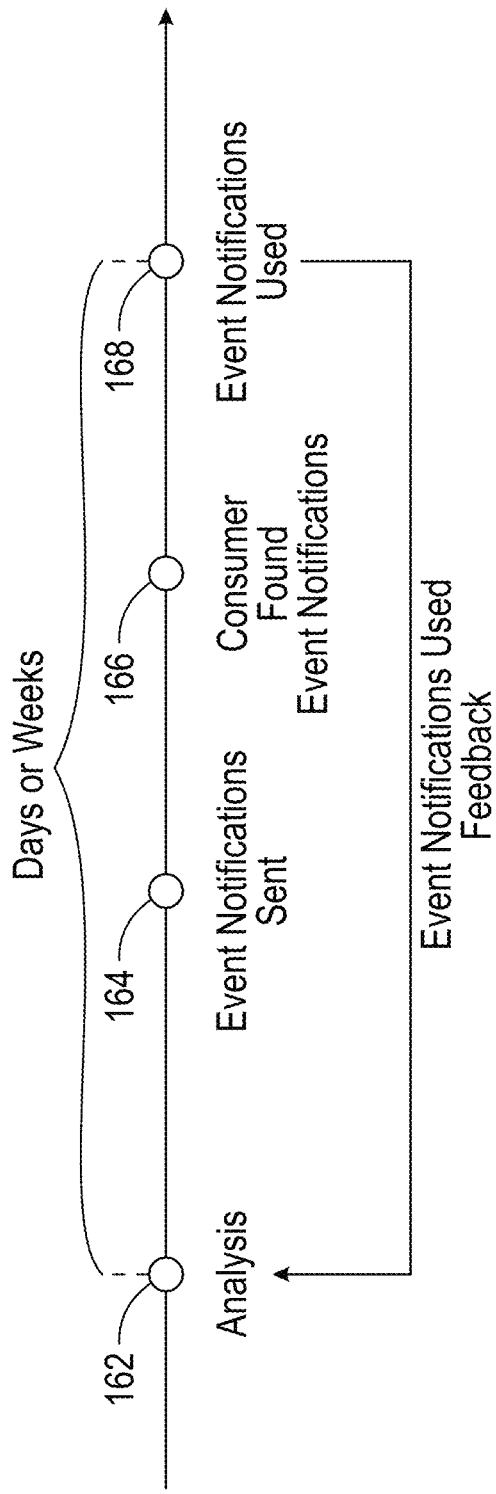
FIG. 1B illustrates a traditional approach to event notifications generation over days or weeks.

FIG. 1B illustrates a traditional approach to event notifications generation over days or weeks. Traditional systems can send the event notifications (such as vouchers) 164, the user can find the event notification 166, the event notification can be used 168, and feedback of whether the event notification is used can be analyzed 162 in order to determine future event notifications. As such, the feedback is generally limited to whether the event notification was used or not. It is not possible to determine specific user that used it and bind transaction to user profile. Furthermore, traditional systems generate event notifications that are valid for longer periods of time, such as days or weeks.

Systems and Methods for Dynamic Event Notification Generation

Figure 2A:
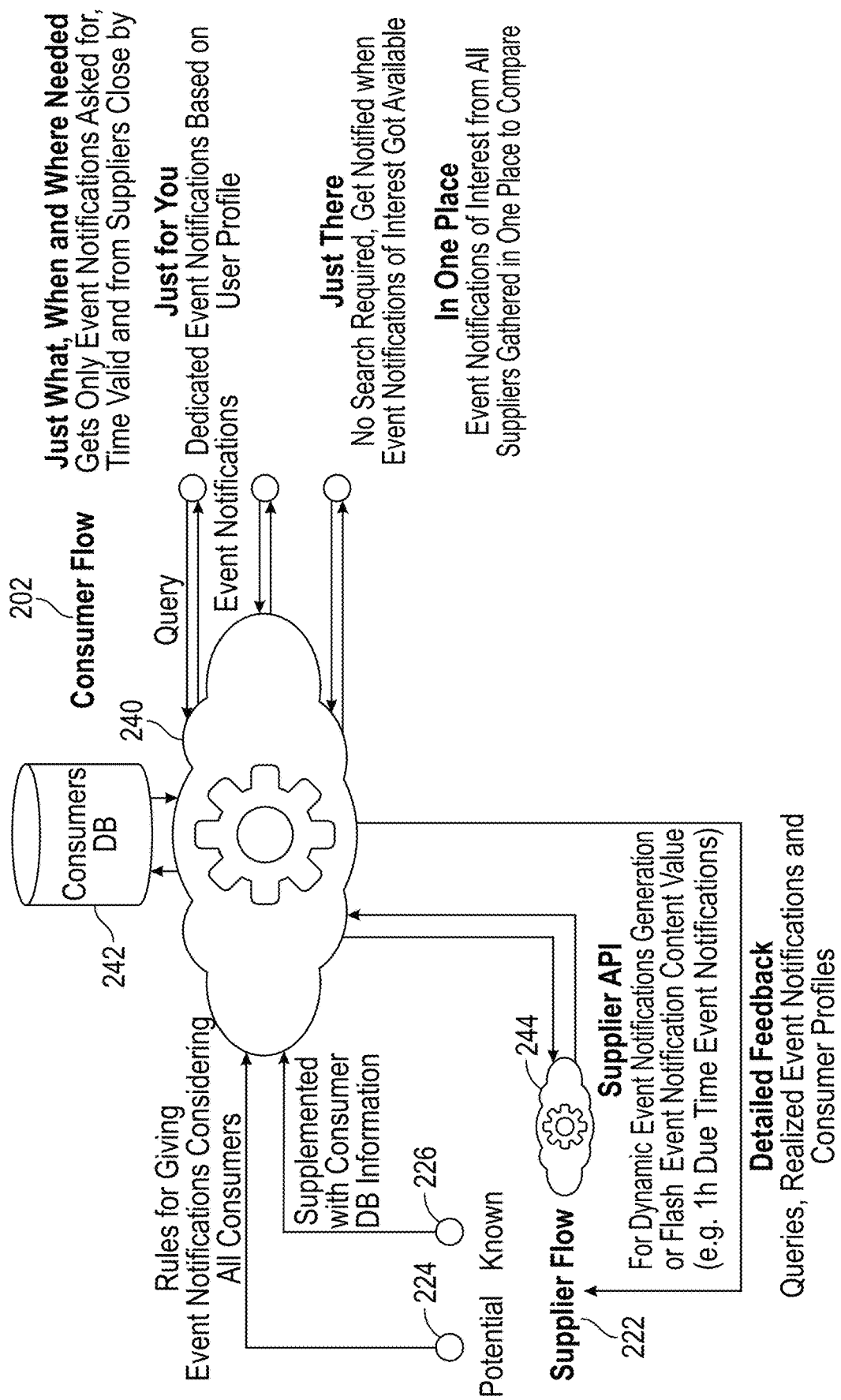
FIG. 2A illustrates an example of a database system according to some embodiments.

FIG. 2A illustrates an example of a database system according to some embodiments. The database system can include a dynamic event notification generation and distribution system and/or vice versa, according to some embodiments. Embodiments described herein provide a unified end-to-end system that is used by suppliers and users at same time. Users that are signed up in the database system can specify what kind of changes to database records (such as offers) they are interested in and query the database system to search for matching database records (such as matching offers). In some embodiments, the database system identifies user interest, and dynamically identifies triggers for certain types of changes to data records. For example, the database system identifies that the user is interested in car washes. The database system can identify data records for when the user last went to a carwash. Data records can include distances from a user's mobile device to a car wash. The database system can identify one or more triggers that correspond to changes to these data records, and generate event notifications (e.g., more discounts if distances are within 5 miles and conversion rate is over 50%). Suppliers instead of broadcasting predefined event notifications, can specify rules that describe how to generate an event notification based on user query.

In the user flow 202, database queries (or user queries) can include one or more of, but are not limited to:
  unique user ID
  time and date of the request
  geographic location and search radius or maximum drive distance/time
  list of categories and/or subcategories of products or services of interest
  list of specific products or services
  list of specific suppliers
  offer filters like minimum discount amount or discount percentage
  information about how query was triggered (manually, proximity based or periodic)

Additionally, user database(s) 242 can store detailed information about a user that can be obtained based on the unique user ID from the query and/or predicted by the database system. Examples include, but are not limited to:
  history of user queries
  history of realized event notifications with event notification information including time, locations, category, transaction price and savings achieved
  relation between user queries, corresponding event notification that was granted, same event notification realization, users to which the event notification was forwarded, user feedback provided after event notification realization
  each action can contain a time stamp and location
  list of verified loyalty program IDs associated with the user stored in the user profile
  calculated user global ranking based on user savings due to using event notifications and transaction price from used event notifications with rating contribution breakdowns or their combinations. Rankings can be based on:
    per category/subcategory
    per supplier including supplier's percentage contribution in all user transactions
    time and/or location distribution
  list of user group membership
  credit card information for "pay with the event notification" transactions In the supplier flow 222, the supplier can create sets of rules (or triggers) and conditions that can determine whether the event notification should be granted and calculate a customized amount of benefits based on query information above and/or user profile information from in database. For example, the supplier can identify rules for giving event notifications considering a plurality of potential users 224. Advantageously, the supplier can reach potential users in response to user queries, even the users that would not be known to the supplier otherwise. As described above, this technical advantage can be realized based on the practical application of combined database of vendors and users. Furthermore, users associated with loyalty and/or personal user profiles can be reached. Data from social media and web based digital campaigns can also be analyzed to generate the rules for giving event notifications. The supplier can supplement the analysis with user database information for known users 226. Additionally, event notification generator can include, but are not limited to:
- time and date
- list and supplier's premises locations fulfilling condition from user query The database system can provide each supplier a set of analysis data calculated based on user queries as well as based on granted and realized event notifications using the event notification generation and distribution system 240. Example of analysis output that can be provided include, but are not limited to:
- list, value and full information of the event notifications granted from the beginning of the campaign including list of users that get them
- list, value and full information of the event notifications realized from the beginning of the campaign including list of users that used them
- geographic, time and category distribution of queries, granted and realized event notifications as well as ratings and reviews
- distance and time between event notification granting and realization
- statistics for costs, return on investment (ROI), campaign success rates
- customizable parameters calculated based on above In some embodiments, the analysis output data can be processed by the database system. The database system can determine a distribution of event notification content status changes over time and/or geographical location. The database system can perform statistical analysis on changes based on event notification values, by vendor, type of user, and/or the like to identify trends to generate models. The models can be applied to future queries to determine expected statistics, such as an expected conversion rate, which can be helpful for optimization of event notification values. A heat map/graph can be displayed over a map showing where event notification contents (e.g., event notification contents) were accepted, referred, and/or redeemed. A time distribution can show times between queries to acceptance, acceptance to redemption, queries to referrals, referrals to acceptances, acceptances to redemptions of referred event notification contents, and/or the like. Ratios of event notification contents can be generated such as accepted/redeemed based on event notification values, the vendor, the user characteristic, and/or the like.

In some embodiments, the statistical outputs can be inputted to a webAPI for event notification content benefit decisions done on the vendor server. Statistical outputs can be used as granting conditions for benefits. Examples of the granting conditions can include:
- benefit of 75%—condition: user in top 10 loyal users last month (most loyalty points gathered)
- benefit of 50%—condition: user in top 10 referrers last month (referred most of the event notification contents that were at least accepted)
- benefit of 25%—condition: none The suppliers can distribute the dynamic event notifications via a supplier API 244. Event notification generator can be adapted automatically based on the data from campaign analysis data. For example, supplier can limit number of granted event notifications, adjust discount value based on current distance users were willing to travel, increase event notification benefits during weekdays with less number of queries, and/or the like.

Figure 2B:
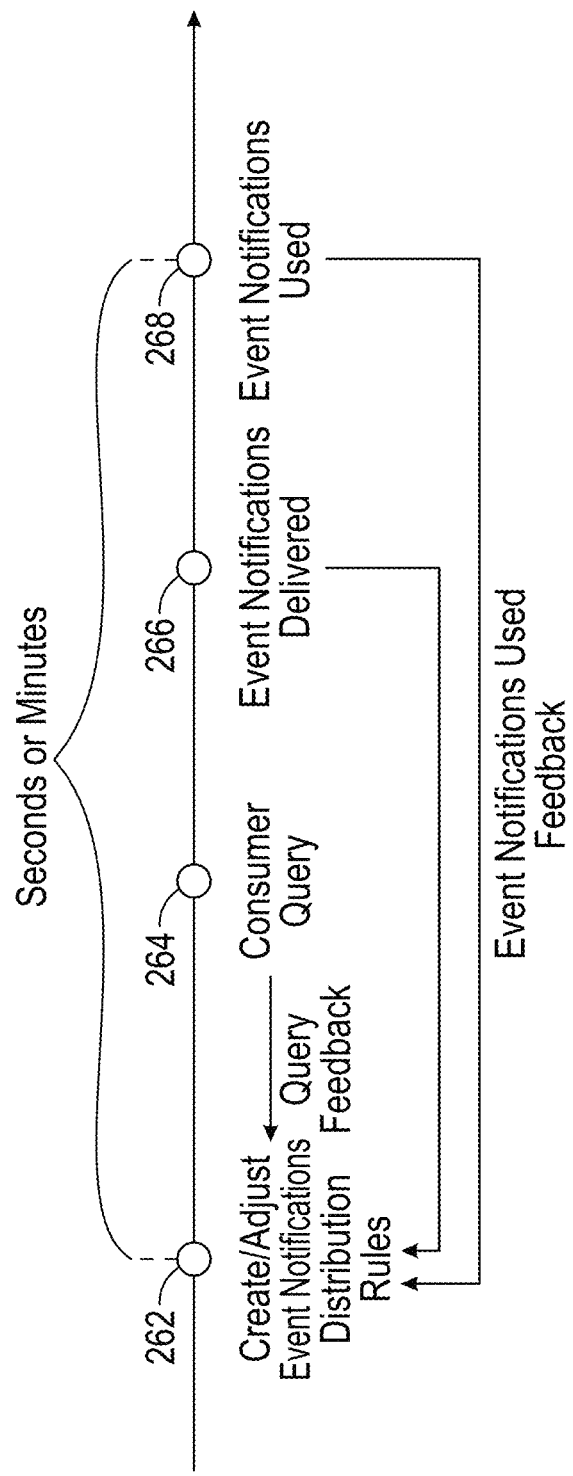
FIG. 2B illustrates event notification generation over a shorter time period according to some embodiments.

FIG. 2B illustrates event notification generation and lifetime cycle over a shorter time period such as, e.g., seconds or minutes, or in substantially in real time, according to some embodiments. The database system can receive a user query 264. The event notification can be generated and/or distributed 266, and the event notification can be used by the user 268. The database system can receive feedback as to whether the event notification was used and also receive feedback related to the user query 264. As such, the event notifications can be made to pertain to the immediate circumstances of the user, such as the user's current location and/or activity. This allows for a much faster reaction to market changes and enables the generation of dynamic event notifications and/or flash-event notification values (e.g., event notifications that expire in one hour). For example, the database system can generate event notifications based on sale results in the last hour.

In some embodiments, a specific event notification value with a short expiration date and benefits can be generated including granting conditions based on time or location, such as "time til event notification value end" or "distance to query." In some embodiments, user location is tracked and such an event notification value is sent based on a condition, such as a closeness in location.

In some embodiments, the event notification content characteristic, such as the benefit, can be changed based on the location or the time of event notification value expiration. For example, the closer a user is to a vendor site, the event notification content's discount amount and/or percentage can be decreased.

In some embodiments, the event notification contents are created dynamically based on a user characteristic. For example, the mobile device of a user can be at a certain distance threshold from a content item provider. If the user profile matches rules (e.g., rules set by the content item provider), then the database system can dynamically generate an event notification content for the user, even without a user query. If the user is driving within a 1 mile radius of a car wash and the profile indicates that the user washes his or her car every month, then the database system can dynamically provide an event notification content for a carwash.

In some embodiments, the database system can dynamically create reminders. The database system can create reminders based on an event notification content characteristic, such as when the event notification contents are close to expiring (e.g., send higher discounted event notification contents to ensure all seat tickets are sold for an event). The database system can create reminders based on user characteristics, such as a user preference or location (e.g., event notification content reminder when the user is very close to a location of a supplier). The database system can create reminders based on other characteristics, such as a time of day, a day of the week, the current weather, and/or the like (e.g., lunch event notification content when the user is close to a particular restaurant). The database system can create reminders based on supplier characteristics, such as a conversion rate of the user with the supplier for an event notification content (e.g., send a reminder when the user has visited the supplier frequently over the past few months).

In some embodiments, the users have the option to add vendors as their favorites. Vendors can then reach out with their event notification contents. Vendors can in return provide them with special offers during their query, providing them with additional bonuses for adding them to their favorite lists.

Database Concept Diagram with Information Flow

Figure 3:
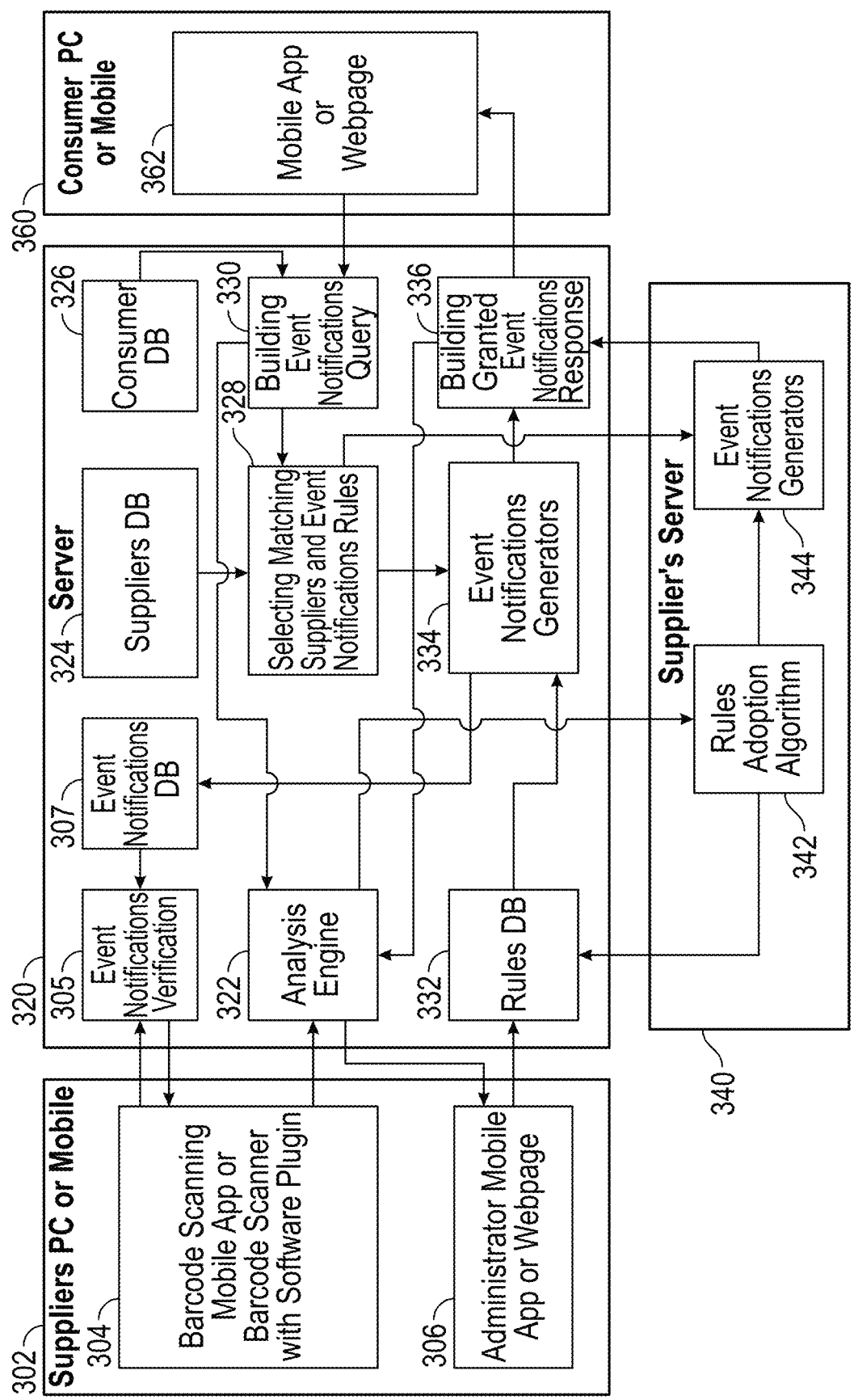
FIG. 3 illustrates an example dynamic event notification generation and distribution diagram with information flow according to some embodiments.

FIG. 3 illustrates an example database system diagram with information flow according to some embodiments. In some embodiments, the supplier's personal computer or mobile device 302 can provide a barcode scanning mobile application or barcode scanner with software plugin 304. The supplier's personal computer or mobile device 302 can include an administrator mobile application or web page.

In some embodiments, the database system can include a dynamic event notification generation and distribution server 320. The supplier's personal computer or mobile device 302 interface with the dynamic computer generation and distribution server 320. The dynamic computer generation and distribution server 320 can include an analysis engine 322 that receives realized event notifications and purchase transaction information from the supplier's personal computer or mobile device 302. The analysis engine 304 can also receive input from the building event notification query 330 that receives information on the user query and/or the building granted event notifications response 336 that determines the event notifications granted to the user. The analysis engine 322 can send the targeting campaign analysis information to the administration mobile application or webpage 306.

In some embodiments, the event notification generator 334 can generate event notifications based on user queries and store in event notifications database 307. The event notifications database 307 can store a plurality of event notifications, such as coupons or vouchers. When supplier scan granted with event notification barcode scanning mobile application or barcode scanner with software plugin 304, event notification information can be sent to event notification verification 305 for verification. Verification result can be sent from event notification verification 305 to barcode scanning mobile application or barcode scanner with software plugin 304 providing information of event notification validity. Barcode scanning mobile application or barcode scanner with software plugin 304 can send to analysis engine 322 information about event notification realization and purchase transaction details.

The database system can provide a downloadable electronic file for the vendor device that enables processing of a QR code provided by a user. The user can present the QR code to the vendor point of sale device, such as a mobile device or a tablet. The vendor device can scan the QR code and request the database system for verification of the event notification content. The vendor can apply the discount from the vendor's point of sale and confirm that the event notification content was redeemed with the database system. The electronic file can be an extension plugin for a vendor counter software such that the database system QR codes can be scanned using the vendor's counter scanner directly.

The downloadable electronic file for the vendor can allow for direct payment using the QR code. The database system can retrieve financial information of the user, such as a user's credit card, and the credit card information can be sent to the vendor without the vendor having access to that information. Advantageously, the technical problem of personal information security in today's digital age is improved by the practical application of sending the credit card information directly with the vendor device, and without the vendor being able to see the credit card information. Digital identify theft has become an increasing technical issue with credit card scanning technology being able to steal credit card information. However with this system, the database system can automatically facilitate the transaction without the use of a credit card scanner at the point of sale system for the vendor.

The downloadable electronic file can allow for direct payment automatically, reducing the number of graphical user interfaces needed for a typical payment purchase. In traditional payment procedures, a credit card is swiped on a vendor point of sale system, the system verifies the credit card with the bank, an employee of the vendor confirms the verification, the point of sale system displays the amount, the user verifies the amount and signs the point of sale system to complete the transaction. However, the downloadable electronic file can communicate with a database system, where the database system has already verified the credit card information of the user. Advantageously, the downloadable electronic file provides a technical solution to a technical problem by automatically receiving verification of the credit card and completing the transaction with a simple click of the user verifying the transaction. For example, if the vendor begins a transaction with the user, the vendor system can automatically notify the database system, the database system can automatically send an alert to the user device, the user device can select a button to accept the transaction, the user device can automatically transmit the selection to the database system, and the database system can automatically send the credit card information to the vendor device to complete the transaction. Thus, the technical problem of navigating through numerous graphical user interfaces to complete a payment purchase is solved by the practical application of automatically receiving verification of a credit card and completing a transaction.

In some embodiments, the analysis engine 322 can send the analysis of the targeting campaign to a supplier server 340 that includes a rules adoption algorithm 342 and/or an event notification generator block 344. The rules adoption algorithm 342 can send the event notification generation rules to a rules database 332. The rules database 332 (or the triggers database) can also be directly updated from supplier's personal computer and/or mobile device 302 via the administrator mobile application or webpage 306. The triggers stored in the triggers database 332 can be used to determine when and/or what event notifications are to be sent based on underlying factors, such as information in data records.

In some embodiments, the rules database 332 can be accessed by event notification generator module 334. The event notification generator module 334 can generate event notifications based on the received rules, supplier's information from suppliers database 324 and/or user's event notification query built by building event notification query module 330. The event notification can then be transmitted to the building granted event notifications response block 336, which transmits the event notifications to a mobile application and/or webpage 362 of a user personal computer and/or mobile device 360. In some embodiments, the event notifications can be displayed on a user device 360 without the downloadable file and/or corresponding application being launched. The user can receive such event notifications as a notification, such as a text message or a pop-up, while the application is in an unlaunched state. The user can then select the notification to launch the application, improving display interface technology by allowing a user to more quickly access event notification-related information stored in the application and/or a corresponding database. Such a notification with an unlaunched application improves the technical problem of the user having to open the application and navigate across several interfaces of the application to identify related event notifications.

In some embodiments, the mobile application and/or webpage 362 of a user personal computer and/or mobile device 360 can transmit a query from a user to a building event notification query 330 that receives query information and user information from a user database 326, or a data records database. The user database can store a plurality of data records that correspond to the user. The data records can include times when a user visited a vendor, loyalty related points, current and/or previous geographical locations, distances to other locations such as a vendor, referrals sent or received to other users, and/or the like. The dynamic computer generation and distribution server 320 can include a selecting matching supplier and event notification rules block 328 that receives query information from the building event notification query block 330 and/or supplier information from a supplier's database 324. The selecting matching suppliers and event notifications rules 328 can transmit the matching information to the event notification generator 334 to generate custom rules and/or event notifications for the selected user.

Supplier Web API Extension

In some embodiments, suppliers can use an algorithm running on their own server in order to calculate event notification discount and/or change event notification granting rules. Supplier's server system can connect to the database system using predefined web APIs. Suppliers can configure their system to route user queries fulfilling specific conditions via web API to their servers, where event notification to be granted will be calculated. The event notification data can be routed back to the database system and send as a response to the user query.

In some embodiments, suppliers can specify conditions using campaign analysis, which can trigger web API requests to supplier servers that would recalculate and update set of event notifications granting rules. In some embodiments, suppliers can add and/or modify rules via the API. The suppliers can automate the rules process based on triggers from the database system. The triggers can be generated based on analysis of parameter thresholds that can be set up before the suppliers connect to the database system.

In some embodiments, with web API extensions, suppliers can have more flexibility in defining their rules for event notifications as well as use their databases containing user information to supplement the system capabilities and further enhance their campaigns. Web API extensions enable suppliers to implement own proprietary and most sophisticated algorithms on their servers that would be requiring lots of compute power. For example, suppliers can use their own loyalty program database to grant better valued event notifications to loyal users. These users can be identified using loyalty number forwarded on the API.

Suppliers and Product Reviews

In some embodiments, upon verified realization of the event notification, users can be requested for feedback about the supplier. Optionally user can also write a review or/and fill out questionnaire. As reviews will be provided only by users who really used the event notification and transaction is verified by supplier, it would be very difficult to provide false reviews.

In some embodiments, in case the event notification is product specific, users can be requested to review specific product in similar way as for supplier rating. Again, only users who used event notification to purchase product can be able to provide feedback.

In some embodiments, each review can be rated by other users as helpful. User review that gathered multiple ratings as helpful would positively impact users rating. For this reason the user feedback is encouraged.

User Social Network

Social media and web based digital campaigns are becoming an effective and cost-effective method to reach potential and current users. The digital campaigns also enable automated analysis of feedback and much faster reaction time to changes on the market. Automated, algorithm-based systems can dynamically customize offers to users, automatically target each user separately customizing the offer based on time (e.g., time between event notifications, time of the day, time since similar service and/or good purchased, and/or the like), location (e.g., distance from a merchant, conversion rates for certain distances from a location, a determination of a user's means of transportation, and/or the like), and/or user profile (e.g., a user's preferences to goods and/or services, user habits, what was queried at a certain location or time, a predefined shopping cart of desired goods and/or services, a search query, what and where they referred, accepted, queried, redeemed, and/or reviewed event notification contents, and/or the like) to deliver dedicated offers providing a powerful tool for modern day marketing.

In some embodiments, users signed up in the system can reach out to each other and add other users to list of friends. Added a user can confirm being a friend with the one that initiated it. Users can invite new users via email or social media. Such invitations may contain forwarded event notification data to encourage new users to join.

In some embodiments, the user and vendors can both be a part of the same social network. An open, shared/common, public network can be used by vendors as their customer database. A user of the network can invite a friend to the network and/or connect one friend to another. The connections can include certain actions, such as a user referring event notification contents to friends only, or vendors broadcasting event notification contents to user-friends only. The vendors can get indirect access to all users, such as friends of friends.

User Public Groups

In some embodiments, each user can create publicly visible and/or private groups. Groups can be ranked based on its members rating and can be targeted by suppliers for special offers.

In some embodiments, suppliers can create user groups. User group event notification grant can be controlled by predefined rules (e.g., group ranking) as well as from web API. Suppliers can create several groups to which event notifications with different level of benefits can be delivered.

Registering Products

The database system may be configured to create special accounts for Producers. Producers can register their products in database under unique ID. The ID would be generated and assigned by the system. Alternatively, product can be registered using UPC (Universal Product Code) it is registered with. Along with ID each product need to be provided with a brand, name and to be associated with specific category. For each category additional information might be entered. Product description, ingredients, technical parameters, usage instructions, dietary information and any other information normally found on product labels or package can be entered and associated with registered product. System will provide ready to fill up forms with most common parameters of products belonging to specific category. For example: screen size, power consumption, refresh rate or 3*d* support for products from TV category.

Registered products database would be available for all parties using the system. Users can search for registered products to query for any event notifications or discounts associated with them or categories they belong to. Producers and Suppliers can use the products from database to create rules for event notifications generation.

Producers can print product unique ID on its package or mark the product with its unique ID using other technology. In case of products registered under UPC code the existing barcode or marking can be reused. Otherwise new unique ID assigned by system during registration in form of a barcode, QR-code, NFC or any other technology for in-store product identification can be printed or placed on the product or its package.

Users are able to scan product unique ID using application to use it in a query for event notifications, discounts or special offers. Offers for specific product or for category or subcategory it belongs to will be returned. As such, users may receive or gather discounts (e.g., instantaneously) while in the store.

Users can also use scanned product's unique ID to check information Producer placed in the system. Users can create set of filters for products parameters to verify if product is fulfilling their needs. For example, Users can create allergens filter for grocery products in order to be notified in case scanned product contain any of them on its ingredients list.

Products information can also be used in user queries. For example, user can query for event notifications for TVs with specific feature and screen size.

Users that realized event notifications for specific products will be requested for a rating and/or review of the product. This way reviews would come only from Users that purchased the product.

Suppliers can also register their services in similar way. For example, restaurant can register specific dish under unique product ID and use it in form of QR-code in their menu. Users can get information about its ingredients, verify allergens, check if it fulfills their diet constrains, see picture of the dish or to query for a discount. Each user account in the system can be a user, supplier and producer at the same time.

Blockchain

In some embodiments, granting and realizing event notifications can include a transaction between specific Supplier and User. Both parties, transaction details, rules and conditions of granting as well as realization of event notification and feedback to system can be connected and recorded. Both parties can be able to verify the transaction validity and to make sure event notification is unique. Blockchain technology can be used to manage and validate event notification transactions.

Example System Flow Diagram for Database System

Figure 4:
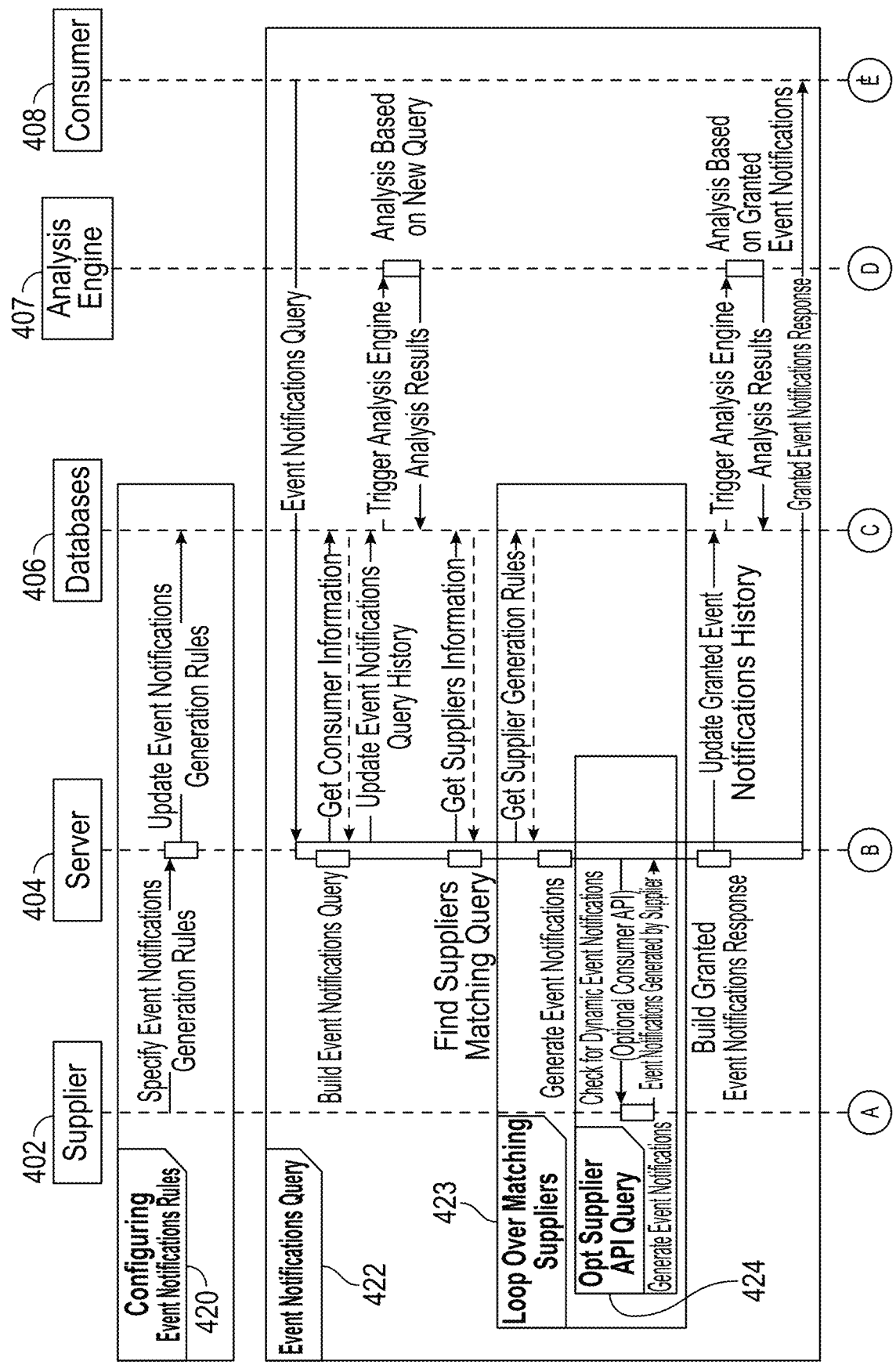
FIG. 4 illustrates an example of a flow diagram for database system according to some embodiments.
Figure 4:
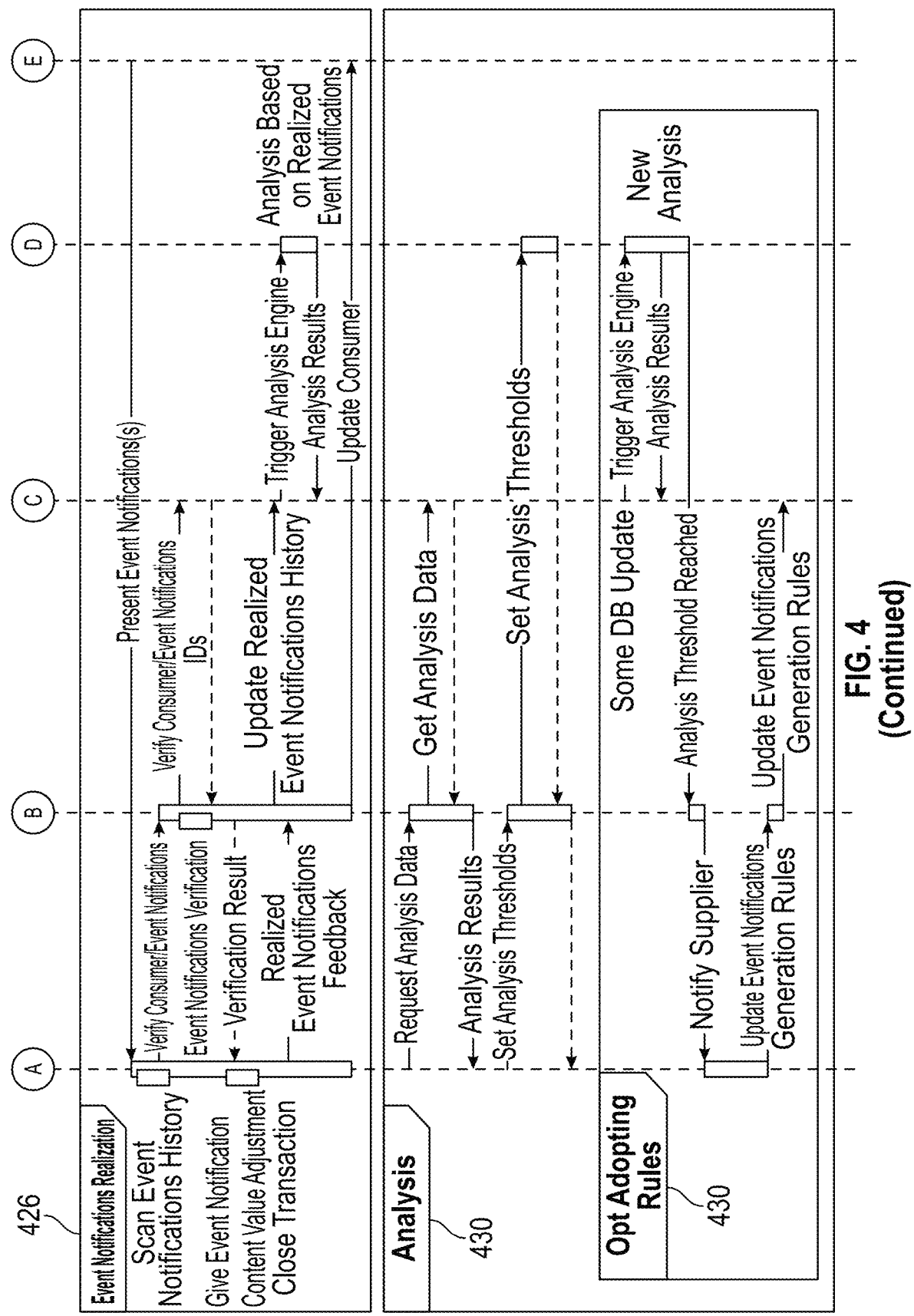

FIG. 4 illustrates an example of a flow diagram for database system according to some embodiments. In some embodiments, the supplier 402, the server for the database system 404, the database for the database system 406, the analysis engine 407, and/or the user 408 transmit data to generate and/or distribute the dynamic event notification.

In some embodiments, the database system can configure event notification rules 420. The supplier 402 can set event notification generator and send the rules to the server 404. The server can send the rules to a rules database 406 to update the database 406.

In some embodiments, the database system can facilitate event notification queries 422. The user 408 can send a query for an event notification to the server 404 of the database system. The server can update the event notification query history with the database 406. The database 406 can trigger the analysis engine to analyze the query and send the analysis results back to the database 406. The servers 404 can then find the suppliers matching the query based on information from the database.

In some embodiments, the server can request and receive supplier generation rules from the database 407 in block 423.

The server 404 can retrieve user information from the database 406 and generate event notifications based on the user information and/or the query information. The server 404 can grant the event notifications to the user 408 and update the database 406 of the granted event notification. Updating the database 406 can initiate the analysis engine 408 to analyze the granted event notification and send the results back to the database 406. The server 404 can then grant an event notifications response to the user 408.

In some embodiments, the server of the database system can communicate with the supplier 402 via a supplier API at block 424. For example, the supplier can initiate a call for information. The server 404 of the database system can check for dynamic event notifications from the supplier.

In some embodiments, the database system can track event notification realization at block 426. The user 408 can present an event notification to the supplier 402. The supplier 402 can scan the event notification (e.g., via a barcode) and ask for verification of the user and/or event notification. The user and/or event notification IDs requested for verification can be checked against information from the database 406 and/or the verification results can be sent back to the supplier 402. The server of the database system can provide a discount and/or close a transaction for a supplier 402. The supplier 402 can realize the event notification, and the database system can notify the server 404 that the event notification was realized. The database 406 can be updated with the realized event notification information. Updating the database 406 can trigger the analysis engine 407 to analyze the realized event notification and send the analyzed results back to the database. Then, the server 404 can update the user 408 about successful event notification realization.

In some embodiments, the server of the database system may be configured to gather targeting campaign analysis data. In some embodiments, the supplier 402 can request analysis data from a server 404 of the database system. The server 404 of the database system can request information from the database 406. The database 406 can return data that the server of the database system 404 can provide to supplier 402 as a result. The supplier 402 can set analysis thresholds for the analysis engine 407. When new analysis results are available, analysis engine can issue analysis trigger notification to server 404 in case analysis thresholds are reached. Notification about reaching predefined thresholds is then forwarded from server 404 to supplier 402. Supplier can use analysis threshold notifications to trigger own algorithms calculating modifications of event notification generation rules and send them as an update to the server 404, which in turn update them in database 406.

Example System Flow Diagram for User Query for Event Notification Contents

FIGS. 5A-5D illustrate examples of flow diagrams for user query for event notification contents according to some embodiments. In some embodiments, the database system can include a server 504 that can communicate with a user 502, a database 506, and/or a vendor 508 in order to respond to a user query for event notification contents. The database system can include a database 506 that includes one or more databases, such as the databases described in FIG. 7. The database system can include an electronic file installed on the user system 502 (e.g., a mobile application for the user device). The database system can include an electronic file installed on the vendor system 508 (e.g., an electronic application for the vendor point of sale device).

Figure 5A:
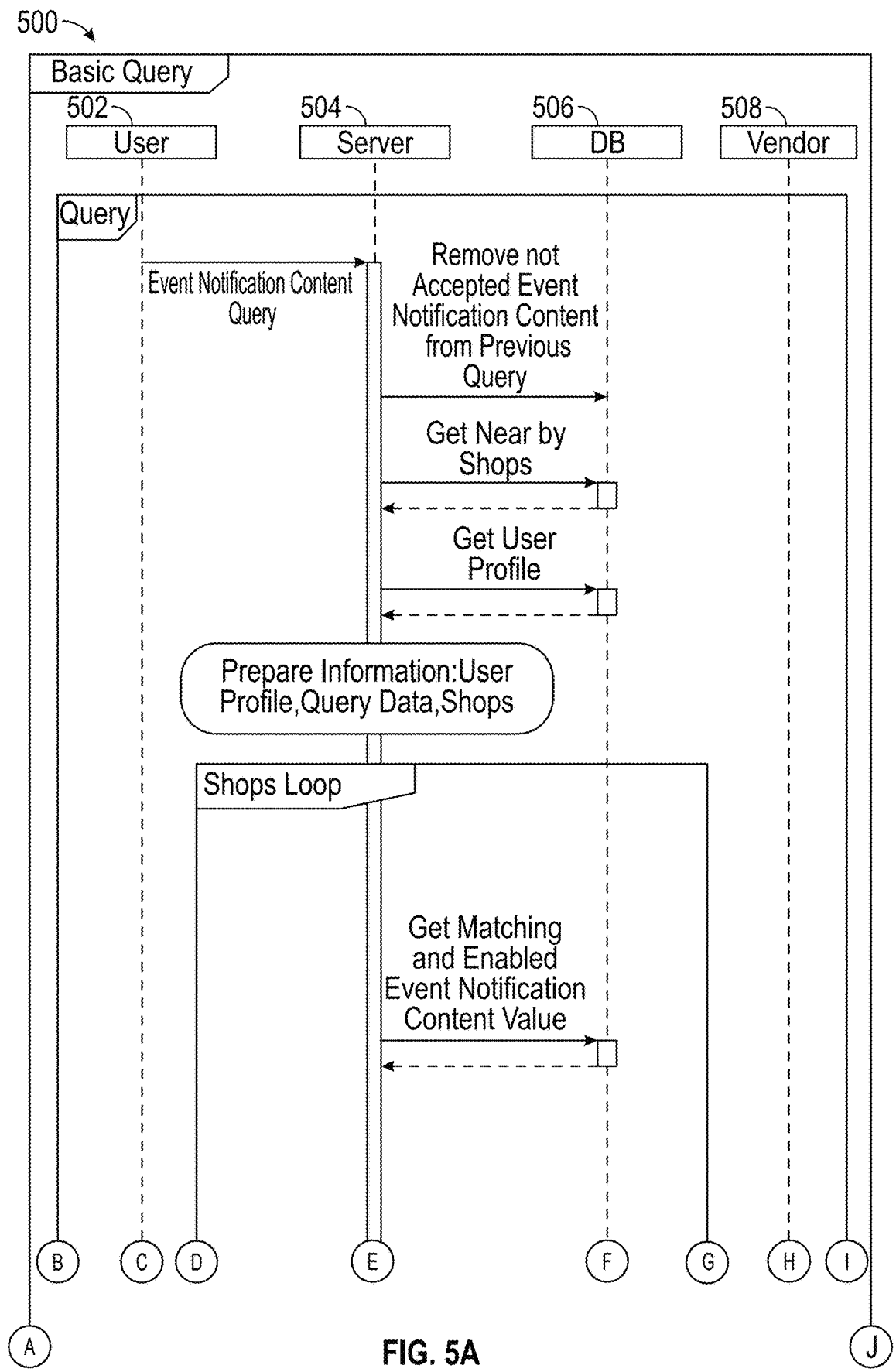
FIG. 5A illustrates an example of a query and query response according to some embodiments.
Figure 5A:
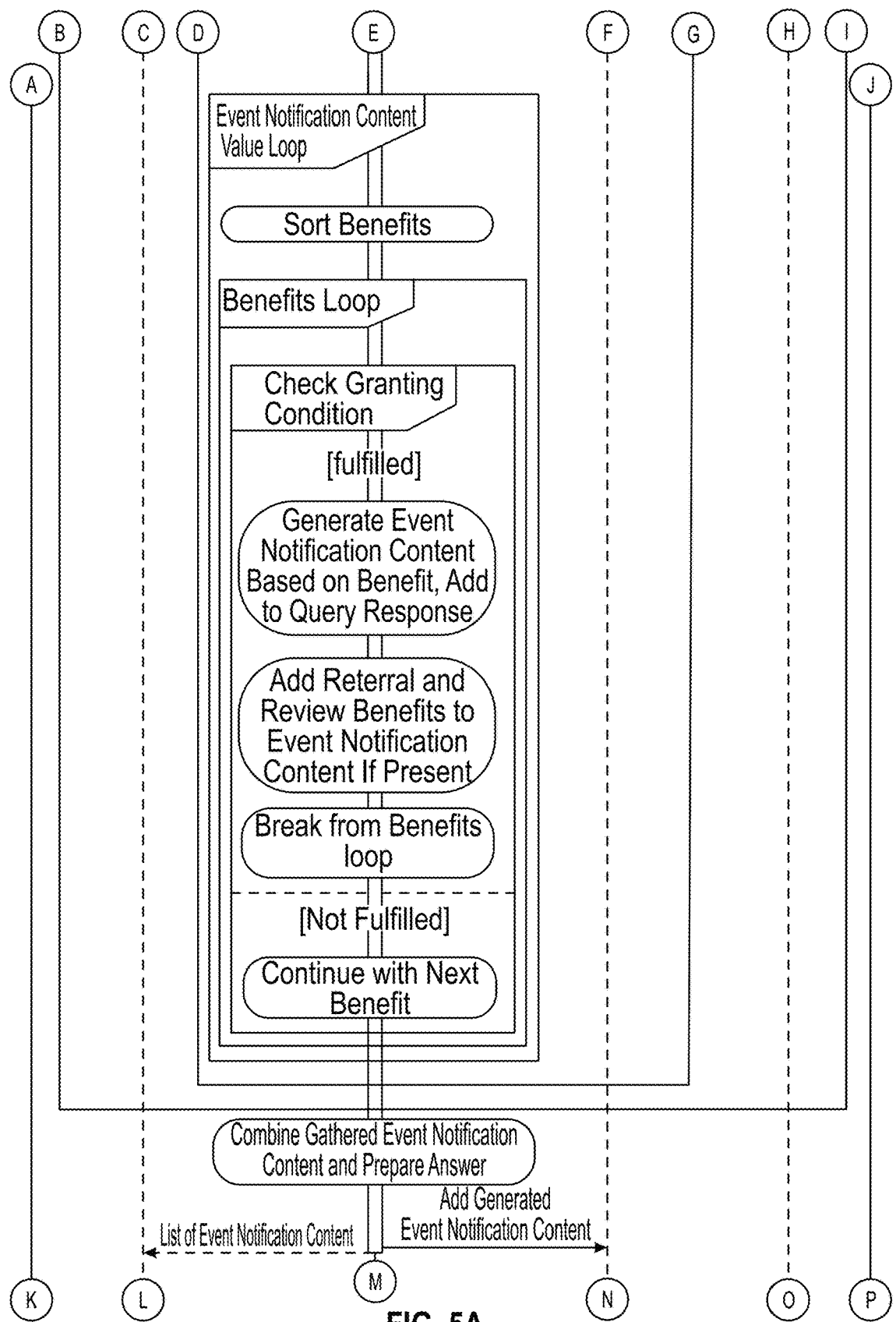

FIG. 5A illustrates an example 500 of a query and query response according to some embodiments. In some embodiments, the user 502 can send an event notification content query to the server 504. The event notification content query can include a specific query request. The event notification content request can include a desired category, such as car wash. The event notification content query can include location information, a time frame (e.g., currently open event notification content), a certain benefit (e.g., over 50% discounts), and/or the like.

In some embodiments, the server 504 can identify event notification contents that were previously not accepted by the user 502. Then the server 504 can indicate to the database 506 to remove not accepted event notification contents from previous queries. Advantageously, more relevant event notification contents can be provided to the user.

In some embodiments, the server 504 can request nearby shop information from the database 506, and the database 506 can transmit the nearby shop data (e.g., content provider data) back to the server 504. For example, the server 504 can request shops within a certain threshold radius of the geolocation of the user 502. The server 504 can request a user profile for the user 502 from the database 506, and the database 506 can transmit the user profile back to the server 504.

In some embodiments, the server 504 begins a shops loops where the server 504 requests matching and enabled event notification values from the database 506. The server 504 can request matching rules of the vendors 508 that provide the event notification contents and apply the matching rules to the retrieved user profile. Then, the server 504 can identify event notification contents that meet the matching rules of the vendor. For example, the vendor 508 may only want customers that wash their car at least once a month, or a customer with an income over $50,000. The server 504 can identify whether the user meets these criteria and pull the corresponding event notification contents for the user. The server 504 can also identify whether an event notification value is enabled, such as not yet expired.

In some embodiments, the server 504 begins an event notification value loop. The server 504 sorts the benefits of the event notification contents, begins a benefits loop, and checks on whether the granting condition has been met. For example, the benefits can be sorted based on a discount amount, a discount type, a granting condition, and/or the like. During the user query, the granting conditions of the benefits are checked starting with the benefit of the highest discount amount to the benefits with lower discount amounts. An example of a granting condition includes a query based granting condition, such as a user's distance to a vendor, a category searched, a desired benefit type, and/or the like. Another example of a granting condition is based on a user profile, such as a number of loyalty points within a time period, history of user queries, time of last visit and/or transaction, whether event notification contents were queried, referred, realized, and/or the like. A third example of a granting condition includes statistics, such as current event notification value statistics, sales benefits, ROI targets, a number of remaining event notification contents (e.g., remaining seats to a show), where in some embodiments, data can be collected from the vendor 508.

In some embodiments, the server 504 can generate a list of event notification contents for each matching event notification value based on the benefit and add the event notification content to the query response.

In some embodiments, the server 504 can add referral and review benefits to the event notification content if present. For example, if the user 502 was matched to the event notification content by another user and/or if the user 502 left a review for the corresponding vendor 508, the server 504 can add additional benefits to the matched event notification content. Then, the server 504 can break from the benefits loop and continue with the next benefit.

In some embodiments, after the event notification contents have been assessed, the server 504 can combine the gathered event notification contents and prepare an answer in the form of a query response. The server 504 can send the generated event notification contents to the database 506 to store the event notification contents that were sent to the user 502, and the server 504 can send the generated event notification contents to the user 502 in the form of a query response.

Figure 5B:
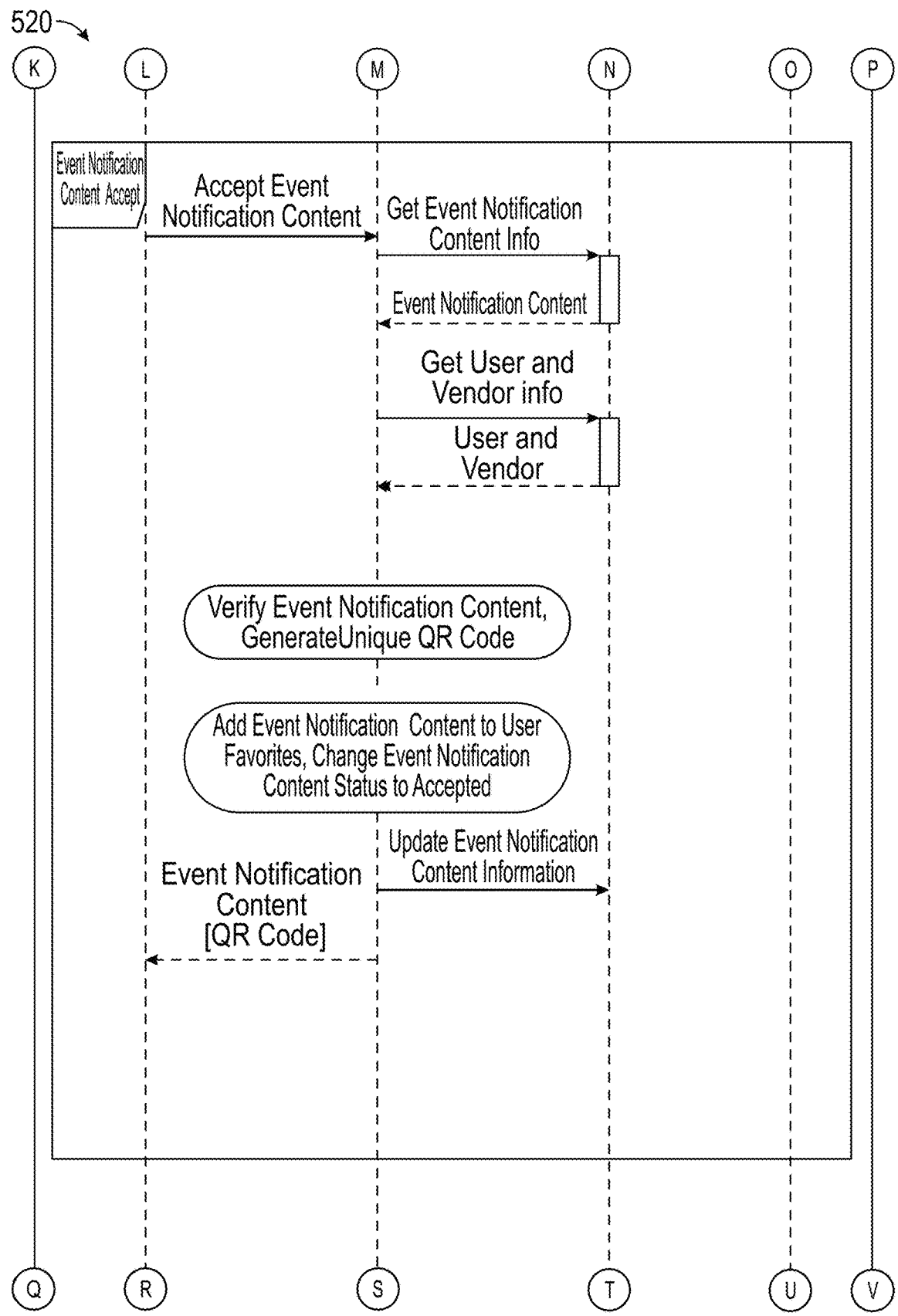
FIG. 5B illustrates an example of a QR code generation for the event notification content according to some embodiments.

FIG. 5B illustrates an example 520 of a QR code generation for the event notification content according to some embodiments. In some embodiments, the user 502 can indicate to the server 504 of accepting an event notification content of interest. The server 504 can request and receive event notification content information from the database 506. The server 504 can then verify the event notification content, and generate a unique QR code for the event notification content. In some embodiments, the server 504 can add the QR code to the user favorites and/or change the event notification content status to accepted or transmitted.

In some embodiments, the server 504 can send an update to the database 506, such as the corresponding QR code. The server 504 can send the QR code corresponding to the event notification content to the user 502.

Figure 5C:
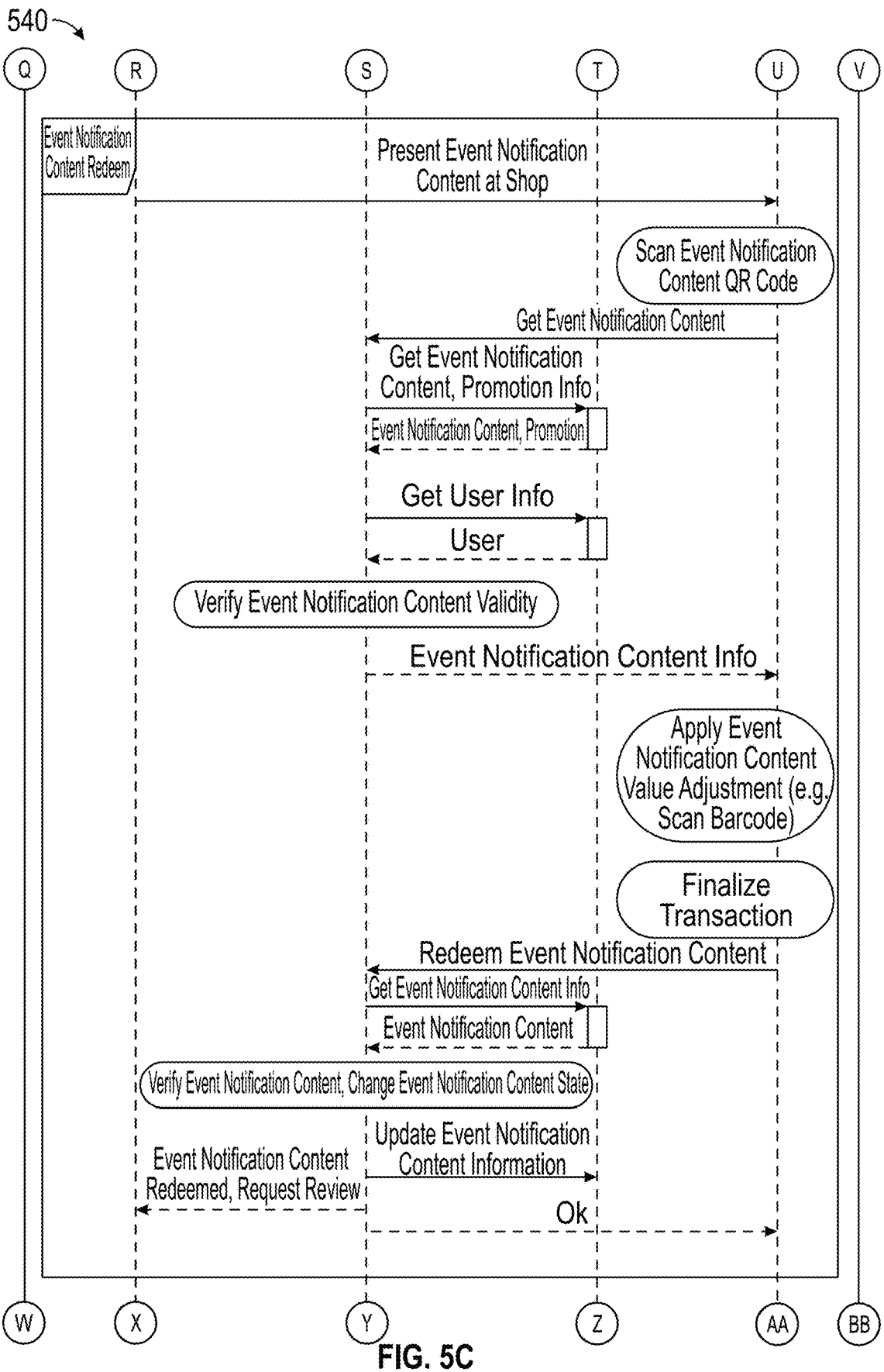
FIG. 5C illustrates an example of redeeming an event notification content using the QR code according to some embodiments.

FIG. 5C illustrates an example 540 of redeeming an event notification content using the QR code according to some embodiments. In some embodiments, the user 502 can present the QE code directly to the vendor 508. The vendor 508 can scan the QR code from the user 502 computing device. Then, the vendor 508 can request to retrieve the event notification content from the server 504.

In some embodiments, the server 504 can request and receive the event notification content and event notification value information from the database 506. The server 504 can request and receive corresponding user information from the database 506. The server can verify the event notification content validity, such as verifying that the event notification content corresponds to the event notification value, benefit, user, vendor, and/or the like.

In some embodiments, the server 504 transmits the event notification content information to the vendor 508 after verification, and the vendor 508 applies the event notification content discount (e.g., by scanning the barcode) and finalizes the transaction with the user 502. The vendor can indicate that the event notification content was redeemed to the sever 504. The server 504 can request and receive the event notification content information from the database 506, can verify the event notification content and change the state of the event notification content as redeemed, and send the updated event notification content information back to the database 506. Moreover, the server 504 can send a confirmation that the event notification content was redeemed to the user 502 and to the vendor 508.

Figure 5D:
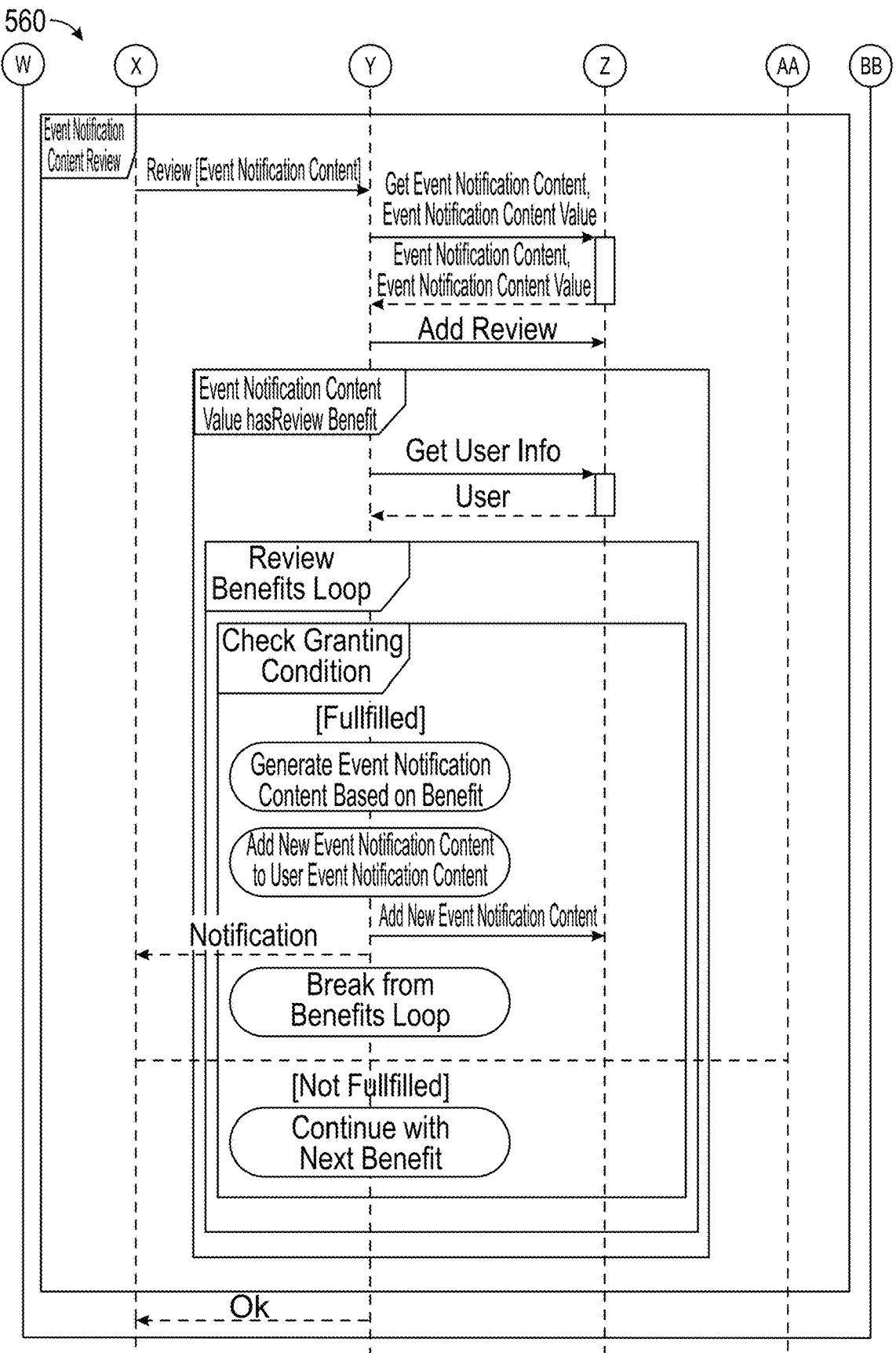
FIG. 5D illustrates an example of leaving a review for the vendor according to some embodiments.

FIG. 5D illustrates an example 560 of leaving a review for the vendor according to some embodiments. In some embodiments, the user 502 can leave an event notification content for the vendor 508 by sending the review to the server 504. The server 504 can request and receive the event notification content and the event notification value from the database 506. The server 504 can then determine whether the review includes an event notification value in the event notification value has review benefit loop.

In some embodiments, the server 504 requests and receives user information from the database 506. The server 504 can begin the review benefits loop and check the grant condition for the review. If the condition is met, the server 504 can generate the event notification content based on the benefit and add a new event notification content to the user event notification contents. The server 504 can then send the new event notification content to the database 506, and a notification can be sent to the user 502 indicating the new available event notification content. The server 504 can break from the benefits loop and continue with the next benefit. If the granting condition was not met, the benefits loop can also be broken and the server 504 can continue to the next benefit. Once all benefits have been verified, the user 502 can be notified by the server 504 of its additional event notification values based on the review.

Example System Flow Diagram for User Referral for Event notification contents

In some embodiments, granted event notifications can be forwarded to other users from the friends list. Suppliers might specify which event notifications can be forwarded to others. Suppliers also determine whether to forward the event notification and/or determine whether the user passed on the event notification.

In some embodiments, forwarded event notification benefits can be recalculated based on recipient profile and/or might differ from the original ones. Suppliers can specify rules for forwarded event notification's benefit calculation. Supplier can specify rules to generate special referral event notifications as a benefit for the forwarding user. Referral event notifications can be granted once the forwarded event notification is realized.

Figure 6A:
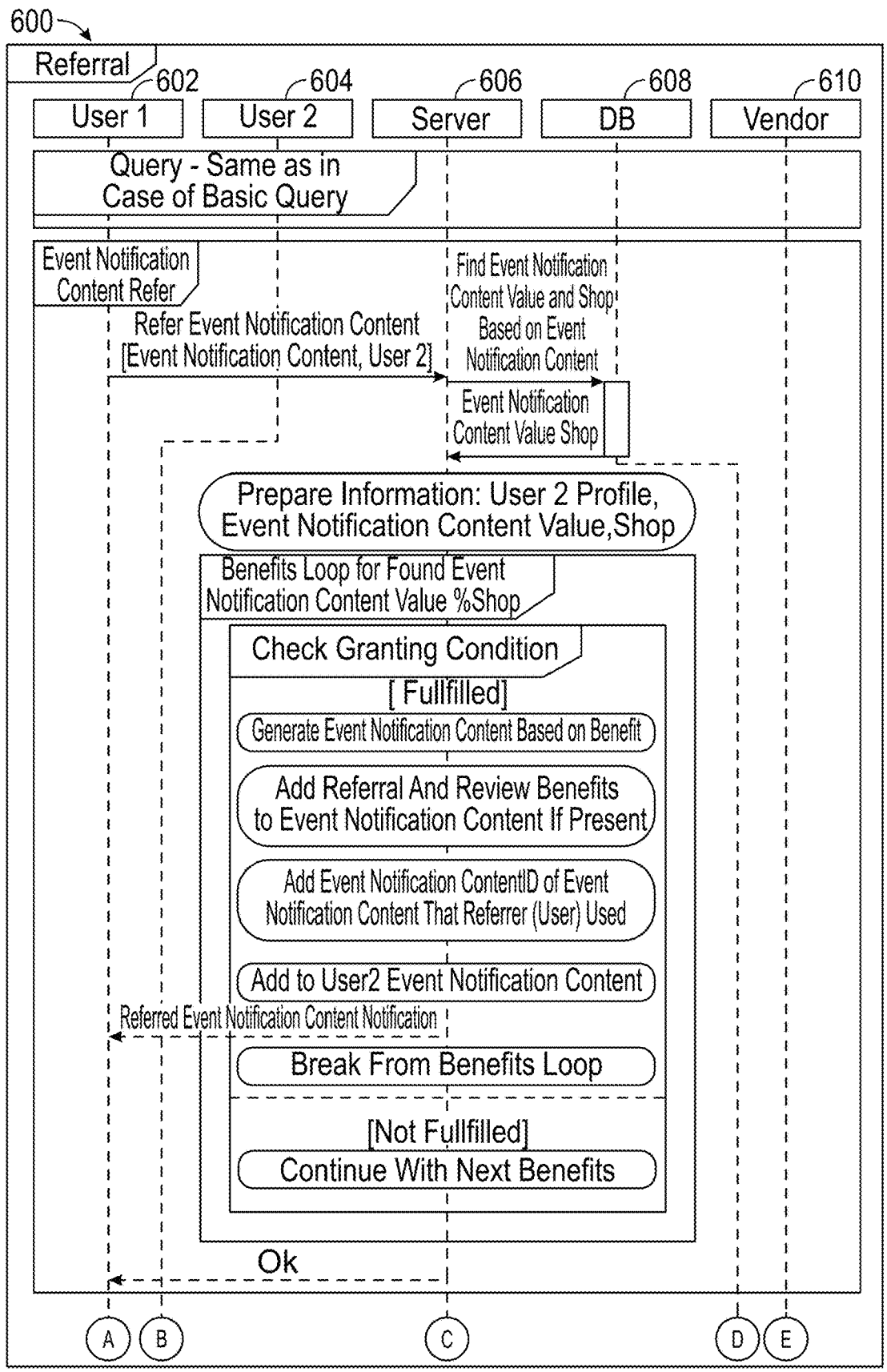
FIG. 6A illustrates an example of a flow diagram for an event notification content referral according to some embodiments.
Figure 6B:
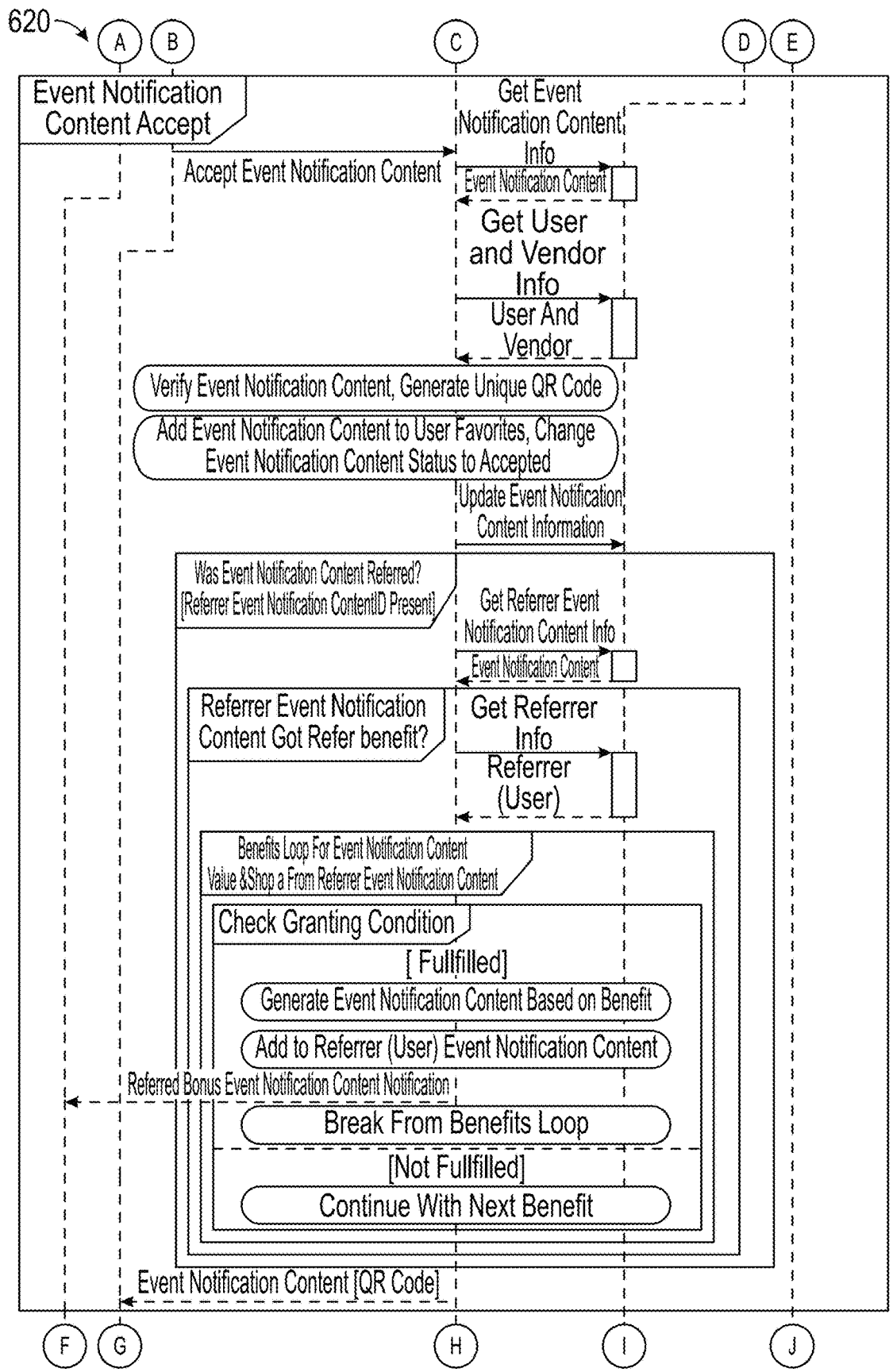
FIG. 6B illustrates an example of a flow diagram for an event notification content accepted according to some embodiments.
Figure 6C:
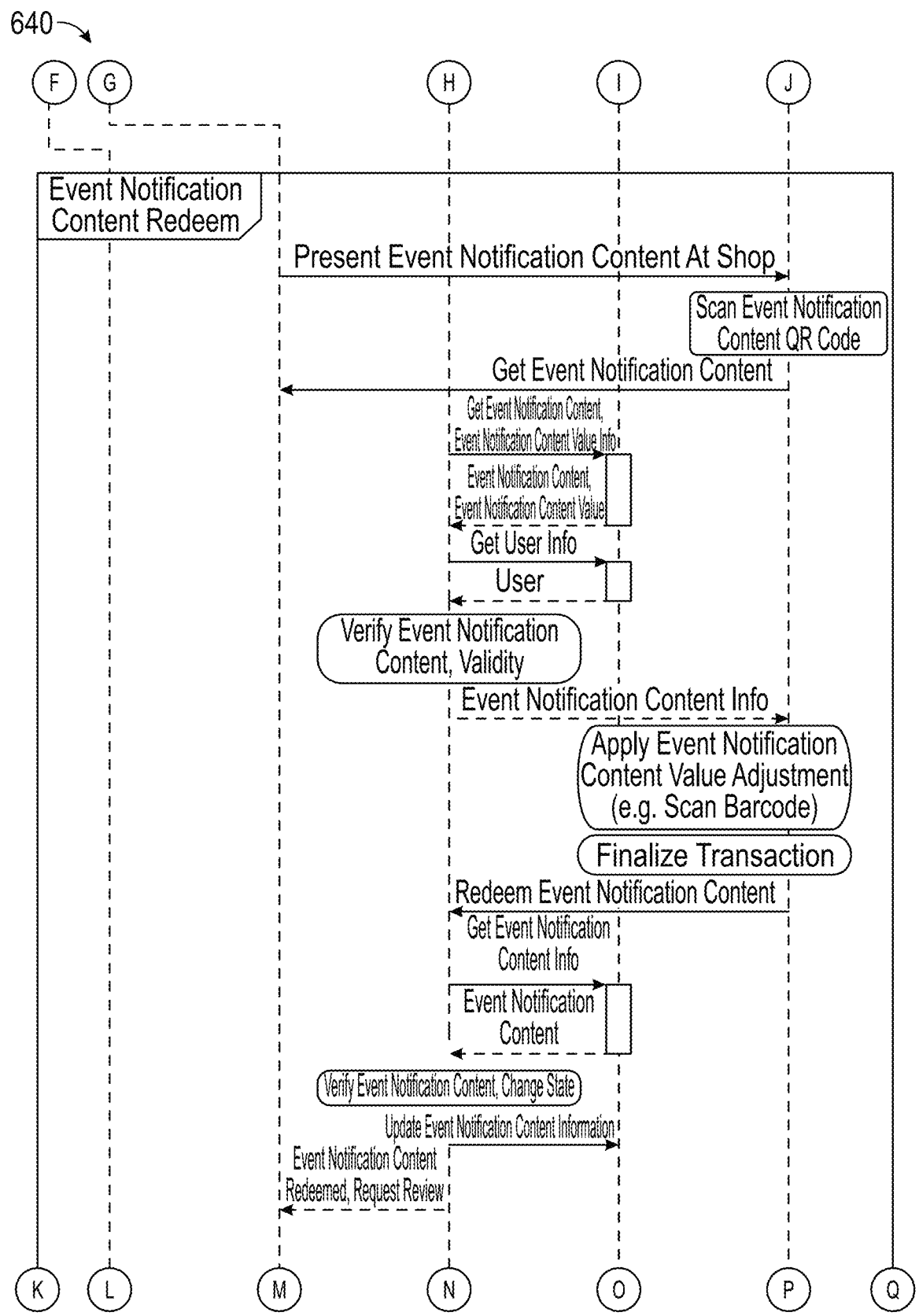
FIG. 6C illustrates an example of a flow diagram for an event notification content redemption according to some embodiments.
Figure 6C:
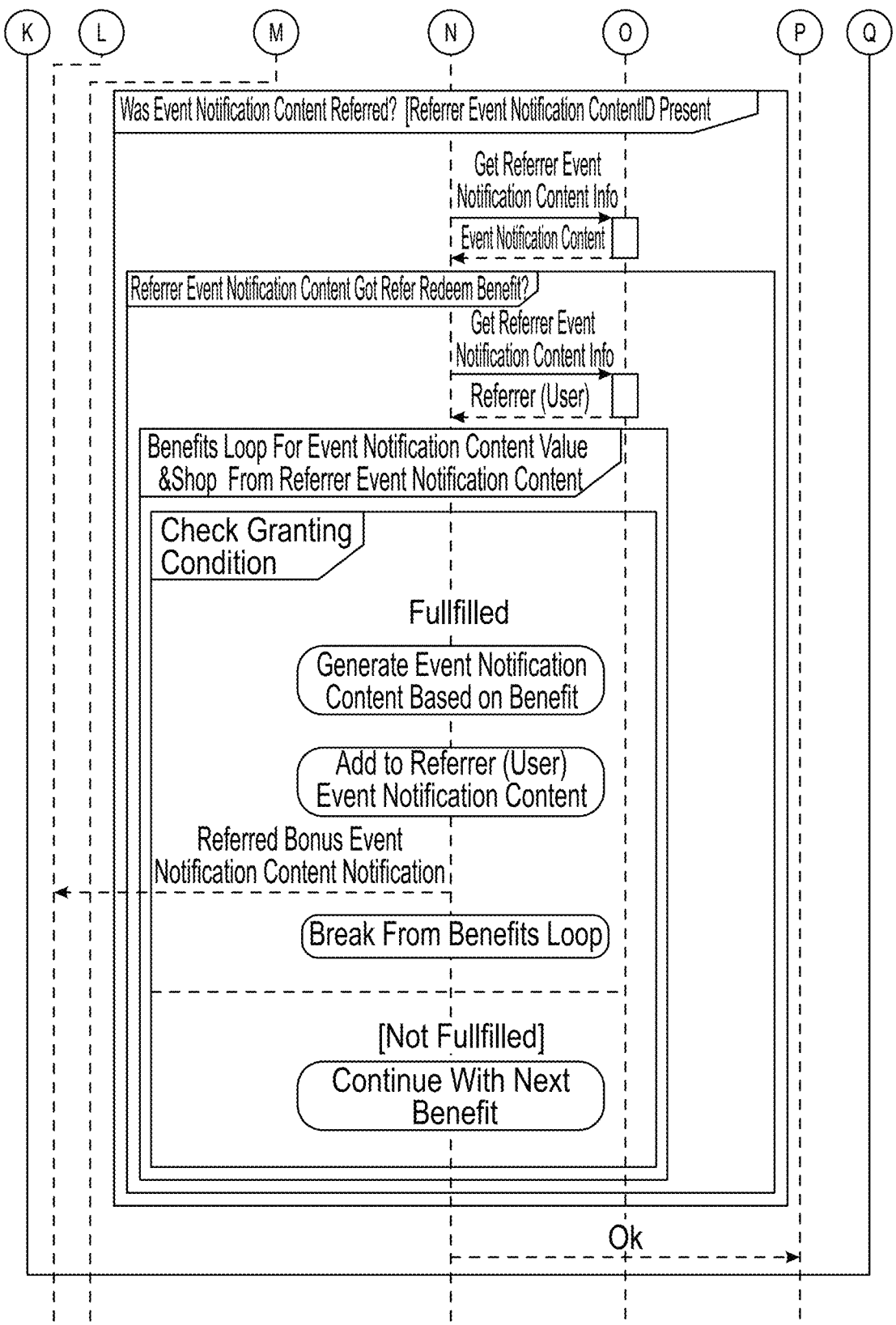

FIGS. 6A-6C illustrate examples of flow diagrams for user referrals according to some embodiments. In some embodiments, the user query flow diagram can include the same steps as in FIG. 5A.

FIG. 6A illustrates an example 600 of a flow diagram for an event notification content referral according to some embodiments. First user 602 can request to refer an event notification content to second user 604 to the server 606. The server 606 can request and receive the event notification value for the event notification content and for vendor information (e.g., shops) from the database 608 based on the received information from first user 602. The event notification values may be different for referrals than for regular query responses, such as additional sets of benefits or different discount amounts. The server 606 can prepare the information to send the event notification content to second user 604. In some embodiments, the first user 602 can select the type of benefit to receive and/or to send to the second user 604.

In some embodiments, the server 606 can begin a benefits loop for the identified event notification values and vendors (e.g., shops) and check the granting conditions. If the granting conditions are met, the server 606 can generate an event notification content based on the identified benefit, such as a percentage discount.

In some embodiments, the server 606 can add the referral benefits and/or review benefits if present. For example, if first user 602 wrote a review for the vendor, then first user 602 may get an additional benefit on top of the referral benefit.

In some embodiments, the server 606 can add the event notification content identifier (e.g., event notification content ID) the referrer (e.g., first user) for the referral benefit and add the actual event notification contents to second user 604.

In some embodiments, the server 606 sends the referred event notification content to second user 604, and the server 606 breaks from the benefit loop to continue to the next benefit. If the check granting condition was not met, the server 606 can also break from the benefit loop to continue to the next benefit. The server 606 can indicate to the referrer first user 602 that the referral was completed to second user 604. The first user 602 can be informed as to the discounts and/or points that the user will receive based on the referral.

FIG. 6B illustrates an example 620 of a flow diagram for an event notification content accepted according to some embodiments. The second user 604 that received the referral event notification content can indicate to the server 606 of accepting the event notification content with the vendor. The server 606 can then receive and request event notification content information and user and vendor information from the database 608. The server 606 can verify the event notification content, and generate a unique QR code for the referrer first user 602.

In some embodiments, the server 606 can indicate that the event notification content has been accepted and add the event notification content to second user 604's favorite list and update the event notification content information with the database 608.

In some embodiments, the server 606 can identify whether the event notification content was referred. If yes, the server 606 can request and receive referrer information from the database 608. Then the server can identify a referrer event notification content by requesting and retrieving referrer information from the database 608 and beginning a benefits loop for the referrer event notification content.

In some embodiments, the server 606 can check whether granting conditions were met for a benefit. If yes, the server 606 can generate an event notification content based on the benefit, add the benefit to a referrer event notification content, and send the bonus event notification content notification to the referrer first user 602. The server can then break from the benefits loop and continue with the next benefit. If the granting conditions were not met for a benefit, the server can also then break from the benefits loop and continue with the next benefit.

In some embodiments, the server 606 can send the generated QR code to the second user 604 for the second user 604 to redeem the referred event notification content.

FIG. 6C illustrates an example 660 of a flow diagram for an event notification content redemption according to some embodiments. The referred first user 604 can present the event notification content at a vendor shop. The vendor 610 can scan the event notification content and send the event notification content information to the server 606. The server can then request and receive event notification content information and user information from the database 608 in order to verify the event notification content.

In some embodiments, the server 606 can send the retrieved event notification content information (such as a discount amount) to the vendor 610 for the vendor 610 to apply the event notification content discount to the transaction with the second user 604.

In some embodiments, the vendor 610 can notify the server 606 that the event notification content has been redeemed, the server 606 can request and receive the event notification content information, and the server 606 can update the status of the event notification content as redeemed with the database 608.

In some embodiments, the server 606 can request verification from the second user 604 of the redemption of the event notification content and requesting review of such redemption. Advantageously, an event notification content cannot be mistakenly redeemed.

In some embodiments, the server 606 identifies whether the event notification content was referred in order to provide the referrer first user 602 with additional benefits of a redeemed event notification content. If so, the server 606 requests and receives referrer information from the database 608.

In some embodiments, the server 606 begins a benefits loop for the referrer event notification content and checks for a granting condition for the benefit. If the condition is met, the server 606 can generate an event notification content based on the benefit, add the referrer event notification content to a referrer message, and send the referrer message to the referrer first user 602 that includes the referrer redeemed event notification content benefit. The server can then break from the benefits loop and continue with the next benefit. If the granting conditions were not met for a benefit, the server can also then break from the benefits loop and continue with the next benefit. In some embodiments, the server 606 can notify the vendor 608 of the completion of the referral event notification content.

Example Communications Diagram With System Database

Figure 7:
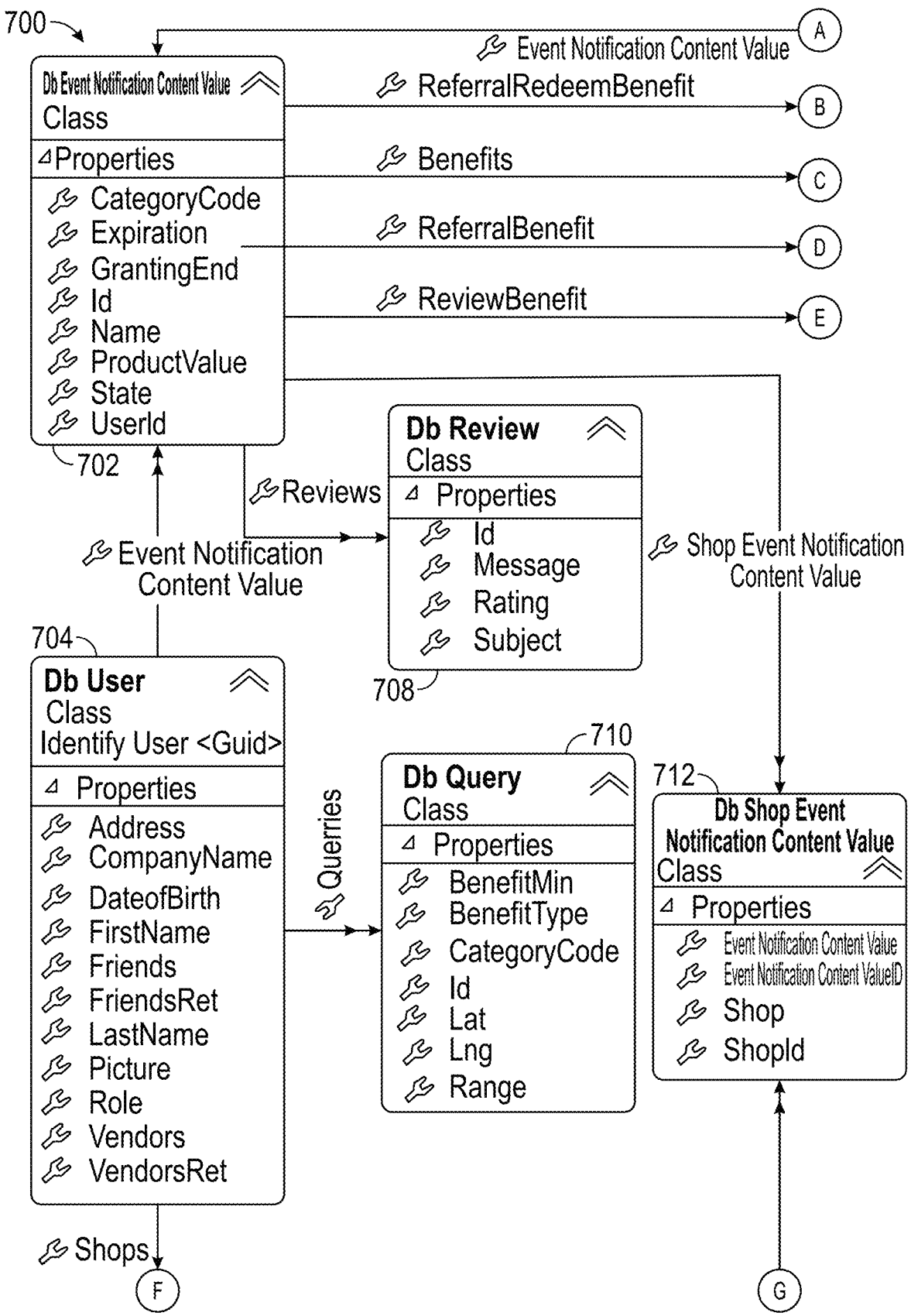
FIG. 7 illustrates an example of a communications diagram between system database tables, according to some embodiments.
Figure 7:
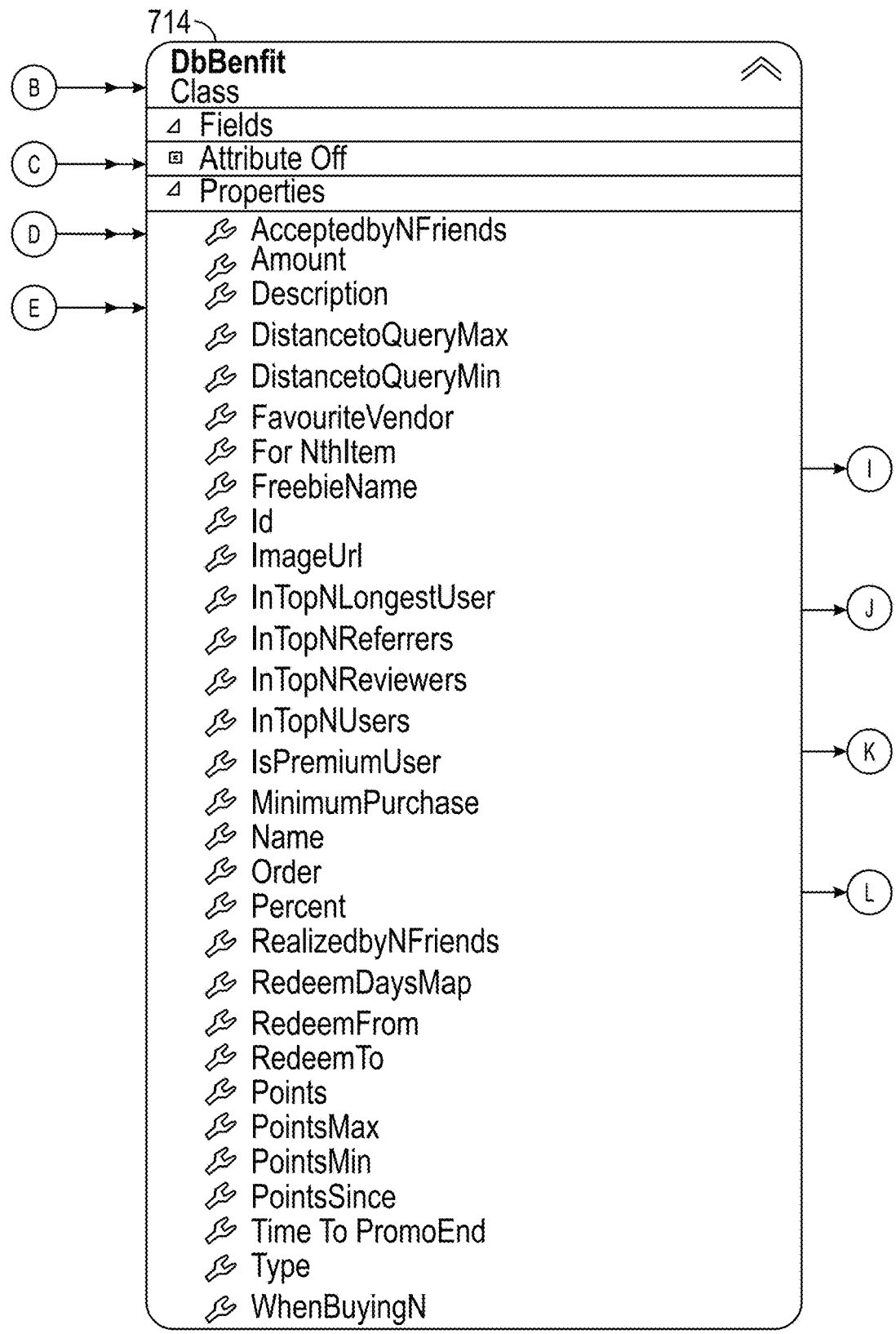
Figure 7:
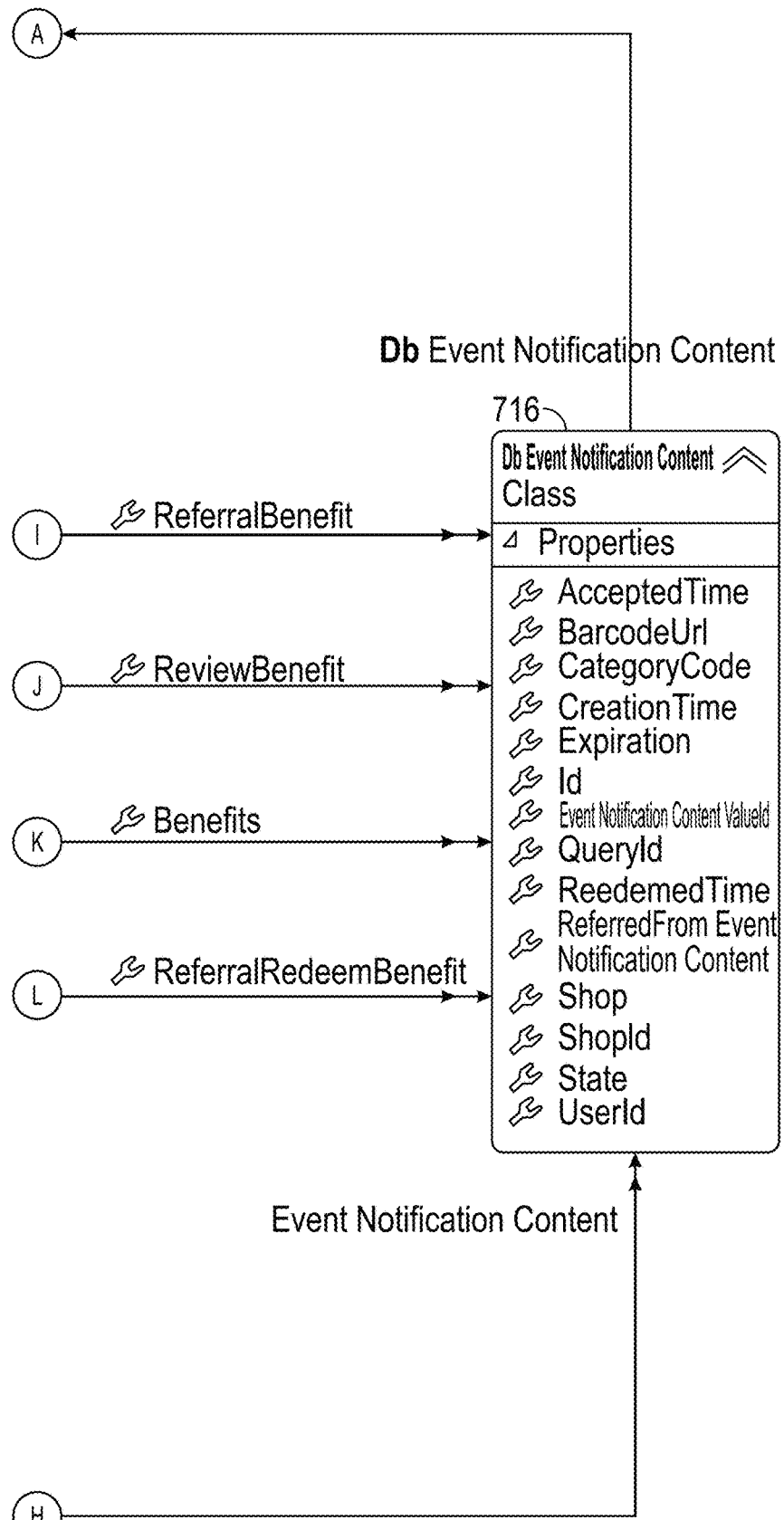
Figure 7:
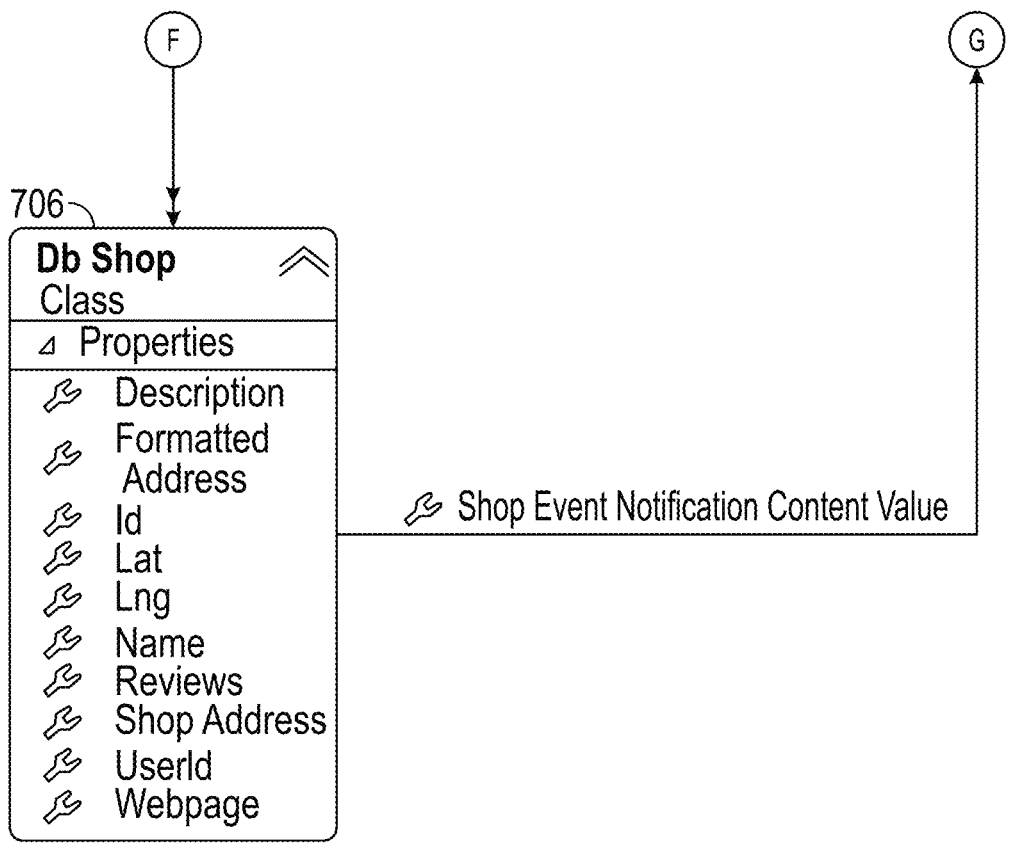

FIG. 7 illustrates an example 700 of a communications diagram between system database tables, according to some embodiments. The example of FIG. 7 includes an event notification value database 702, a user database 704, a shop database 706, a review database 708, a query database 710, a shop event notification value database 712, a benefit database 714, and an event notification content database 716 (collectively referred to herein as databases). In the example of FIG. 7, the databases include SQL tables. However, it is appreciated that other databases can be used.

The event notification value database 702 can include a database of event notification values defined by vendors. Each event notification value can include multiple benefits. The benefits can be grouped into certain categories, such as a query benefit, a referral benefit, a redeem benefit, a review benefit, and/or the like. The benefits can be used to generate event notification contents depending on certain situations, such as if the event notification value is generated based on a user referring an event notification content to another customer or a customer leaving a review for vendor.

The user database 704 can include a database of user profiles. The user profiles can include an authorization information for information associated with the user, such as credit information, personal identifiable information, and/or the like. The authorization can be authorization for the system to access and/or distribute the information. The user profile information can include authentication information, such as an identity authentication based on credit card verification. The profile data can be used for storing profiles for vendors and/or users. The user profile data can include data related to shops, event notification values, event notification contents, and/or queries, such as a user's preference for a type of event notification content or a category of shops.

The shop database 706 can include a database of geographical location and description of vendor sites. For example, the database can include geolocations, a city, a state, a zip code, a webpage, and/or the like. The database can also include information regarding the shop, such as a category of goods and services, event notification values offered, matching rules for the shop, and/or the like.

The review database 708 can include a database for storing user reviews, such as user reviews of the shop.

The query database 710 can include a database of user queries, such as user search terms, user search categories, and/or the like. The database can also include relevant information associated with the query, such as a time of day of the query, the weather, a geolocation where the query was made, and/or the like. The query information can be used for statistical analysis and/or for granting conditional usage of an event notification content.

The shop event notification value database 712 can include a database tying the event notification values to the shops. For example, two shops can want a 20% discount for a customer that is a distance of 5 miles away and 30% discount for a customer that is 10 miles away. the shop event notification value database 712 can link the event notification contents to the two shops.

The benefit database 714 can include a database of benefit descriptions, such as a discount amount, an amount of points granted for a vendor review, and/or the like. Granting conditions can be used to check if the event notification content should be generated based on the benefit.

The event notification content database 716 can include a database of generated event notification contents that point to granted benefits.

The databases include properties that can define the database entries. For example, the event notification value database 702 can include an event notification value name (e.g., "Mike's Car Wash Discount"), an event notification value identifier (e.g., "CW123"), an event notification value category (e.g., "Car Wash"), an expiration date of the event notification value (e.g., "Jan. 3, 2019"), a state of the event notification value (e.g., redeemed, pending, expired).

The databases and/or processors corresponding to the databases can communicate information among each other. In some embodiments, the relations between the tables can be self-referential tables. The self-referential tables can include a special row and/or column within the database that stores the pointers to the other tables. Instead of having to save the benefit characteristics for each of the event notification contents, the event notification content database 716 can include an entry that refers to a benefit in the benefit database 714. Advantageously, the data stored in each of the databases can be reduced by calling a call function (e.g., a database pointer) when a certain data entry in another table is needed. Thus, client computing devices can perform modeling and have more flexibility in assessing large datasets, which previously required large network throughput of data and high processing speed. Moreover, a self-referential table can enable more efficient storage and retrieval of larger sized data, faster searching of the event notifications, event notification values, and benefits, and more flexibility in configuring the database.

The executable instruction set can be generated and deployed to a client computing device (e.g., onto the downloadable electronic file) to automatically adjust the event notification parameters for the preferred outcome (e.g., the desired event notification value). Advantageously, the event notification parameters that were previously stored in the client computing device can be automatically enhanced by the executable instruction set to perform according to the preferred outcome (e.g., increasing the previously set discount amount based on a user characteristic, query, location, and/or the like). The event notification parameters are subsequently and automatically enhanced by the executable instruction set to provide an output that is optimized and/or configured according to the preferred outcome. Thus, client computing devices can solves the technical problem of event notification generation across massive datasets via a practical application of a self-adjusting downloadable electronic file that automatically adjusts event notification parameters within the downloadable electronic file, which previously required large network throughput of data and high processing speed by having to move around the massive datasets for analysis.

In some embodiments, a database can communicate data in one direction, such as shown with a single arrowhead. For example, the event notification content database 716 can communicate the referral benefit, the review benefit, the general benefit, and the referral and review combined benefit to the benefit database 714.

In some embodiments, a database can communicate multiple data files in one direction, such as shown by a double arrowhead. For example, the event notification value database 702 can communicate a property of the event notification contents (e.g., referral and redeem benefits) that includes a collection of pointers to multiple entries in the benefit database 714.

In some embodiments, databases can communicate a collection of pointers to each other. For example, the shop event notification value database 712 can communicate to multiple shops, and each shop may have multiple active event notification values. Both the shop database 706 and the event notification value database 702 can collect a collection of pointers for shop event notification values at the shop event notification value database 712.

Example Heat Map of User Responses to Event notification contents

Figure 8:
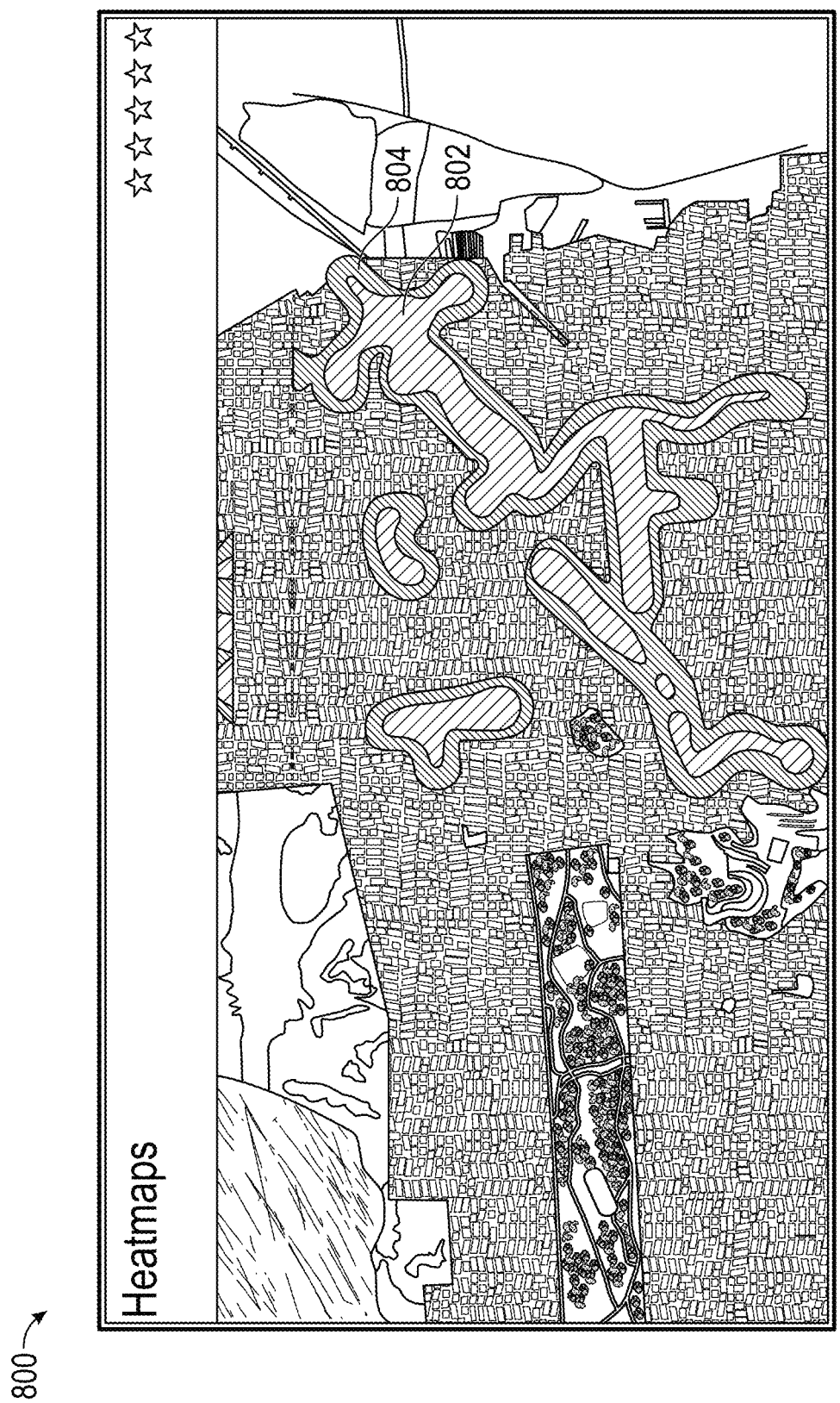
FIG. 8 illustrates an example of a heat map of user responses to event notification contents, according to some embodiments.

FIG. 8 illustrates an example 800 of a heat map for user responses to event notification contents, according to some embodiments. The heat map can include visual indicators that indicate where the users are coming from. Thus, the heat map can show the vendors how to adjust their event notification values to attract the appropriate users from the areas of interest and/or other geographical areas.

The heat map can include a visual indicator 704 that indicates users who have received event notification contents but not yet redeemed the event notification contents. The heat map can also include a visual indicator 702 of users who have redeemed the event notification contents. The vendor can use the heat map to identify which event notification values have the most impact on their sales and adjust the event notification values accordingly to optimize sales. The visual indicators can indicate other characteristics of users and/or vendors, such as users who have queried for a particular event notification content or users who have referred an event notification content to another user.

The heat map can illustrate how vendors should distribute sales, such as distributing sales to other vendor sites located in different geographical locations by adjusting event notification values.

The heat map illustrates a specific graphical user interface that displays event notification contents received data and/or event notification contents redeemed data in a single view overlaid on a map.

The database system can generate a graphical user interface and/or graphical user interface data that optimizes valuable user interface real estate. For example, the database system can provide a display of a heat map of event notifications with visual indicators of event notifications that were distributed, redeemed, referred, and/or the like, and visual indicators of customers that have left reviews for the vendors. Such an improved display interface allows a user to more quickly access desired data stored in the mobile application and/or an external database. Moreover, the visual indicators can include a selectable function (e.g., a button, a summary list, text, radio button) that can launch one or more applications that provide further information to be seen. For example, the visual indicators on the heat map can be selected to display customer information corresponding to event notifications that were referred. Advantageously, the specific and practical manner of displaying the limited set of information to the user via a heat map improves the technical problem for the user interface in electronic devices over conventional systems by enabling the user to identify more relevant data based on geolocation, and more quickly select the relevant data to launch an application for more information related to the selection. Accordingly, the heat map and the visual indicators that correspond to functions that launch applications for more information improve the speed of the user's navigation through various views and windows. The user is saved from navigating to a table of event notification data, opening it up, navigating within the event notification data to identify data of interest and/or functions to be launched. Moreover, the user is saved from paging through multiple screens of options, where the heat map of the database system can enable the user to access the relevant data in response to a single view and a few clicks of the user.

Example Event Notification Value Summary Graph

Figure 9:
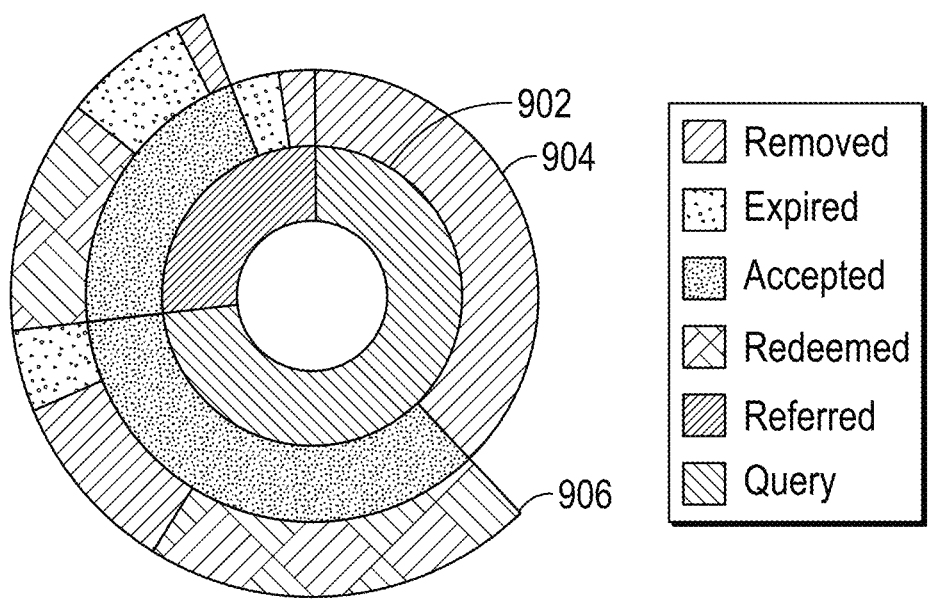
FIG. 9 illustrates an example of an event notification value summary graph, according to some embodiments.

FIG. 9 illustrates an example 900 of an event notification value summary graph, according to some embodiments. The event notification value summary graph can illustrate a hierarchical event notification value summary statistic graph, which can visualize event notification content phases and amount of event notification contents that are accepted, redeemed, removed by the user, and/or expired.

The first hierarchy 902 can include event notification contents that are referred or queried. The event notification contents can be provided to the user based on a user query or if the event notification content is referred to the user. The event notification contents can also be dynamically created, such as based on a close geolocation of the user to a vendor site.

The second hierarchy 904 can include event notification contents that were accepted, expired, or removed. In the example of FIG. 9, the queried event notification contents result in a large amount of accepted event notification contents and removed event notification contents, and no expired event notification contents. The referred event notification contents result in a large number of accepted event notification contents, and a small number of expired and removed event notification contents.

The third hierarchy 906 include results of the accepted event notification contents from the second hierarchy 904. Both the referred and query event notification contents that were accepted have a large number of redeemed event notification contents. The referred event notification contents have a larger percentage of expired event notification contents than those of the queried event notification contents. The queried event notification contents have a larger percentage of removed event notification contents than those of the referred event notification contents.

Example Distribution Time/Distance Diagram

Figure 10:
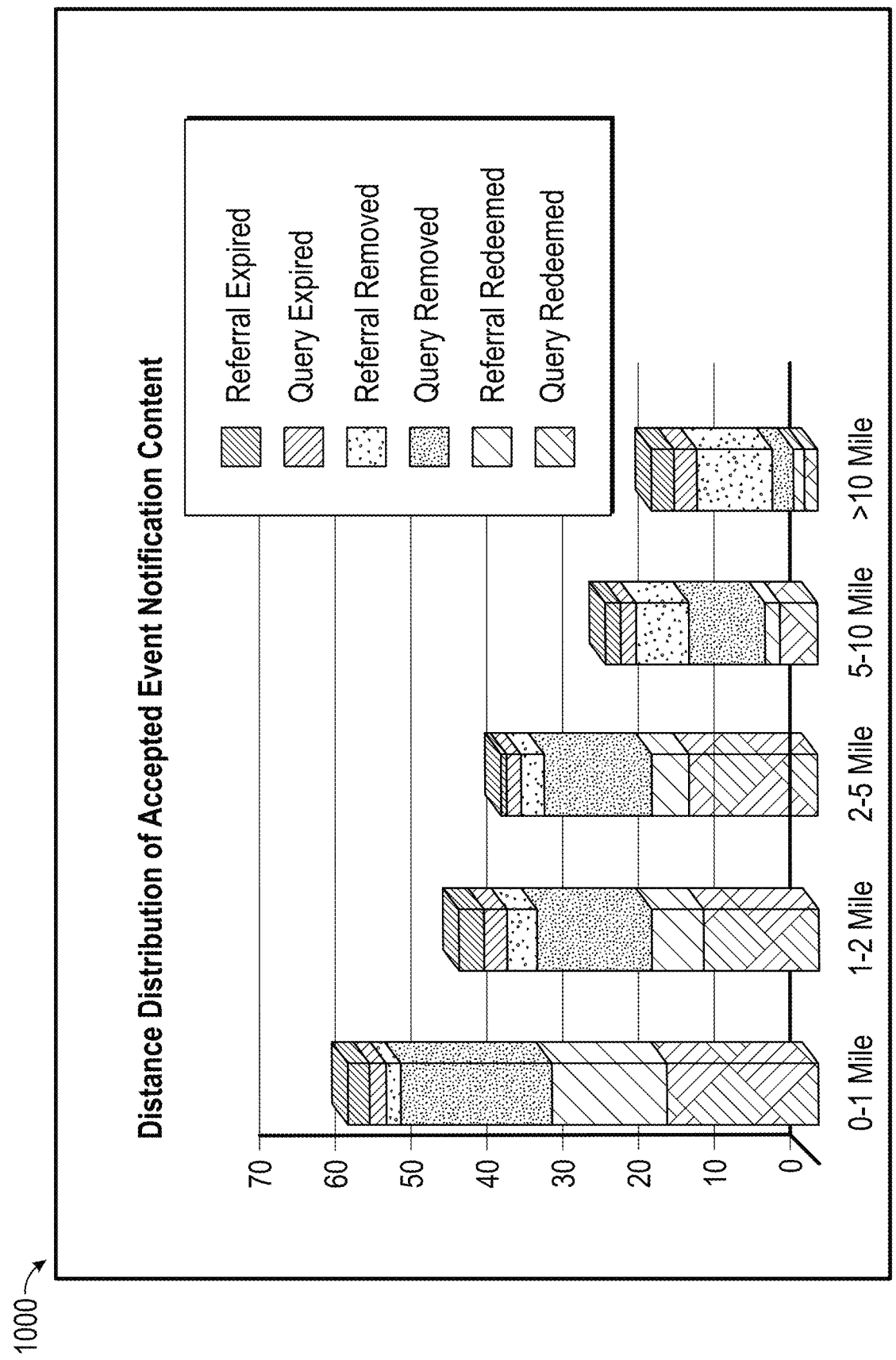
FIG. 10 illustrates an example of a distribution time/distance diagram, according to some embodiments.

FIG. 10 illustrates an example 1000 of a distribution distance diagram, according to some embodiments. In some embodiments, the distribution distance diagram can be displayed for other characteristics, such as queried event notification contents, referred event notification contents, dynamically created event notification contents, redeemed event notification contents, removed event notification contents, expired event notification contents, and/or the like, or a combination thereof. The distribution distance diagram of FIG. 10 illustrates event notification contents that were accepted.

The distribution distance diagram of FIG. 10 illustrates the effectiveness of an event notification content over a distance. As shown, the query event notification contents that are redeemed drop in a large percentage from 2-5 to 5-10 miles. Thus, a vendor may decide to increase the discount amount starting from 5-10 miles. The distribution distance diagram can be used to improve ROI on an event notification content and/or for statistical analysis on effectiveness of an event notification content over distance.

In some embodiments, the diagram can be displayed over time. The number of accepted event notification contents can illustrate how fast certain event notification contents were accepted.

Example Benefits Usage Diagram

Figure 11:
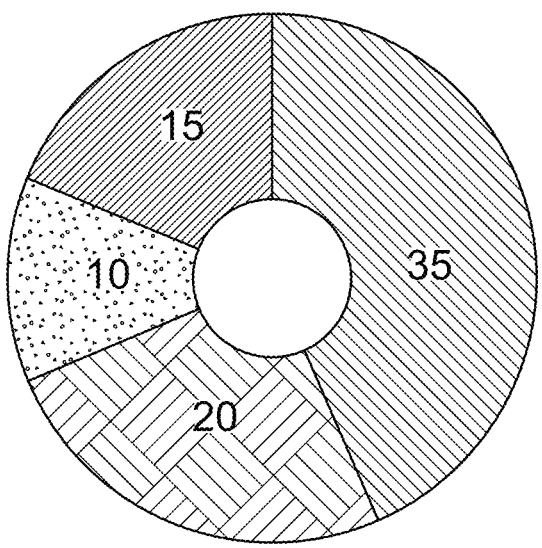
FIG. 11 illustrates an example of a benefits usage diagram, according to some embodiments.

FIG. 11 illustrates an example 1100 of a benefits usage diagram, according to some embodiments. The diagram provides a visual illustration of statistics of the levels of benefits used for a specific event notification value. For example, the diagram can show the benefits of the percentage discount provided to the user. In the diagram of FIG. 11, the benefits illustrate a statistical distribution of event notification contents dispersed for a 10% discount, a 25% discount, a 45% discount, and a 60% discount. The 10% discount can be for all customers, in particular non-new customers with less than 25 loyalty points. The 25% discount can be provided to customers with loyalty points between 25 and 100 loyalty points. The 45% discount can be provided for customers with higher than 100 points. The 60% discount can be provided to new customers.

The diagram of FIG. 11 illustrates that the 10% discount is provided to a greater number of customers than any of the other discounts. The vendor can adjust their event notification value strategy by assessing these statistics, as described further herein.

Example QR Code for Customer Scan

Figure 12:
FIG. 12 illustrates an example of the QR code, according to some embodiments.

FIG. 12 illustrates an example 1200 of the QR code, according to some embodiments. In some embodiments, the QR code can be printed for a customer to scan. For example, the QR code can be printed on a poster and/or an electronic display at the front of a vendor site. Once the customer scans the QR code, such as via a customer's mobile device, an installed electronic file (such as an application) on the mobile device can process the QR code and provide a customized display interface for the user. For example, the electronic file may generate graphical user interface data that includes a personalized menu of discounts provided by the store just for the user. The personalized menu can take into accounts referrals sent, reviews written, loyalty points, and/or the like to provide customized event notification values for the user. The electronic file can run a query based on a scanned QR code, where the query is narrowed to a specific shop and vendor.

In some embodiments, the QR code can be printed on a newspaper, physical mail, an electronic mail, sms message, billboard advertisement, advertisement printed on a car, and/or the like.

In some embodiments, the QR code can be printed on a product or a product shelf. When the user scans the QR code, the electronic file can generate customized pricing to be displayed to the user. Vendors can access the QR code for particular products by accessing specific product event notification values. Vendors can access available event notification values specific to a product and/or to a category of products. Specific product event notification values can be marked as "in store only," which can make the event notification value available only via the QR code on the product or on the product shelf. Vendors may use the vendor electronic file to generate the QR code label for the product.

In an illustrative example, the vendor can create an event notification value with a set of benefits defining different product pricing based on loyalty points. Users with more loyalty points can be offered a higher discount or a better price. In some embodiments, loyalty points can be spent to upgrade a particular event notification value. The upgrade option can be displayed on the mobile device of a user via the electronic file.

In some embodiments, the QR code can be generated for a particular product (e.g., a serial number of shoes). The QR code can be specific to a group of products (e.g., refurbished items or new items). The QR code identifying a product or a group of products can be provided by the vendor to the system. A sticker printer can print the QR codes to be placed on the product, on a product shelf, on a poster wall, and/or the like. In some embodiments, a digital screen can display the QR codes. The electronic file can process the scanned QR codes and allow tracking for returned items or items where the user is requesting warranty.

In some embodiments, the user can be displayed a customized and personalized price in response to scanning the QR code. The user can register the credit card with the system beforehand, and can have the option to pay for the product directly via the electronic file installed on the user device. The electronic file can cause display of notification with receipt and confirmation identifier (e.g., another QR code) that can be used by the vendor to verify the transaction. The vendor can scan the confirmation identifier to get transaction details from the system.

In some embodiments, the vendor can scan the event notification content using the vendor electronic file and request the system to complete the transaction. The user can get notification on the user's electronic file that the transaction was completed. The system can request money transfer from the user's credit card to the vendor's payment system and notify both the vendor and the user upon completion of the payment transfer.

In some embodiments, the QR code can identify one or more products and/or actions. For example, a QR code can indicate a product, a category of products, a shop, a benefit, a particular event notification value, a specific query, and/or the like.

In some embodiments, the QR code can be scanned and the system can identify a vendor profile based on the scanned QR code. System can then retrieve a list of event notification contents for the identified vendor and send the event notification contents to the user.

In some embodiments, a QR code can be scanned and the system can identify a specific vendor location. The QR code can be displayed in front of a vendor store such that a user can scan the code and identify relevant event notification contents available for the store. In some embodiments, the QR code can be scanned offsite, and the system can identify and display the location of the vendor site where the event notification content can be redeemed.

In some embodiments, the QR code can be scanned, and the system can identify a specific vendor's event notification value. The event notification value can be displayed to the user and/or can be printed, an internet event notification content that can be redeemed by displaying a barcode on the user device (e.g., via a downloadable file installed on the user device), and/or the like. For example, the user device can display an advertisement on a search engine stating "scan here to check our pizza discount for you."

In some embodiments, the event notification content can be printed onto a newspaper, event notification content book, advertisement to be physically mailed to the user, displayed as an internet advertisement, sent via electronic mail, and/or the like. The event notification content can be a general event notification value and/or a customized event notification value for the individual.

Augmented Reality and Virtual Reality Devices

In some embodiments, the system can send event notification contents to an augmented reality system, a virtual reality system, and/or the like. A user can use the downloadable file on the augmented reality system to look through a lens, camera, and/or the like. The event notification value can be displayed on top of a newspaper, where the event notification value can be displayed as a virtual event notification content displayed on top of a physical newspaper. In some embodiments, the augmented reality system, virtual reality system (VR/AR), and/or the like can include AR/AR glasses, VR/AR lenses, VR/AR camera, VR/AR headset, and/or the like. The VR/AR device can enable scanning multiple QR codes at once in real time. In some embodiments, the VR/AR device can display and/or print the event notification values on top and/or near the QR codes. For example, a user can view an event notification content book with multiple event notification contents via the VR/AR device, and the VR/AR device can display multiple offers at once, each offer adjusted for the specified user's profile. The user can select the virtual discount via an input, such as by tapping on the event notification content or controlling a pointer, to accept the event notification content.

In some embodiments, the VR/AR device can display door posters at a vendor site, such as adjusted pricing of a restaurant menu for a specific user.

User and User Group Rating

In some embodiments, the user and/or user group rating can include an abstract value or set of values associated with each user or user group calculated based on one or more of, but not limited to:
  user history of realized event notifications
  history of realized event notifications that user forwarded to others
  reviews and feedback provided by user that was rated as helpful by others
  History of purchase transactions associated with realized event notifications like:
    original price
    discounted price
    product category
    time of transaction
    location of transaction Rating of the user group can be calculated based on ratings of its members and/or vice versa. Dynamically calculated rating value can be broken down by category, origin (realized event notifications, referrals, feedback), time and location, and/or the like.

The rating of the user or user group can be normalized across a plurality of suppliers. For example, the ratings of the user or user groups can be normalized based on the transaction price and the discounted price. Furthermore, other transaction parameters can be used to normalize as well as to categorize or break down user or user group rating.

For example, the supplier can include a rule that filters users with ratings above 100 only considering event notifications for electronic equipment from stores in California realized during the last month. Rating points can be gathered by users by realizing event notifications (e.g., $100 spent on discounted articles). Rating points can be also gathered by referrals, reviews, and/or the like.

In-Person Event Notification Distribution

In some embodiments, suppliers using near-field communication ("NFC"), Bluetooth or other location limited technology can distribute event notifications to users that physically visited premises. Such event notifications can be passed using a dedicated application such as a mobile application. Vendors granting event notification contents can include NFC devices to connect with a mobile phone in the vendor's store. The vendor systems can include systems for employees with NFC communication triggers for users to query for event notification values. In some embodiments, certain benefits can only be accessed in-store using NFC devices.

Favorite Supplier Proximity Trigger for Event Notification Query

In some embodiments, users can build a list of favorite suppliers for which event notification query will be generated based on user location proximity to the supplier's premises. User will be notified once the event notifications are generated and ready to use. This feature can eliminate the need to search for event notifications for the specified suppliers. The event notification content query can be automatically triggered by a user device when within a certain distance threshold to a vendor site.

Supplier Loyalty Program Plugin

In some embodiments, users can extend his or her profile with a supplier's existing loyalty program where she or he is a member. Loyalty program ID can be stored in user database and used in the event notification queries as well as during event notification realization. User loyalty program ID can be verified on supplier's server before it is stored in user profile.

In some embodiments, users can receive points for completing a transaction with a supplier. For example, a user can receive a 50% off for their first offer and 20 points to their loyalty program. Any user with 100+ points can get a 25% discount for future offers. Users who refer the supplier to other users can receive 5 points for their referral. If the referred user realized an event notification content, the referrer user can receive an additional $10 off his or her next service of greater than $30. Loyalty points can also be applied to a user when the user completes a review for the vendor. Loyalty points can be spent by a user to upgrade a specific event notification content already received from a query and/or referral to the next benefit level in the same event notification value.

Plugin for Supplier Bar Code Scanner

In some embodiments, software plugins to bar code scanner equipment can provide automated feedback related to realized event notifications and the associated transactions along with regular product bar-code scan. Such systems can combine the step of event notification verification with product/service purchase. Advantageously, automatic detection of product returns can be fed back to the system.

Wish List

In some embodiments, users can specify wish lists as a list of products or categories of interest. Mobile applications can automatically query and notify user about event notifications fulfilling specified criteria. Queries can be triggered based on time (periodic) or based on location (when user change the location). After an event notifications list is built, the system application can provide tools to compare the benefits based on additional parameters (e.g., 20% off vs. $50 off based on specified product price). The user can search for special offers nearby for a longer period of time and/or be notified every time a new, better offer shows up.

In some embodiments, the wish list can include a user's favorite query and/or sets of queries that can be stored by the user's mobile device and/or the server. The mobile device can process the queries to trigger queries to the server at certain time periods and/or based on a proximity trigger. The server can process the queries to check on any new matching event notification values to add to the generated event notification contents for the user.

Shopping List

In some embodiments, users can build a query that span multiple categories and/or products and send to the system as one request. As a response, system can send geographically grouped sets of event notifications that can be compared, such that user can choose the place of interest, such as a place for shopping.

Pay with the Event Notification

In some embodiments, suppliers can grant unique, single user dedicated event notifications for users that connect their credit card information with the profile. User can have possibility to pay for the product/service with the event notification itself. Money transfer can be done directly from user's registered credit card to supplier account and transaction confirmation will be sent to both user and supplier app. The system can verify a user's identify based on credit card information, and can indicate to a content item provider of the user identify verification.

Short Validity Flash Event Notifications

In some embodiments, the database system can generate short validity flash event notifications. Higher benefit event notifications can be generated for sports events, movies at a theater or concerts in response to queries issued few hours before the event and with very short validity. Flash event notifications can be useful to fill in the empty spots last moment.

Universal Event Notifications

In some embodiments, supplier can query for a top number of users to send discount event notifications or referral benefit event notifications (e.g., forward to friends, get $10 discount once they use it) to their users.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 13:
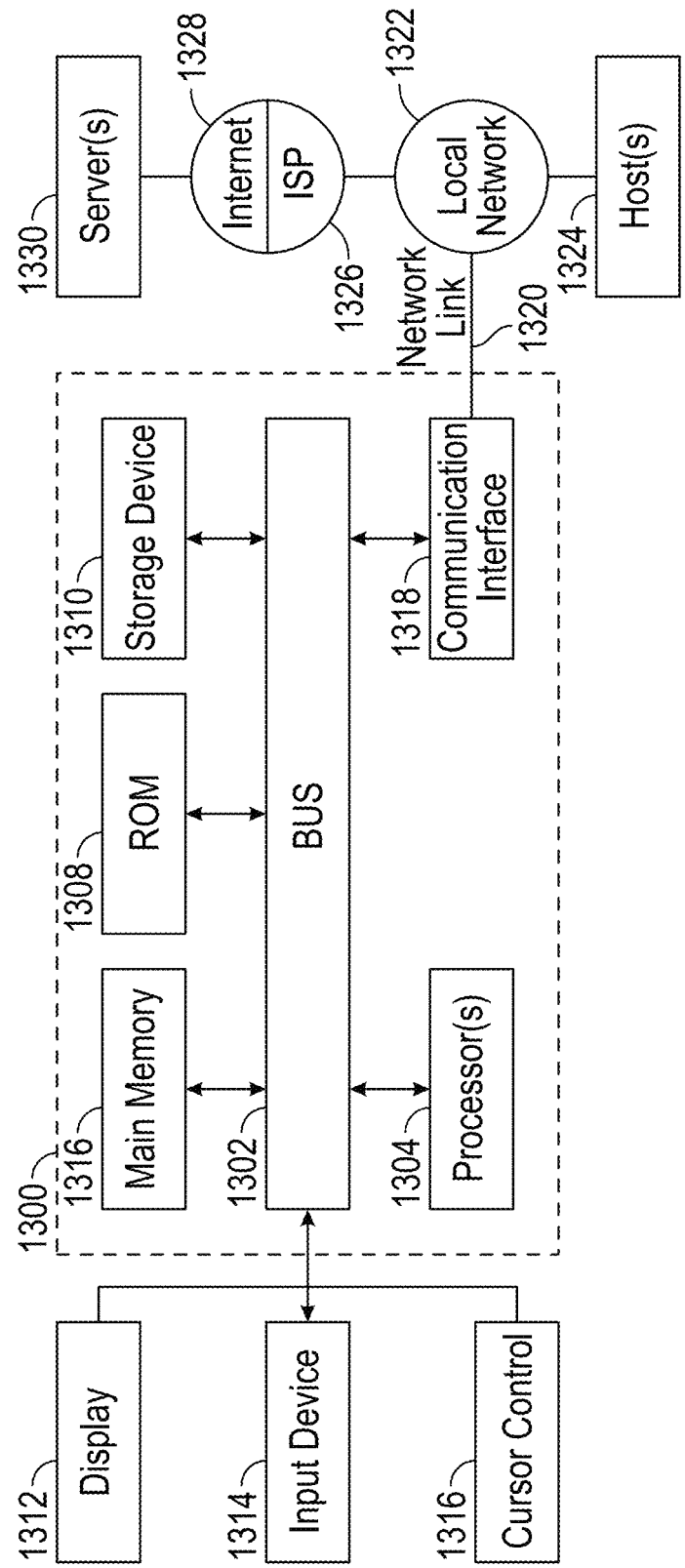
FIG. 13 illustrates a computer system with which certain methods discussed herein may be implemented.

For example, FIG. 13 is a block diagram that illustrates a computer system 1300 upon which an embodiment may be implemented. Computer system 1300 includes a bus 1302 or other communication mechanism for communicating information, and a hardware processor, or multiple processors, 1304 coupled with bus 1302 for processing information. Hardware processor(s) 1304 may be, for example, one or more general purpose microprocessors.

Computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

Computer system 1300 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Example forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or wide area network (WAN) component to communicated with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Merchant Location Service Based on Scan of User Unique Identifier Embodiment

Figure 14:
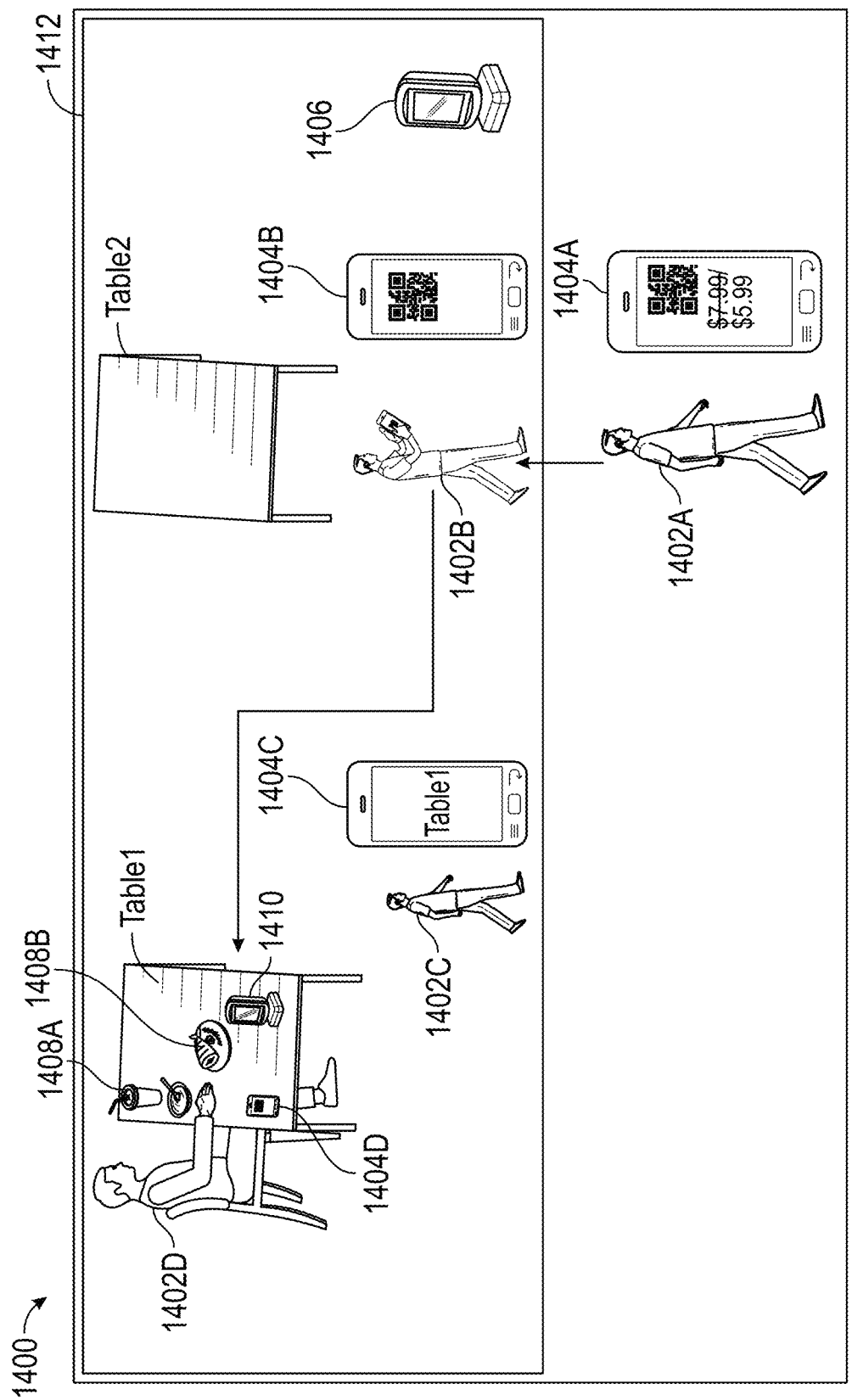
FIG. 14 illustrates an example of merchant location service based on a scan of a user unique identifier, according to some embodiments.

FIG. 14 illustrates an example 1400 of merchant location service based on a scan of a user unique identifier, according to some embodiments. In some embodiments, the database system can identify a change in a user record or a query to the database corresponding to a user 1402A, 1402B, 1402C, 1402D (collectively referred to herein as user 1402). In response to the change or query, the database system can generate an event notification, such as an indication of a promotion for a restaurant.

In some embodiments, the event notification can be displayed on a user device 1404A, 1404B, 1404C, 1404D (collectively referred to herein as user device 1404). The user 1402A can view an event notification on the user device 1404A displaying a discounted price for a meal of $7.99 to $5.99. The user device 1404A can display a unique identifier, such as a QR code.

In some embodiments, the user 1404B can enter a merchant location 1412, such as a restaurant. The restaurant can include a QR scanner 1406 at the front of the restaurant. The user 1404B can scan the QR code displayed on the user device 1404B at the QR scanner 1406. Then, the restaurant system can determine what products or services the user is requesting.

In some embodiments, the restaurant system can determine available seating for the user. In other embodiments, the user 1402C can select a table on the user device 1404C. The user 1402C can view an available and/or assigned table (e.g., table 1) displayed on the user device 1404C. After the user 1402D is sitting at table 1, the user 1402D can scan the QR code displayed on the user device 1404D on another QR scanner 1410 on or near table 1. The other QR scanner 1410 can retrieve information that the user 1402D is sitting at table 1, and transmit the information to the restaurant system. The restaurant system can indicate to workers at the location that the user 1402D is sitting at table 1, and the staff workers can provide meals 1408A, 1408B, or other requested services or products, to the user 1402D.

In some embodiments, payment for the goods and services are made on the user device 1404. The user can store payment information, such as credit card information or other sensitive information, with the database system. Then, the database system can send payment via its own payment platform to the merchants. Advantageously, user payment information is not relayed to the merchant, providing enhanced data security and privacy. In some embodiments, the database system can employ data encryption technology when sending payment information to the merchants, that a user would typically not employ when sending credit card information to a merchant point of sale system. In some embodiments, the database system can facilitate payment by accepting payment from the user credit card on the cloud side. The merchant point of sale system would only receive the user's unique identifier (e.g., QR code) and the database system can separately make payment to the merchant. In other embodiments, the user can use third party online payment services separate from the database system.

In some embodiments, the database system can receive encrypted code, or a token, from a third party server, such as a bank server or payment platform. The third party server can perform tokenization by replacing sensitive data with unique identification symbols that retain the essential information about the data without comprising its security. The third party server can encrypt credit card information and generate a token that corresponds to the credit card information of a user to the database system. The database system can apply the token to point of sale systems, such that when a user makes a purchase at a point of sale system, the database system can transmit an indication of a payment amount to the third party server via the token. The third party server can initiate payment by decrypting the token and/or identifying credit card information corresponding to the token. Advantageously, only the third party server can have access to credit card information and other sensitive data, whereas the database system and the point of sale systems can facilitate transactions using the token.

In some embodiments, the database system can retrieve statistics on users at the vendor, such as preferred table seating. Users may prefer table 2 over table 1 for its close location to the front door. As such, the database system can indicate that the user sit at table 1 to allow others to sit at table 2. In some embodiments, the point of sale system local to the merchant can provide service at several service points (e.g., tables in restaurant, car wash stations) where each service point can include a unique identifier scanner. The user (e.g., shopper) can go to the user's favorite or convenient service point (e.g., table 1), and scan the code on his mobile device at the unique identifier scanner. The point of sale system can initiate service to be delivered to that service point. As each service point scanner can be associated with its own service point ID, and users are free to choose their service point of preference, and the merchant can get statistics on the most favorite service points of individual users. Then, the point of sale system can, at a later time, assign the user or reserve the service point for the user upon notice that the user is en route to the merchant location. In some embodiments, the database system can gather and analyze statistics on service points across a plurality of different users, and provide recommendations to the merchant (such as a recommendation to rearrange the location of the service points due to an unbalanced preference of service point locations). For example, service points that are close to the windows or entrances may be preferred by users. The system can identify this characteristic and angle and/or position service points (e.g., tables and chairs) to maximize user seating at these locations.

In some embodiments, collection of the user device 1404 and the QR scanners 1406, 1410 can eliminate or reduce the need for a host at a restaurant. The user 1402 can place orders, receive discounts and promotions, be assigned seating, and indicate readiness to receive goods and services without contact with a human, necessarily rooting the embodiments in computer technology (such as for car wash stations, window shopping to pick up orders, etc). Moreover, the embodiments described herein are not just performing actions that a human would perform, but performing such actions in a different and more effective way. The orders and promotions/discounts are performed remotely on a user device that connects to the database system. The database system identifies discounts and promotions specific for the user based on a user profile that includes information such as loyalty points, distance from the merchant location, referrals, last visit statistics, and/or other characteristics described herein related to smart pricing and/or discounts/promotions. Advantageously, prices are personalized to the user, and different users may receive different event notification contents, with different pricing and discounts/promotions. The personalized prices and/or discounts are provided to the user remotely and can incentivize users to visit the merchant store differently (e.g., 50% discount for 5 miles away to a first user based on the first user conversion rate vs. 25% discount for a user who frequently visits the store to a second user after not having visited the store in several weeks). Thus, targeted advertising can be much more efficient and specifically tailored to the needs of the user.

Figure 15:
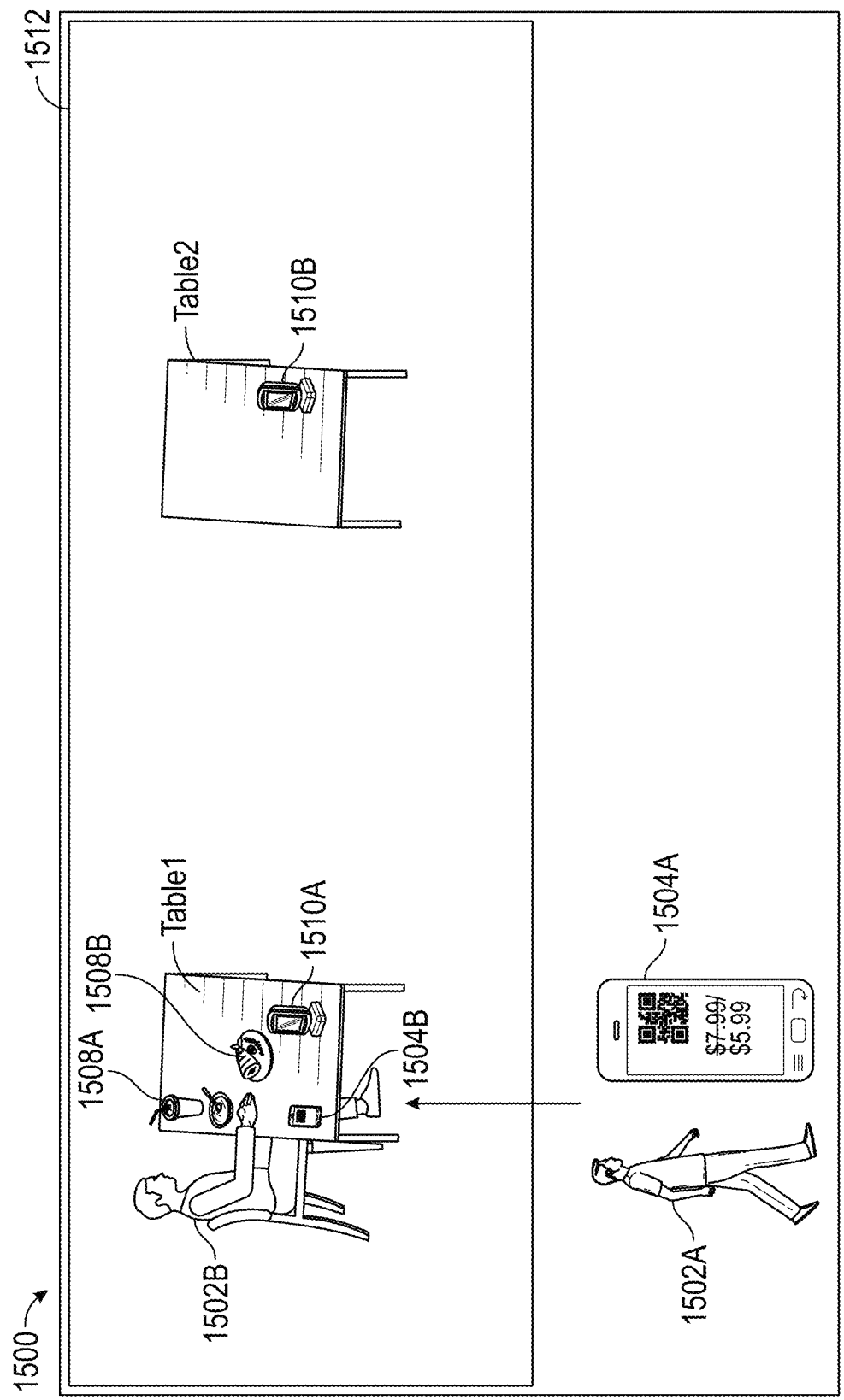
FIG. 15 illustrates an example of merchant location service based on a scan of a user unique identifier at a table location, according to some embodiments.

FIG. 15 illustrates an example 1500 of merchant location service based on a scan of a user unique identifier at a table location, according to some embodiments. In some embodiments, the database system can identify a change in a user record or a query to the database corresponding to a user 1502A, 1502B (collectively referred to herein as user 1502). In response to the change or query, the database system can generate an event notification, such as an indication of a promotion for a restaurant.

In some embodiments, the event notification can be displayed on a user device 1504A, 1504B (collectively referred to herein as user device 1504). The user 1502A can view an event notification on the user device 1504A displaying a discounted price for a meal of $7.99 to $5.99. The user device 1504A can display a unique identifier, such as a QR code.

In some embodiments, the user 1504B can enter a merchant location 1512, such as a restaurant. The restaurant can include a QR scanner 1510A, 1510B (collectively referred to herein as QR scanner 1510) at one or more tables, such as table 1 and table 2. The user 1504B can scan the QR code displayed on the user device 1504B at the QR scanner 1510A. Then, the restaurant system can determine what products or services the user is requesting. The QR scanner 1510A can retrieve information that the user 1502A is sitting at table 1, and transmit the information to the restaurant system. The restaurant system can indicate to workers at the location that the user 1502A is sitting at table 1, and the staff workers can provide meals 1508A, 1508B, or other requested services or products, to the user 1502B.

Point of Sale (POS) System Embodiments

Figure 16:
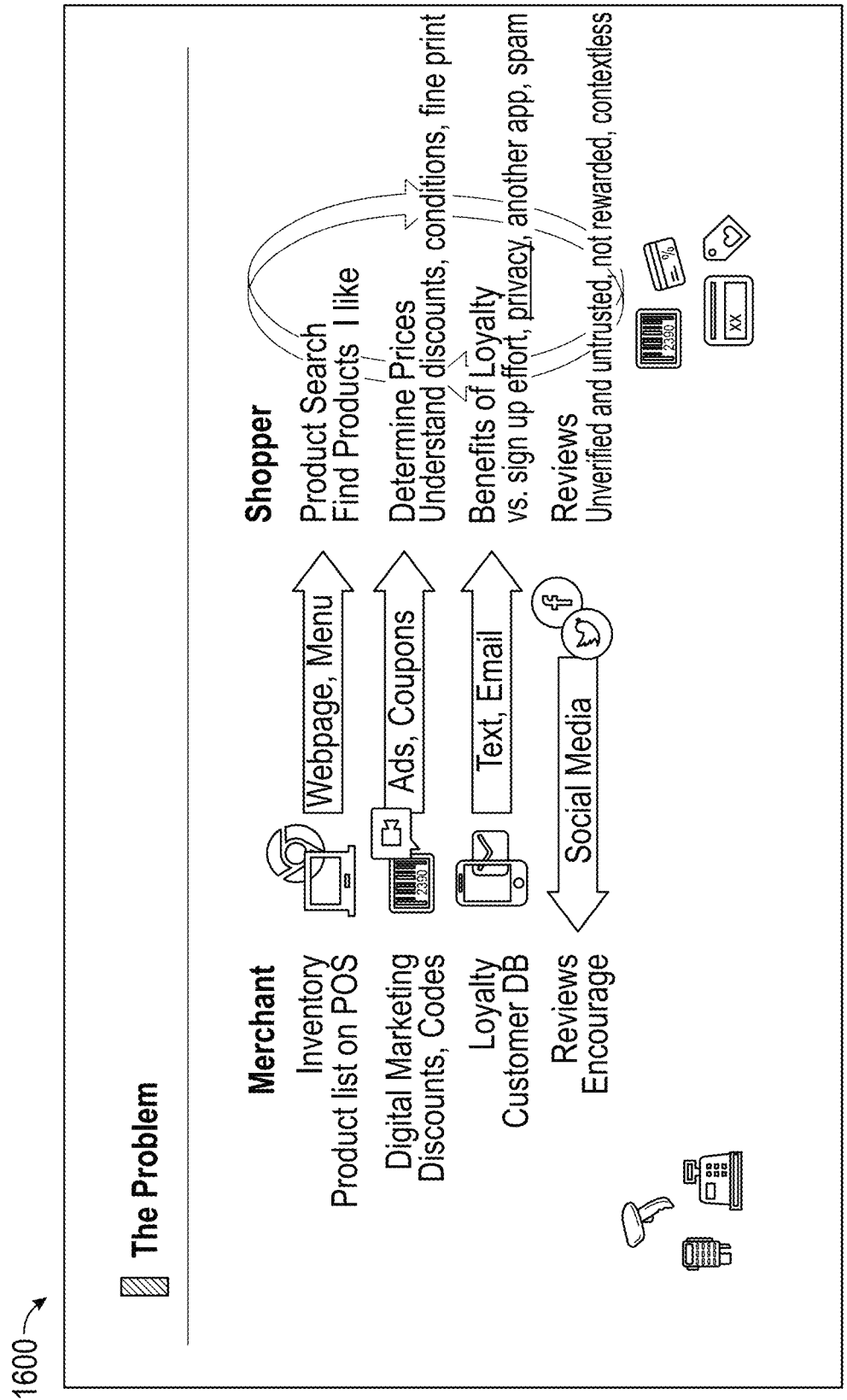
FIG. 16 illustrates an example of a traditional point of sale system between the merchant and the shopper.

FIG. 16 illustrates an example of a traditional point of sale system between the merchant and the shopper. The merchant can operate a point of sale system where inventory of products can be stored on the point of sale. The point of sale system can generate a website and menu options to display inventory and enable users (or shoppers) to search and find products of interest. In some embodiments, the merchant point of sale system can reside fully or at least partially on the cloud. For example, inventory and user query on the merchant websites or the mobile applications can be stored in the server.

The point of sale system can generate digital marketing discounts and codes and display advertisements and codes to the shopper. The point of sale system can determine loyalty points of a user using the point of sale system for the merchant. The point of sale system can provide a platform for users to provide reviews and engage in social media activity on the merchant's point of sale system. In some embodiments, the point of sale system can provide an end discounted price to the user. The user can be notified of a breakdown or actions required to receive an even better price, such as a special discount for referrals. As such, the user can get more transparency on price using a single QR code, and can have other optional prices based on further action by the user.

However, such traditional point of sale systems are limited to the data that the merchant has on the user, such as the user's prior search history on the merchant's website or the merchant's activity on the website. The point of sale system typically provides coupons general to all users, such as a 25% off sale between April 1 through April 15$^{th}$. Moreover, the reviews and loyalty points are also limited to the merchant's database and point of sale system related databases.

Moreover, for a database system to integrate to these merchant point of sale systems to overcome these technical disadvantages can be difficult from a technical standpoint. Each merchant point of sale system can differ in communication methods and channels. For example, certain point of sale systems can use certain communication protocols over others, store certain information or not store certain information that others do or don't, may relay information upon a user performing a first action but not when a user performs a second action, and/or the like. Such integration across different point of sale systems can cause inefficiencies in communication between databases and missing data entries.

Figure 17:
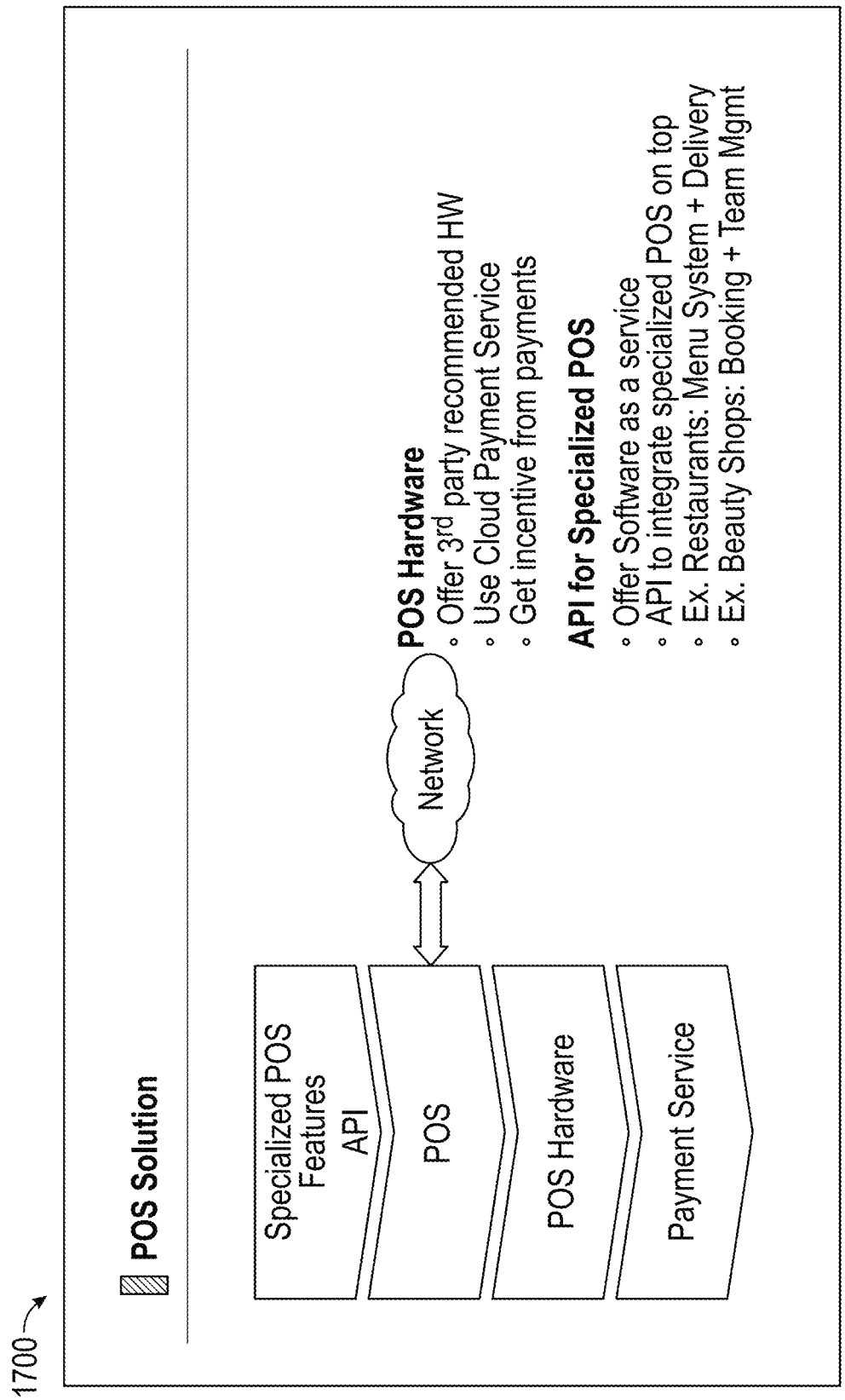
FIG. 17 illustrates an example of a point of service solution, according to some embodiments.

FIG. 17 illustrates an example 1700 of a point of service solution, according to some embodiments. The database system can include point of sale software to integrate with existing point of sale software and/or a standalone point of sale software. The point of sale software that integrates with existing point of sale software can integrate without having the merchant change their point of sale systems. For example, the database system can provide features to existing point of sale systems (via software and/or hardware) for checkout service to make payment on behalf of the user.

In some embodiments, the point of sale software is executed by one or more processors on a terminal (e.g., tablet, phone, personal computer, etc.), with point of sale hardware, such as associated hardware including a QR scanner, near field communication (NFC), receipt printer, cash drawer, scales, etc. The point of sale software can include software running locally at the point of sale and/or software running on a remote server or on the cloud server. The terminal can be connected to the network to access a merchant account and can provide a merchant interface to access the cloud point of sale server. Sensitive information (such as personal identifiable information for the user) and/or all sensitive processing (such as the processing of such sensitive information) can be performed remotely to provide data security on sensitive information.

Cloud Based Point of Sale (POS) System Embodiments

Figure 18:
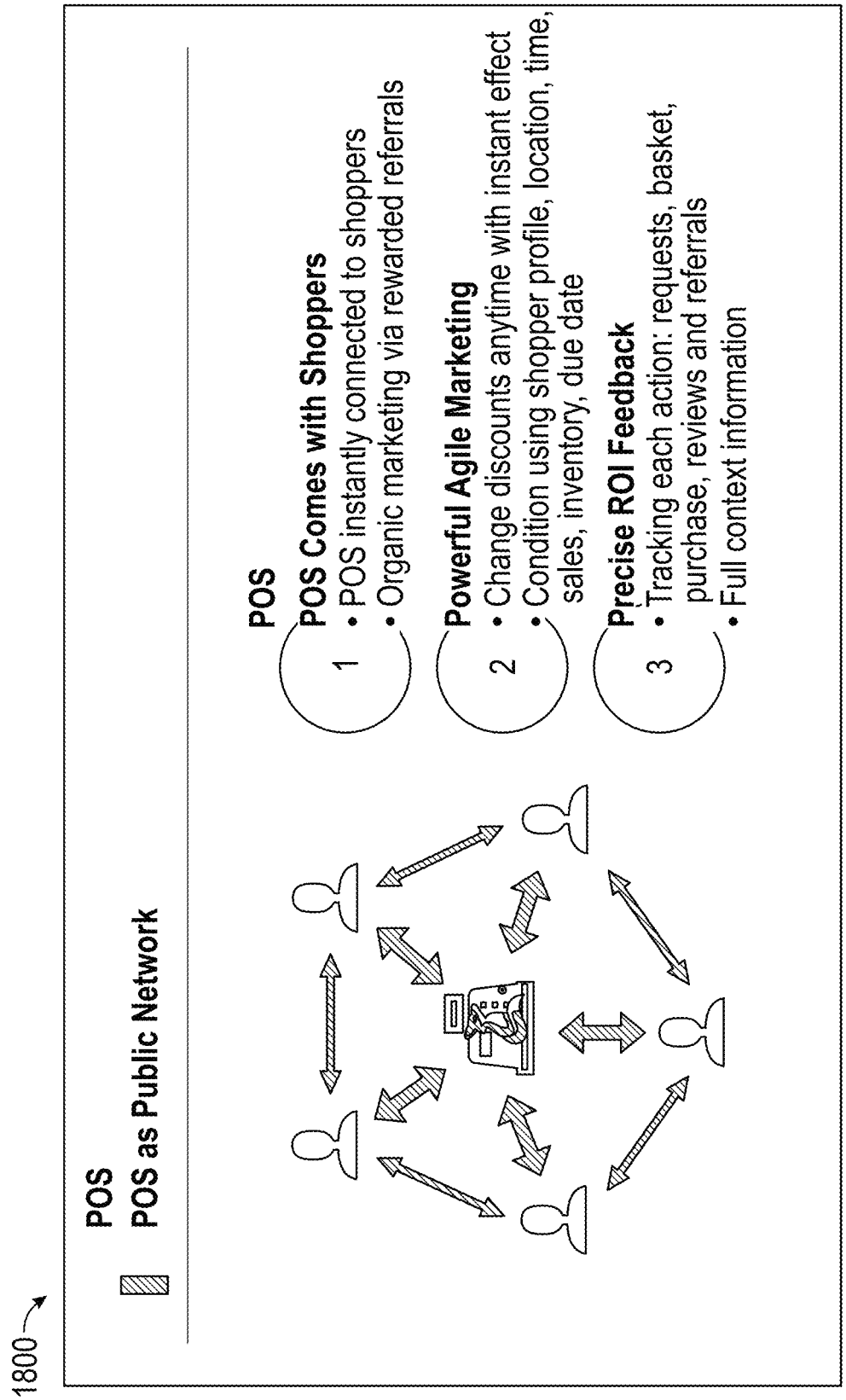
FIG. 18 illustrates an example of a cloud based point of service solution, according to some embodiments

FIG. 18 illustrates an example 1800 of a cloud based point of sale solution, according to some embodiments. The database system can include a cloud based point of sale system. The cloud based point of sale system can include databases with data records for users. The data records can include information on the users, such as loyalty points, geolocation data, referrals given to and provided from the user, visit or purchase histories, reviews, and/or the like. Moreover, the database system can provide return on investment (ROI) feedback by tracking each action taken by the user, including requests, placing items into a basket, purchases, reviews, and referrals to provide full contextual feedback for users. The databases can include algorithms for smart pricing or discounting/promotions as further described herein.

In some embodiments, the point of sale system and/or software can reside locally to the merchant and can connect to the database system to connect to shoppers via the database system. The point of sale system can access the database system to request appropriate promotions and discounts for the user, such as based on a user's profile, location, time, sale, inventory, or due date. Advantageously, because such sensitive user data resides on the remote database system, and the database system provides the end amount of the event notification content (e.g., discount) to the local point of sale system, sensitive user data does not have to be distributed to the point of sale system, reducing the amount of needed memory store at the local point of sale system, reduces network requirements (e.g., throughput) and processing power by having the database system process the data and only transmitting the output to the point of sale system, and sensitive data can be stored at a far more secure location on the database system side instead of having to have all point of sale systems needing to encrypt and safely store/process sensitive user data.

Figure 19:
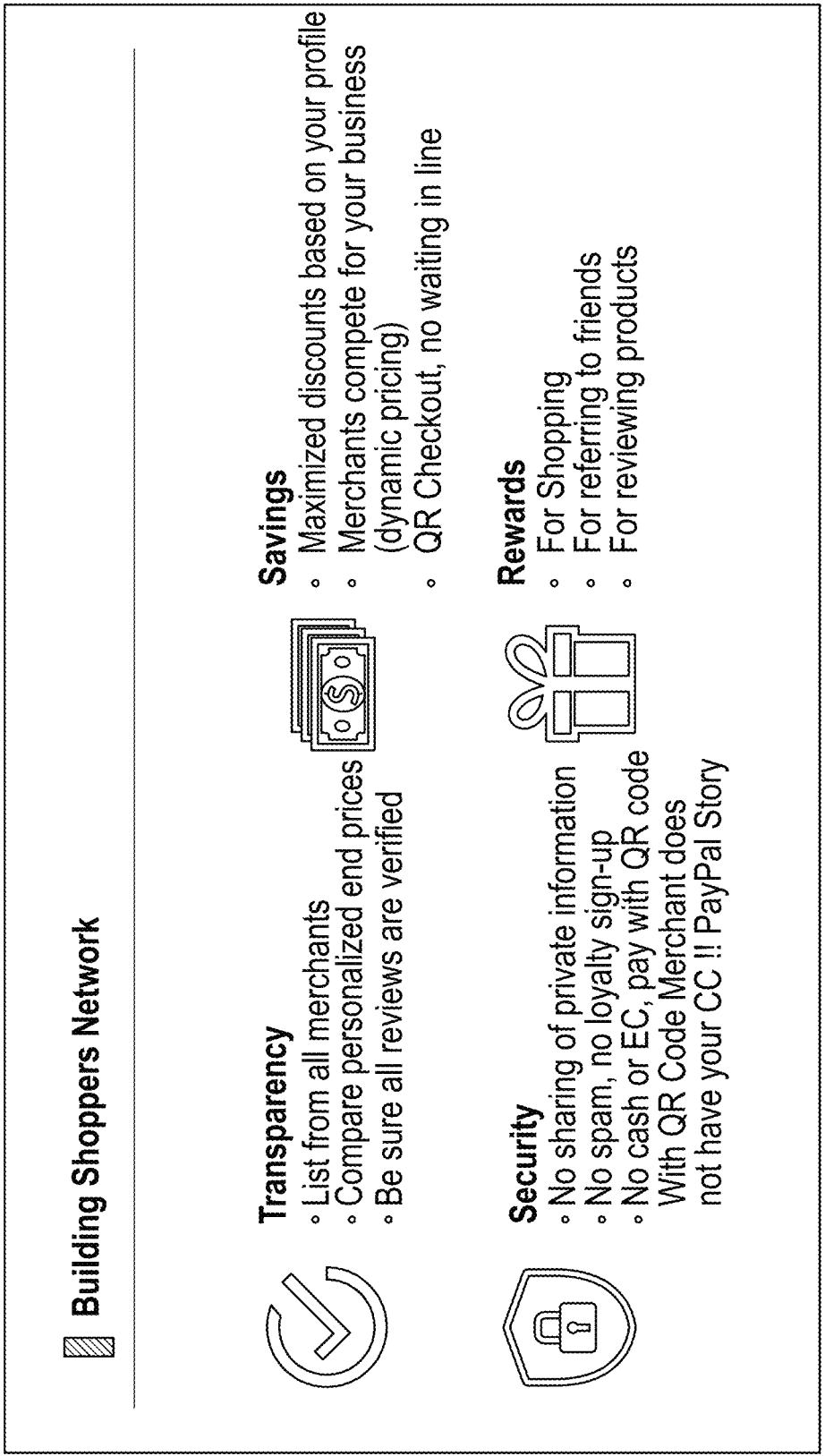
FIG. 19 illustrates an example of advantages from a cloud based point of sale solution, according to some embodiments.

FIG. 19 illustrates an example 1900 of advantages from a cloud based point of sale solution, according to some embodiments. The cloud based point of sale system can provide data transparency to systems not previously available. For example, the cloud based point of sale system can provide the user with a final price for each merchant that is specific to the user for the goods or services that the shopper searched for in a database query. The user can compare offers on a single list based on the final price without analyzing coupons, loyalty points, and/or other types of promotions. The cloud based point of sale system can enable review of the goods or services only after the user makes the purchase.

In some embodiments, the cloud based point of sale system can provide savings for the user. The final price can be a personalized price for that specific user, and not to other users, on-demand, and can include discounts for the merchant that the user qualifies for. The all inclusive list can limit the amount of time the user spends searching for each merchant individually, reducing the amount of user interfaces that the user needs to sort through. The point of sale systems for the merchants can change discounts and promotions at any time. Moreover, given that the user can simply scan a QR code at the merchant scanner, the user does not have to wait to checkout in real time.

In some embodiments, the cloud based point of sale system can provide security by not sharing personal information with the merchant. The cloud based point of sale system can maintain user data related to loyalty programs and personalized offers. Moreover, the cloud based point of sale system can reduce the amount of spam that is distributed by the merchant. The QR code payment can be associated with a single payment, and as such, the merchant can only qualify for that single payment instead of having access to sensitive information enabling the merchant (or other hackers) to make subsequent unintended payments.

In some embodiments, the cloud based point of sale system can provide can provide loyalty points to the user for purchases at the point of sale system in the merchant location. The cloud based point of sale system obviates the need to sign up for a loyalty point system or a punch card to keep track of purchases. The cloud based point of sale system can provide enable users to refer friends or post reviews through the cloud based point of sale system, and avoid information of referrals or reviews to be stored at the merchant's point of sale system. Such referral and/or review activity can be a factor in determining smart pricing for the user.

Smart Pricing Embodiments

Figure 20:
FIG. 20 illustrates an example of smart pricing for an event notification content, according to some embodiments.
Figure 20:

FIG. 20 illustrates an example 2000 of smart pricing for an event notification content, according to some embodiments. In some embodiments, the event notification content can include a final discounted amount, such as $5.45 from the $8.99 original price. Upon acceptance by the user, the database system can provide a unique identifier, such as a QR code, NFC, or other identifier communication, to the user to use at the vendor site. The database system can provide the unique identifier to the point of sale system local to the vendor with information corresponding to the final discounted price. As such, when the user uses the unique identifier at the point of sale system at the vendor site, the point of sale system automatically knows the final discounted price. Advantageously, only the finalized discounted price is required to be transmitted and stored by the point of sale system. Moreover, the discounted price at the point of sale system can be specific to the users and not available for other users (e.g., because of the user's loyalty or close proximity to the vendor).

Figure 21:
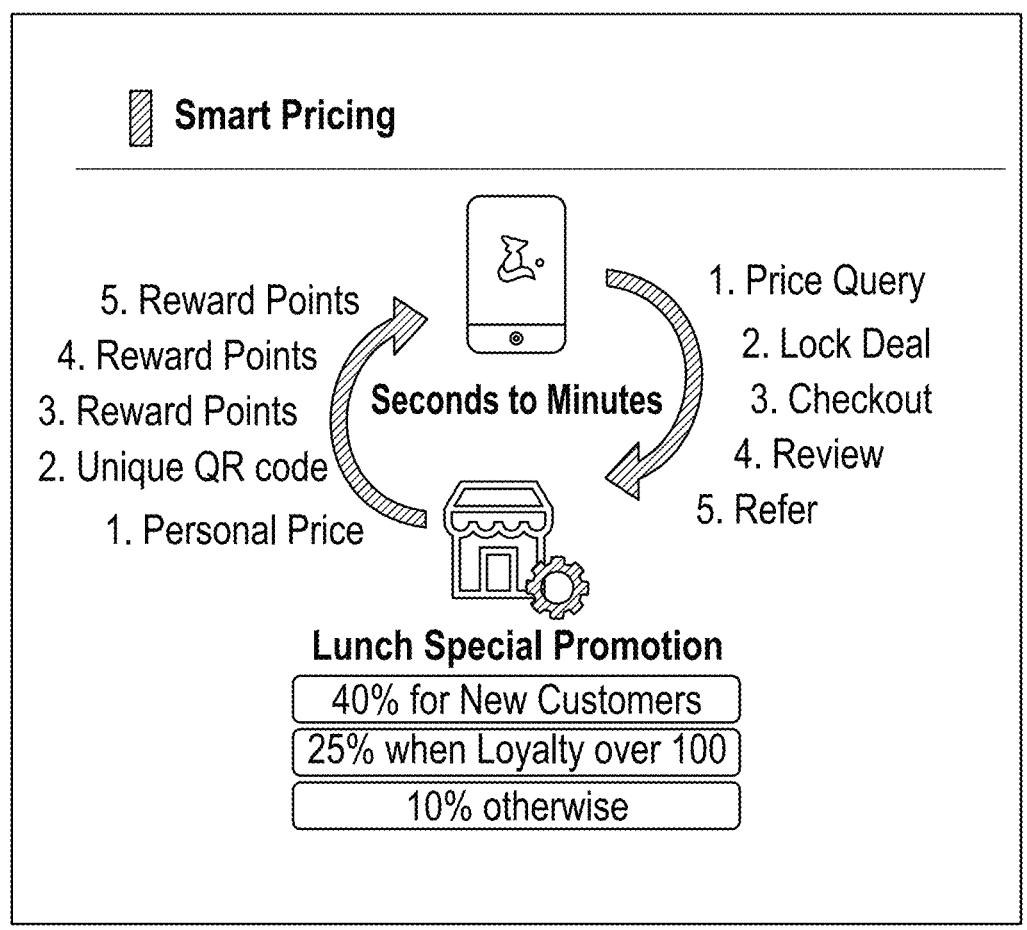
FIG. 21 illustrates an example of almost instantaneous on-demand smart pricing for an event notification content, according to some embodiments.

FIG. 21 illustrates an example 2100 of on-demand smart pricing for an event notification content, according to some embodiments. The database system can deliver event notification contents in a format that is personalized with a finalized price for a specific product or service that is specifically tailored to the user.

In some embodiments, the database system can determine pricing and/or promotions/discounts based on generation of user interest, accepting and redeeming of user event notifications, referring of vendor promotions, and reviewing of vendor products and/or services. Smart pricing can be based on one or more factors, as described herein (such as new customers, loyalty, or otherwise general promotions or discounts). In some embodiments, smart pricing can be applied to a discount, coupon, voucher, and/or promotion.

In some embodiments, the smart pricing can be initiated by a database inquiry, such as a price inquiry, or a change to a database record, such as a geolocation distance from the vendor. The database system can lock in a deal for the user, perform checkout for the user, provide a review platform for the user, and/or provide a platform for user referral.

In some embodiments, the user can build an order (basket) including a plurality of product/services offered by same merchant and merchant location. Each product/service in the basket can be accepted by shopper and receive a single or a plurality of unique IDs to lock the generated price. For the single unique ID, the database system can generate a basket unique ID to identify the list of items. The basket unique ID can be used in same way as single product/service ID by shopper as described herein.

Multi-Function Single Scan Embodiments

Figure 22:
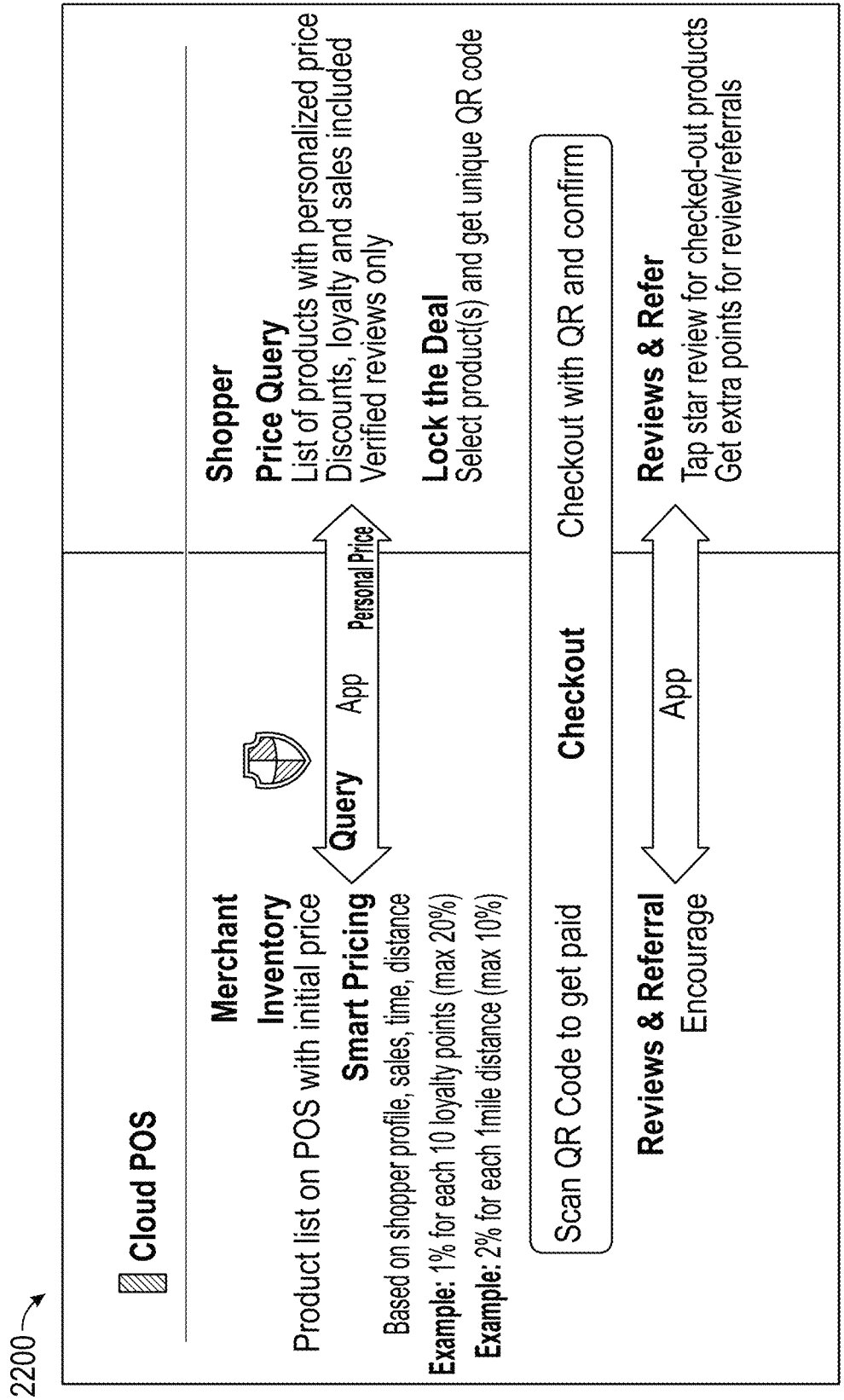
FIG. 22 illustrates an example of ordering, discounting, and checking out in a single scan of a unique identifier, according to some embodiments.

FIG. 22 illustrates an example 2200 of ordering, discounting, and checking out in a single scan of a unique identifier, according to some embodiments. The database system can enable simplified checkout using a single unique identifier. For example, the user can submit a database query requesting for a list of products with a personalized price. The database system and/or the point of sale system local to the merchant can search its inventory and generate a list with an initial price. The database system can generate discounts, loyalty points, sales, promotions, and reviews (e.g., verified reviews) that are specific for the user on the products that are searched.

In some embodiments, the database system can generate smart pricing for the user. The pricing can be based on a variety of different factors, such as data in a user profile, prior sales with the merchant or product, time intervals from the last visit or sale, and/or distances from the merchant location. For example, a 1% discount can be provided for each 10 loyalty point with a maximum of a 20% discount. A 2% discount can be provided for each 1 mile distance, with a maximum of 10%.

In some embodiments, the user can select one or more products displayed in an application on a mobile device, and the user can receive a QR code. The user can scan the QR code at the merchant site. The database system (and/or other third party payment platform) can process the payment from the user to the merchant, such as via tokenization as further described herein.

In some embodiments, the user can apply a review (such as a star review). The database system can incentivize the user to provide reviews with additional points or discounts. The database system can request the point of sale system local to the merchant to provide the incentives that the database system can display to the user via a mobile phone application. The request for review can be displayed after purchase of the product and service in order to facilitate verified reviews only.

Group Pricing, Booking, Ordering, Rating Embodiments

Figure 23:
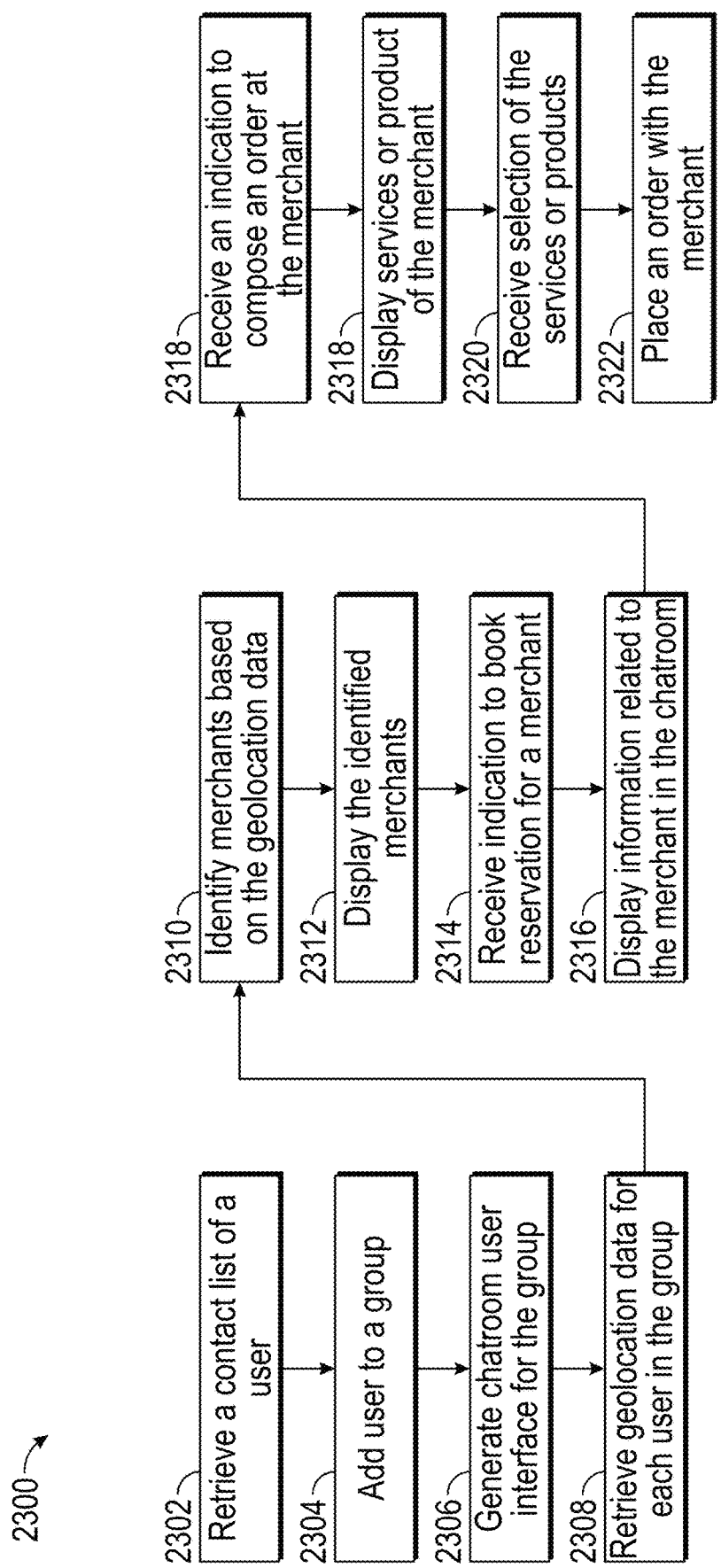
FIG. 23 illustrates an example flow diagram for group pricing, booking, ordering, and rating according to some embodiments.
Figure 24:
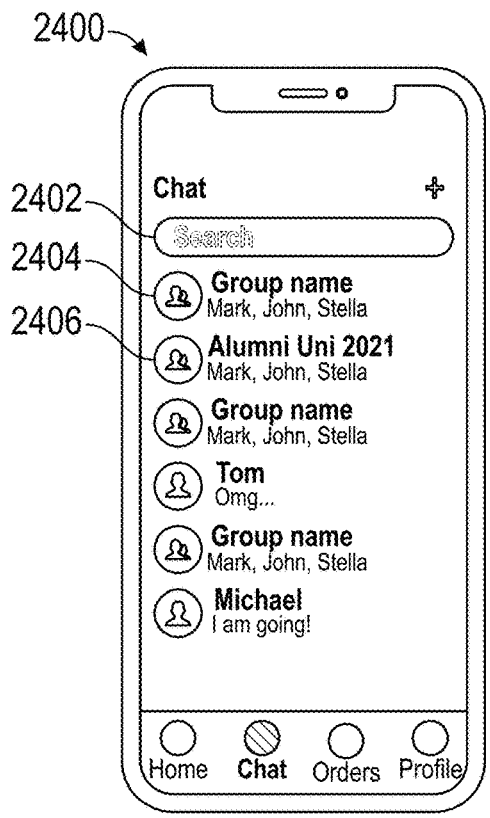
FIG. 24 illustrates a user interface illustrating user contacts that the user can request to join the group according to some embodiments.

FIG. 23 illustrates an example flow diagram 2300 for group pricing, booking, ordering, and rating according to some embodiments. At step 2302, the database system can retrieve a user's contact list to form a group for a group of users. In some embodiments, the database system enables users of a group to organize a group event and invite user's contacts to join the group. The user's contacts can be from a contact list such as from a user's mobile phone. FIG. 24 illustrates a user interface 2400 illustrating user contacts that the user can request to join the group according to some embodiments. The user interface 2400 can include a search function to search the user contacts on a user's mobile phone. The user interface 2400 can provide the user an option 2404 to name the group. The user can add an entire group 2406, such as the "Alumni Uni 2021 group," that was previously generated to the current group. At step 2304, the database system can receive an indication from the user to add a plurality of users to a group. The database system can then send an invitation to the plurality of users to join the group.

In some embodiments, the database system can enable users to define, in a user's profile, family members. The users can define family members each with their own set of preferences, restrictions, etc. Family members can share some of the characteristics with user—e.g., location, reviews, etc. In some embodiments, the user can specify which family members would be participating in the order and present at merchant site. The family members can contribute to the group-size based discounting.

In some embodiments, the database system can assign or facilitate assigning a group organizer, a user within the plurality of users of the group. The database system can receive an indication of the group organizer, such as based on a vote or via the group chat. The database system can allow the group order organizer to pay for the other users invited to join the group. The database system can allow the group organizer to set a maximum price for per person. The maximum price can include a price that other users are willing to pay. The database system can receive an indication from other users to order beyond the maximum price and can determine a payment that is beyond the maximum price for the group to provide to the other users.

In some embodiments, the database system can enable an organizer to invite (and pay for) guests, leaving them the flexibility of placing order themselves. The organizer can specify maximum costs per guest that he/she is willing to cover for. For example, for an office meeting or event where the team lead invites the team for dinner paying with a business credit card, where he/she is allowed to cover for up to $50 per person, during the split check, first a $50 per group member would be charged to organized, while each group member who spent over $50 would be able to cover the reminder using personal credit card.

In some embodiments, the database system can enable any member of the group to add or remove others to the group or event. The database system can enable the addition or subtraction of goods or services for purchase. The database system can enable only the organizer to add or remove individuals or goods/services. The database system may limit the group size to a maximum group size.

Figure 25:
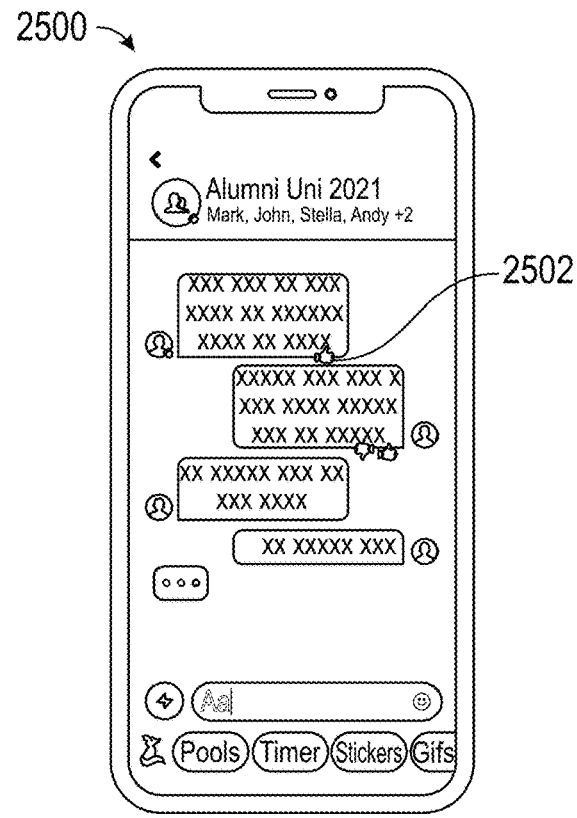
FIG. 25 illustrates a user interface illustrating a group chatroom interface according to some embodiments.

In some embodiments, at step 2306, the database system provides a chatroom user interface enabling users to input text, video, audio, location information, and/or the like. FIG. 25 illustrates a user interface 2500 illustrating a group chatroom interface according to some embodiments. The chatroom user interface can include built-in functionalities that allows the group to share websites and/or links to merchants, enable users to interact with other group members, provide suggestions or recommendations for the group, and/or the like. The chatroom user interface can enable the group to vote on a particular menu item or a comment 2502 by another user. The users can review or rate a merchant as a group.

In some embodiments, the users can be adding chat entries, photos, media, etc. to the group chat. Users can mark any from his/her own chat entry as a public review by tap-holding the chat entry and selecting merchant and/or product that the chat entry relates to. For example, the user can tap-hold a selected merchant available from the chat suggestions and add "Guys, those ribs were amazing" as well as a star-rating. The chatroom user interface can include a user interface for exporting event information into a social media account or feed. For example, the event organizer (or any user from the group, matter of permissions) can export the information gathered during event (merchants+time/date visited, photos form the group, selected chat entries, group orders, reviews left, public information about merchants and locations visited like street view of merchant, etc.) as a social media story/timeline or other social media entry. The chatroom user interface can include options to export to social media that may be linked to the database system, such as via login credentials.

Figure 26:
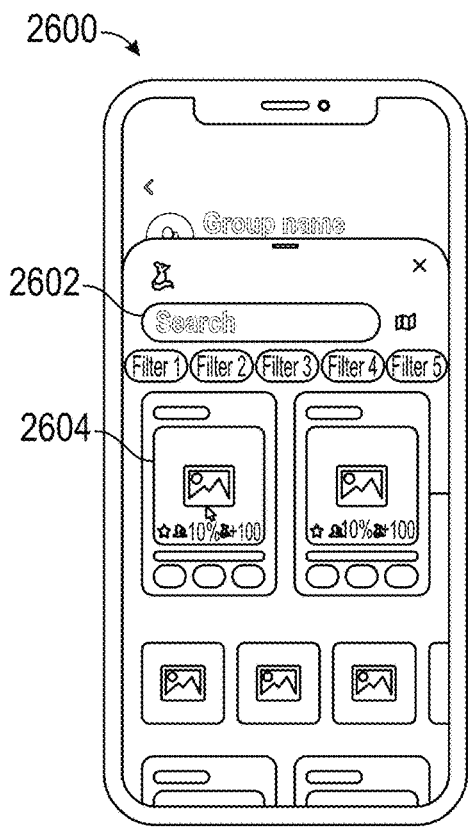
FIG. 26 illustrates a user interface illustrating a user interface for identifying merchants to propose to the group according to some embodiments.

In some embodiments, the chatroom user interface can include a button to add suggestions of merchants. FIG. 26 illustrates a user interface 2600 illustrating a user interface for identifying merchants to propose to the group according to some embodiments. The user can search for merchants using the search option 2602. The user may be presented with a list of merchants based on nearby places, suggested places for the group, history of last visited places, a map with location marking, and/or the like. The database system can include automatic suggestion on merchants based on whole group preferences, profiles, restrictions, location, calendars and calculating and indicating how well each of the suggested merchants fit to the whole group (or notifications about the same).

In some embodiments, a merchant can include a shop, retailer, service provider, attraction, rental, restaurant, Place Of Interest (POI), and/or the like. In some embodiments, the database system can provide recommendations based on a group of users. For example, the database system can suggest merchants or a set of merchants that the group can visit or items (e.g., food items, menu items, goods/services items) that the users can purchase. In some embodiments, the database system can automatically provide recommendations based on preferences, profiles, restrictions, activity history, past reviews and ratings, location, loyalty, and/or the like of the users in the group. For example, the database system can provide recommendations based on a user's sport or food preferences.

In some embodiments, the database system can provide suggestion on merchants automatically. The database system can consider factors of every member of the group based on his/her profile, current location, preferences, dietary restrictions, history of the reviews/ratings/other merchant visits, time, date, and/or the like.

In some embodiments, the database system can make suggestions on merchants and menu items based on a merchant's availability to provide products and services, inventory, availability for seating, products/services for the specific group size at the selected time and date, and/or the like. The database system can dynamically provide updates: e.g., the database system can send an alert informing if the group of this size can be accommodated for a lunch in the specific restaurant at given time/date.

Figure 27:
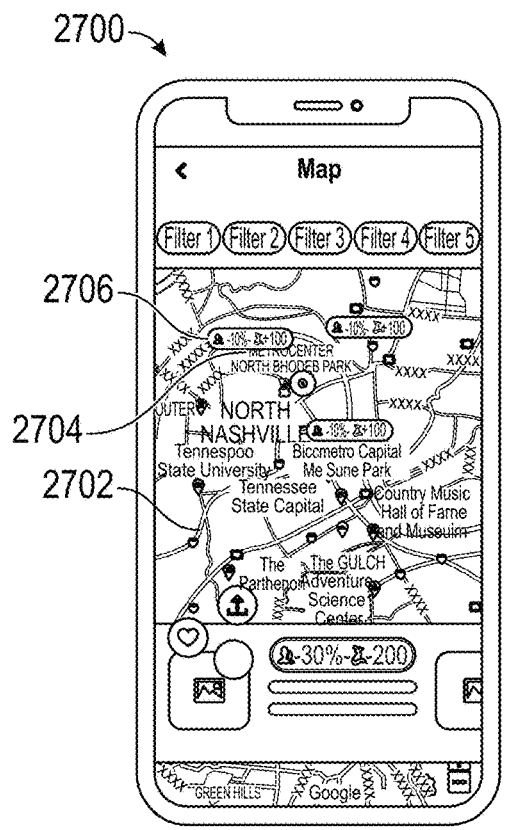
FIG. 27 illustrates an example user interface of the user and nearby merchants according to some embodiments.

In some embodiments, at step 2608, Global Positioning System (GPS) data can be retrieved from profile information of each user in the group. The geolocation data is generated from a global positioning system sensor of corresponding computing devices configured to communicate with satellites and to determine the geolocation of the computing device. The database system can retrieve geolocation data from computing devices of the plurality of users that have accepted the invitation to join the group. The GPS data can provide live information on the locations for each of the users in the group. The database system can identify nearby merchants to propose based on the distance of each user in the group. The database system can identify the locations of each user and nearby merchants, and determine recommendations based on distances to a merchant from each of the users in the group. The database system can identify a subset of merchants based on distances of each of the plurality of users to individual merchants and display the subset of merchants 2604 on the computing device. Thus, at step 2610, the database system can identify a subset of merchants based on distances of each of the plurality of users to individual merchants FIG. 27 illustrates an example user interface 2700 of the user and nearby merchants according to some embodiments. At step 2312, the database system can display the subset of merchants identified based on geolocation data. The database system can display a map user interface 2702, wherein the map user interface displays the location for each of the subset of merchants 2704 and at least one characteristic of the merchant 2706. The at least one characteristic can include an expected discount, a loyalty point rating, or a group match score.

In some embodiments, the database system can generate a scoring for the recommendation. The scoring can be between a value of 0-100 for each characteristic of the user, where 100 is assigned for the best case value of the characteristic. For example, distance between user and merchant 0-2 miles may equate or correspond to a score of 100, distance 2-10 miles can be a linear function from 100-0 points, and 10+ miles equates to a score of 0 points. In another example, a place review left by user equates to a score of 100 points for 5 star, 0 points for 1 star, 50 points for no review. Reviews points might be also weighted based on how recent they are (e.g., more weight on more recent ones). In another example, dietary restriction and preferences can be applied. The user profile might contain user-defined set of preferences like favorite restaurant types, activity types, dietary restrictions (e.g., vegan, lactose or glucose intolerant, disability, etc.). Points assignment could be 100 points for matching merchant type, 50 for no preference nor restrictions met, 0 in case the merchant cannot provide sufficient service due to user restrictions. In yet another example, loyalty status of user at merchant place could be applied to calculate a score based on expected average of relative discount amount (e.g., 0 points for 0% with linear increase to 100 points for 50+% discount).

In some embodiments, the database system can calculate the weights for each of the characteristics. Weight from 0-100 can represent characteristics importance, which might depend on the amount of information available for the characteristic as well as how recent is the information. For example, reviews can be of high importance and thus weight on reviews score might differ in case no reviews are available from user. For example, 0 score for no reviews, 1-2 reviews may equate to a score of 50, and more reviews of 100+ equates to a score of 100. In another example, the database system can weigh dietary restrictions that are not met which might be high (100 points), while weight of a place that is not on the list of preferred ones based on user profile might be lower weight (50 points). The database system can calculate a user to merchant match as a weighted average based on calculations above. The database system can calculate a group fit score as an average from each group member match. The above examples can result in accurate matching of merchants that are best fit to whole group by assigning normalized score (0-100) for each merchant and allow to sort them based on the match.

Figure 28:
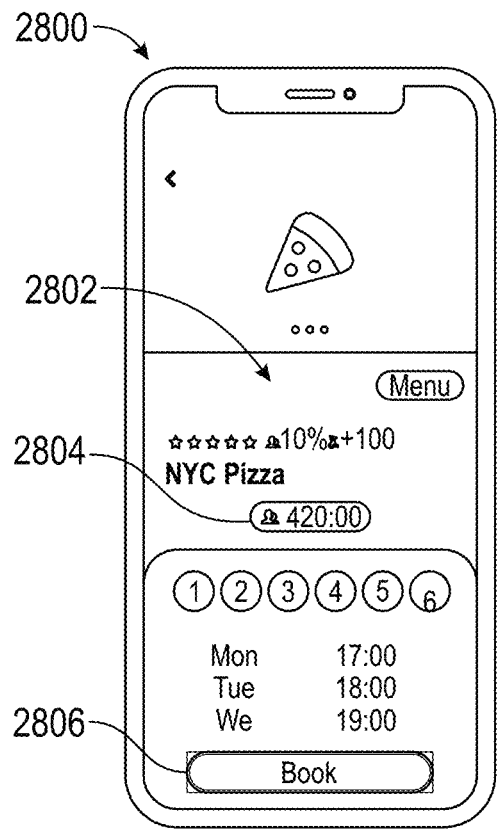
FIG. 28 illustrates a user interface that displays additional information on a merchant according to some embodiments.

In some embodiments, a user can select the place to learn details about the merchant. FIG. 28 illustrates a user interface 2800 that displays additional information on a merchant according to some embodiments. The user interface 2800 can display a break-down score 2802 of how well it fits each of user's friends. The merchant can provide a booking API for the database system to communicate with the merchant system. The database system can then display available booking times 2804 considering a group size for the group. The database system can receive availability for booking from a system of the merchant to retrieve booking availability; filter the booking availability based on the group size; and display the booking availability of the merchant on the computing device of the user.

Figure 29:
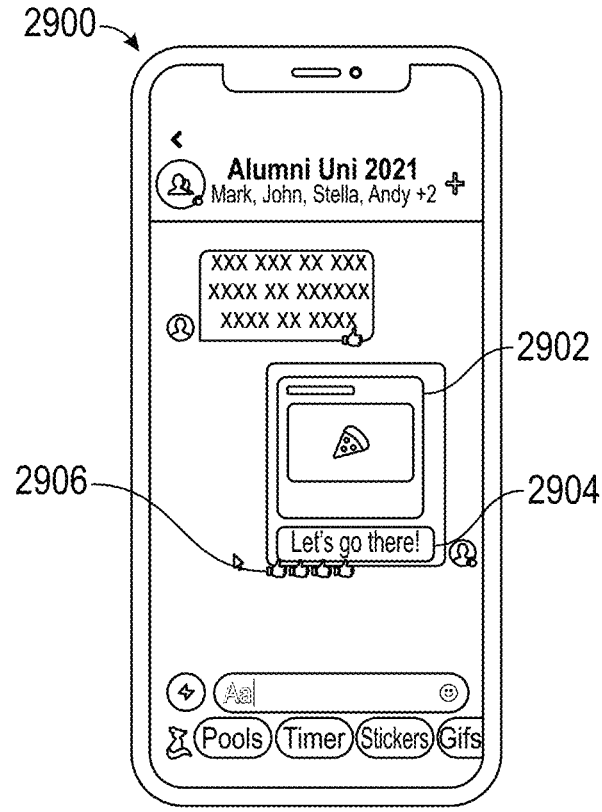
FIG. 29 illustrates a chatroom user interface that displays the suggestion for the merchant on the chatroom according to some embodiments.

In some embodiments, the user can select one of the booking times for the merchant and confirm sending as suggestion to the group. Suggestion can be presented with key details on the group-chat screen. FIG. 29 illustrates a chatroom user interface 2900 that displays the suggestion for the merchant 2902 on the chatroom according to some embodiments. The chatroom can enable users to provide comments 2904 on the merchant and voting options for the group 2906. Users can vote (like or dislike) each of the suggestions, which would be presented to everyone on the chat. The person that suggested the place can remove it from the chatroom. Each suggestion (merchant+date/time) can include have a booking confirmation button 2806.

Figure 30:
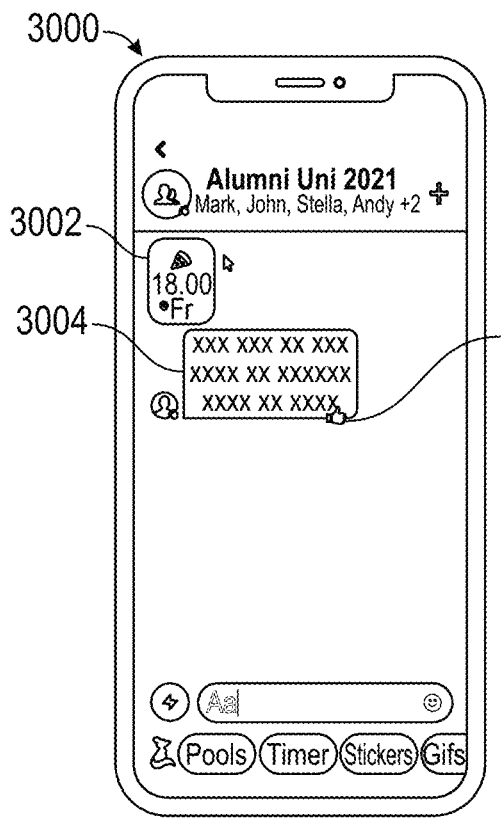
FIG. 30 illustrates an example chatroom user interface that includes the booked reservation of the merchant according to some embodiments.
Figure 31:
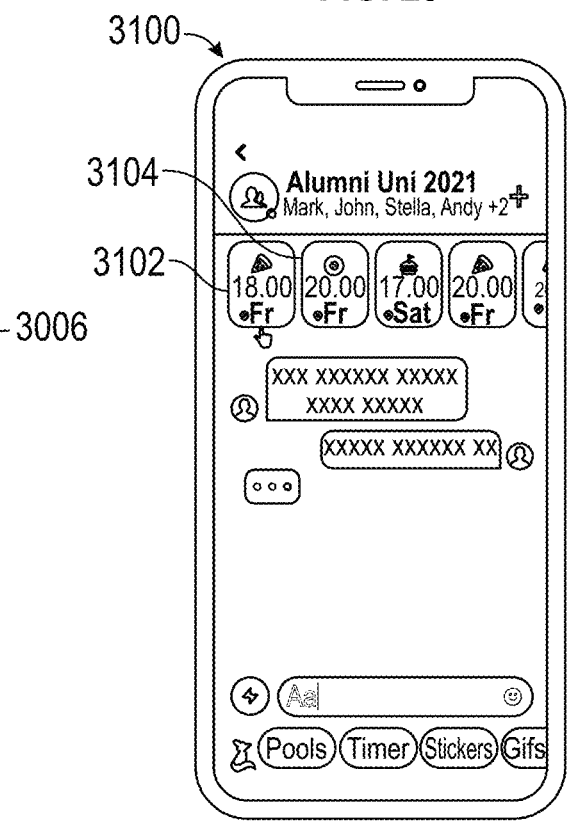
FIG. 31 illustrates an example chatroom user interface that includes multiple booked reservations of merchants according to some embodiments.

In some embodiments, at block 2314 the database system can receive an indication to book a reservation for the merchant via the booking confirmation button 2806. At block 2316, the database system can display information related to the merchant in the chatroom user interface. FIG. 30 illustrates an example chatroom user interface 3000 that includes the booked reservation of the merchant 3002 according to some embodiments. The members of the group can continue to add comments 3004 and votes 3006 in the chatroom user interface 3000. FIG. 31 illustrates an example chatroom user interface 3100 that includes multiple booked reservations of merchants 3102, 3104 according to some embodiments. For example, users can request pizza at 6 pm at one merchant 3102 followed by go-karting at 8 pm at another merchant 3104.

In some embodiments, the database system enables users to rate, review, and share the group's review as a group. The database system can collect star ratings for each member of the group via the chatroom. The database system can determine an average rating for the whole group by averaging the star ratings for each user. The ratings can be provided to other users searching for the same merchant. The rating for the group can be shown as a single rating. The rating can show characteristics of the group, such as the size of the group, the relationship between group members (e.g., family, friends), and/or the products or services ordered.

In some embodiments, the database system allows users of the group to suggest a date and time for the group to meet. The database system can provide a suggestion of one or more merchants. The database system can display merchant information with additional details such as address, menu, special offer, pricing list, discounts, and/or the like. Merchant information can be displayed side by side for easy comparison. The database system can enable the group to vote, rate, discuss and decide on the place to visit. Example of how suggestion from user (merchant selection+time/date) details might look like is shown on the interface below (Merchant card above group chat). A suggestion about a time/date might be made based on user's calendar data pulled from a user's phone data, calendar profile data, and/or the like.

In some embodiments, at block 2314 the database system can receive an indication to compose an order at a merchant. For example, users can start composing orders at any merchants that was suggested (adding products to cart). The database system can restrict combined group orders to only be placed after each user "signs-off" own cart as completed. Group might decide to place orders towards multiple suggestions (merchant-time/date pair).

In some embodiments, the database system can present to each user a menu, list of products or services. The menu or list of products/services can include personalized smart price calculated based on factors of the group and/or the merchant. For example, factors can include:
- conditions related to the individual (such as preference, loyalty, etc.),
- conditions related to merchant characteristics (such as inventory, availability, etc.),
- a group discount—conditional price discount such as smart pricing that assign a discount based on group size (2% for each group member) or order size (1% for each $100 spent by group)

In some embodiments, the databases system can display the personalized end-price next to each item, product or service with break down on discounts resulting from characteristics of the individual, the group, and/or the merchant. The personalized end-price might be changing dynamically as other group members add items to their carts. For example, a user can be displayed a price decrease as the order or group size grows. The user can select products and add them to cart. The database system can present to the user an app notification or group chat entry every time his order in cart price changes. A single order can be placed via API toward merchant POS system once all users finish placing their item into the cart. The single order with a calculated final discount can be placed to a merchant's POS via API, so that merchant is not aware of which products were purchased by which user.

In some embodiments, the application of the database system can keep track of the break-down of each item and corresponding price, and allow each user from the group to pay the respective portion of the combined bill as partial payment towards combined order. The database system can include partial payment online via a payment service associated with user profile (e.g., such as via credit card, other payment service, etc.). Partial payment can be completed via NFC or scan technology supported by the merchant's POS.

In some embodiments, the database system can enable users to add products to a common pool order (e.g., appetizers, shared costs, etc). A common pool can be added to a combined order and discounted based on the group discount. The costs of the common pool can be equally split between group members (either based on paying users only or considering family members).

In some embodiments, the database system determines a dynamic customized price and/or discount for the group. The database system can determine a discount for the group based on a group side or a combined order amount. For example, the database system can apply a 2% discount for each user in the group. The database system can apply a maximum discount, such as a maximum discount of 20%. The group discount can be an add-on to the individual smart pricing for each individual. The end-price per item can be dynamic and may change on the go depending on factors of the group, such as group size or order amount. The end price for products in the cart can be static except for certain factors, such as discounts due to the group size. The group discount can be finalized dynamically or when the group order is placed.

In some embodiments, the database system provides to the group a suggestion on items to purchase. The database system can display a user interface that displays items that members of the group selected. For example, a first user can select a seafood dish to order. The rest of the group members can see the selected seafood dish that the first user selected. Suggestions can come from other users not in the system. For example, user A after finding a favorite dish might "share" the dish with other users, star-rate it, and leave a comment for the other user.

In some embodiments, the database system provides an option for a user to make a selection for another user. For example, the database system can enable a user to select menu items for his or herself as well as for another user in the group. The database system can help a user to select a menu item. The database system can provide this recommendation based on the user's preferences, profiles, restrictions, activity history, past reviews and ratings, location, loyalty, and/or the like. Thus, the database system can customize recommendations to individuals in the group. For example, the database system can recommend menu items for each of the users in the group, wherein the recommendations of the menu items are based on individual user profiles. The database system can provide a user interface, such as an application or a group chat, to present and/or share a user's order with other users within the group.

Figure 32:
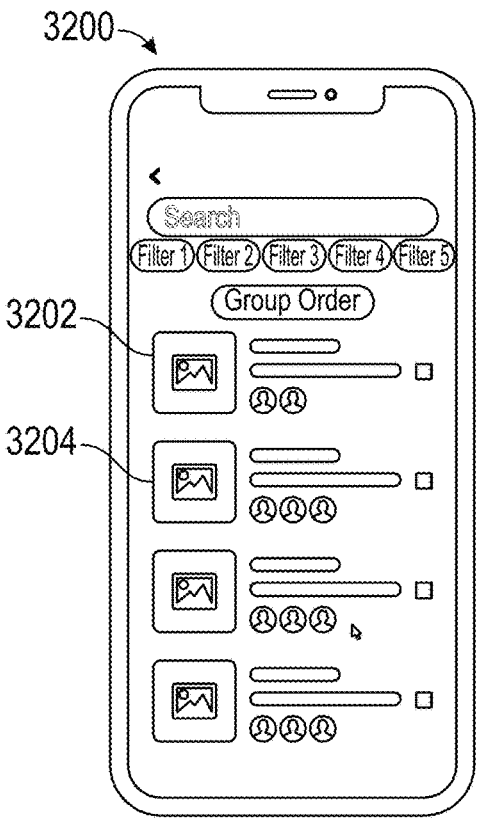
FIG. 32 illustrates a user interface displaying the group order according to some embodiments.

In some embodiments, the database system is configured to receive a request from a group of users to place a group order, make a purchase, or book a reservation as a group. The database system can display services or products of the merchant retrieved via a merchant API. The merchant can configure, in the merchant's profile, if booking confirmation is required before ordering. Any member of the group can mark the status of the booking in the application to indicate booking status, name, date/time and max group size to the rest of the group. FIG. 32 illustrates a user interface 3200 displaying the group order according to some embodiments. The group order can include orders from each of the plurality of users 3202, 3204.

In some embodiments, the database system can determine benefits associated with the bulk order or purchase. The database system can determine a breakdown of individual orders of each member. The database system can automatically display payments that need to be made by each member of the group. The database system can determine tipping percentages for each member's order in the group. The database system can divide the loyalty points according to the orders placed by individuals of the group.

Figure 33:
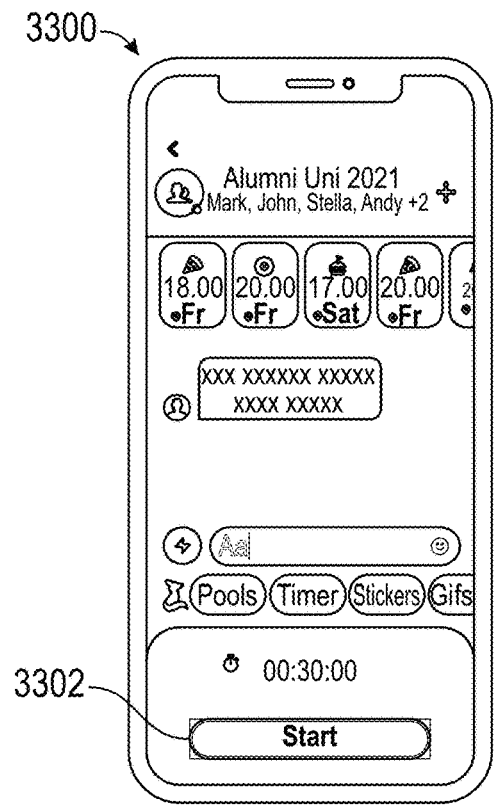
FIG. 33 illustrates a user interface that includes a timer for individuals to make a recommendation and/or an order according to some embodiments.

In some embodiments, the database system can display an interface presenting a list of products, their options and possible modifications. Each product can be assigned with a personal price for each user, such as based on their own profile. Members of the group who are ordering together toward a combined order can see dynamically updated icons, comments, ratings, emojis, avatars, etc. next to the products marked, ordered, commented on, rated by other users of the group. Each user can share his or her opinion about the product with others by tapping the product from the list, choosing pop-up icon representing comment, typing the comment and confirming. Product can be marked with "dialog cloud" icon to all other users in the group and they would be able to see the comment after tapping ("I had it last time and it was amazing, try it"). Moreover, user can include a rating for the products, such as a star rating. Users can share the recommendation to the group. An order icon can enable a user to order on behalf of another user. Users can send a referral of a product to a user outside of the group, and be rewarded by the merchant such as an additional discount. The ratings and comments may be marked as public, which results in sharing with other users of the database system, and the users can receive rewards, such as loyalty points. FIG. 33 illustrates a user interface 3300 that includes a timer 3302 for individuals to make a recommendation and/or an order according to some embodiments. At the end of the timer 3302, the database system can determine the recommendation for the merchant and/or order to place, such as based on a majority vote.

In some embodiments, the database system can apply a POS booking API to verify that a merchant is able to accommodate a given group size at a particular time. The merchant can also configure this information in its own profile of available capability (e.g., max group size of 10 for boat trip, bowling alley, go-kart race, table size).

In some embodiments, the database system can complete the booking via a POS API if the merchant POS system provides such support. In case of merchant POS does not support the booking API, the application may present the merchant's contact information, such as a phone number, that the user can use for manual booking. At step 3220, the database system can receive selections from each of the plurality of users in the group among the services or products of the merchant, and at step 3222, the database system can place the order with the merchant via the merchant API.

In some embodiments, the database system can provide the following features in booking, ordering, and menu displaying:
1. the database system can also allow users to interact with a selected merchant to book, purchase, order, reserve, buy the product or service. Each group member can be able to order his/her selection of product or services, however the order would be placed as one group order towards the merchant
2. the database system can allow ordering or purchasing of the services or products as a pre-order or could be placed on premises of shop or service provider (e.g., app used as digital ordering menu). It could be decision of the group on the moment of placing final group order
3. the database system can allow ordering for another member of the group provided member accepted/allowed it
4. the database system can allow users to share the order details between members of the group (view, copy, suggest, discuss, vote, rate each product and service while ordering)
5. As a group order can come with benefits in terms of discounts, perks, points, freebies, etc. (described in next point), the database system can keep track of specific products and services ordered by each member of the group. This would allow automatic check-split at the end of the order. Each group member would also be allowed to specify own tip amount, which would be combined as a group tip for the merchant or service provider.
6. the database system can allow users to register credit card or other methods of payments by each group member to provide convenient way of payment for split check
7. the database system can allow users to pay for other, selected members of the group (e.g., kids ordering themselves, while parents paying for them at the end)
8. the database system can allow the organizer of the group (person who initiated the event) to invite others indicating he/she will be paying for the whole group. Each group member would be able to order/purchase product or services that would later be charged to organizer.
9. the database system can allow the organizer to specify an amount of money the organizer would like to pay for others as part of the invitation. For example, the organizer can invite group of friends for a birthday party to a restaurant offering $50 per invited person. Each person in the group can participate in group order. First $50 spent would be charged to the organizer. Reminder over the maximum would be charged to the ordering person (same as spit check functionality)
10. the database system can allow group ordering that keeps track of break-down to allow convenient split check
11. the database system can allow ordering on behalf of others
12. the database system can allow group ordering using an interface that allows communication via an app between the group during the ordering process (sharing with others, recommending, suggesting, etc)
13. the database system can allow inviting a group of users and allowing them to place their orders that organizer would be charged at the end (with preset maximum)

Figure 34:
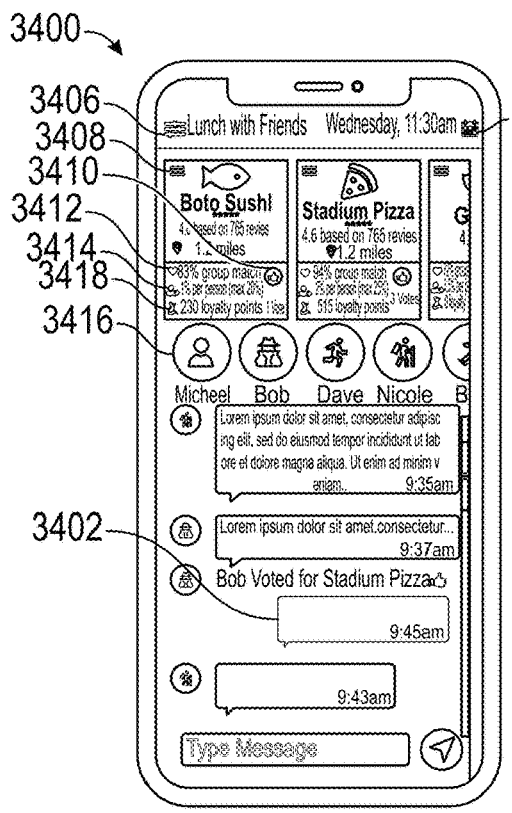
FIG. 34 illustrates a group chat user interface according to some embodiments.

In some embodiments, the database system can provide the following interface features:
1. the database system can provide an interface that includes a group chat, such as a text-messaging or social network chat with additional functionality for placing suggestions on place, merchant, service provider and functionality to group vote, rate, discuss, mark, describe each of them. FIG. 34 illustrates a group chat user interface 3400 according to some embodiments. The group chat user interface 3400 can include a group chat portion 3402 where users can communicate with other members of the group. The group chat user interface 3400 can include information of a time and place of events set by the organizer 3504. The group chat user interface 3400 can include options to open event configurations 3406, view details of an event or merchant to check personalized offers 3408, voting options 3410, matching statistics on how well the place matches with the group based on group preferences, profiles, locations, restrictions, etc. 3412, group discounts, amount of discount the merchant is offering for a group order 3414, avatars for a group 3416, loyalty point information for the merchant 3418, and time and place for the event set by the organizer 3420.

Figure 35:
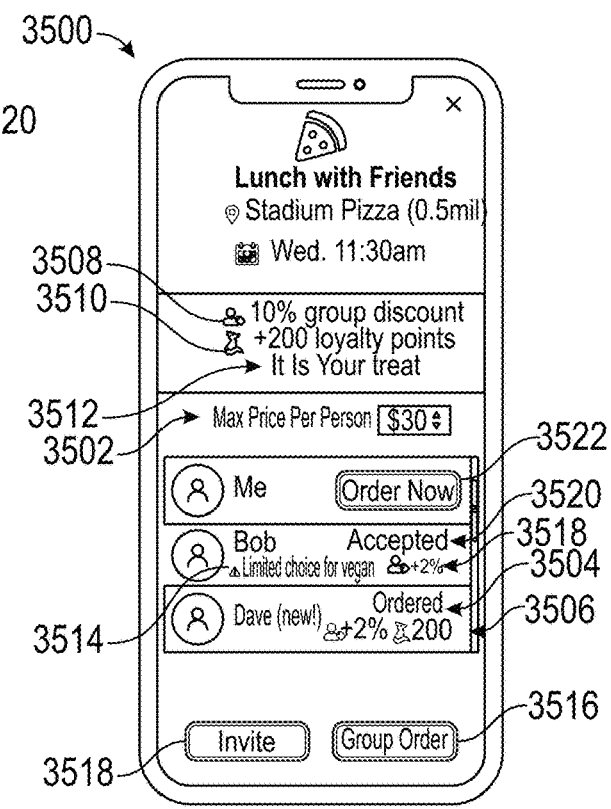
FIG. 35 illustrates a user interface displaying more detail on a particular event according to some embodiments.

2. FIG. 35 illustrates a user interface 3500 displaying more detail on a particular event according to some embodiments. The user interface 3500 can include a maximum price per person that the organizer can set for the group 3502. In the scenario of the organizer's invitation, the organizer can specify a maximum price per person he or she is willing to pay. In the scenario of a group member order over the maximum price, the remaining amount is charged to the person. The user interface 3500 can include a total group discount added to each member's order 3508, loyalty points for the organizer due to inviting other members of the group 3510, an indication of how the check will be paid (e.g., split check, organizer pays) 3512, warnings about dietary restrictions for a user based on the user's profile and a merchant provided limited selection on food (e.g., vegan choices) 3514, a button to place an order for an individual 3522, a button to place the final group order 3516, a button to invite additional persons 3518, and statistics on the group or other users in the group, such as an order that another user placed 3504 or loyalty points that the user brings to the group 3506, changes in group discounts due to statuses such as a user accepting an invitation (e.g., additional 2% discount) 3518, status of an order of a specific group member 3520.

3. the database system can provide an interface that can dynamically notify the group on the availability, pricing, discounts, rating, restrictions, limitations, etc. of each place selected as a group suggestion. For example, the interface will notify the group if the selected place does not provide vegan food in case one of the group members has vegan restriction on his/her profile 4. the database system can provide an interface that can show the suggested merchants on the map with markers extended with group match, group discount and loyalty points information 5. the database system can provide an interface that can inform the group of the updates related to the applied discounts, perks and benefits as other members of the groups place their order (e.g., pop-up with information of group discount of additional 5% due to another person placed the order)

6. the database system can provide an interface that can allow ordering or purchasing product or services via the app after the group select the place, merchant, service provider 7. the database system can provide an interface that can allow users to place photos, videos, comments, reviews, rating on the group chat as well as link them to the specific order, product or service as feedback to the merchant. This can be done directly as part of the group chat by referring specific product or services as they browse (e.g., suggesting others a particular dish with comment how good it was last time, warning others that something contain peanuts, rating the service with comment on chat)

8. the database system can provide an interface that can allow users to use the chat at any time from the moment the group event is created (even after the purchase)

Figure 36:
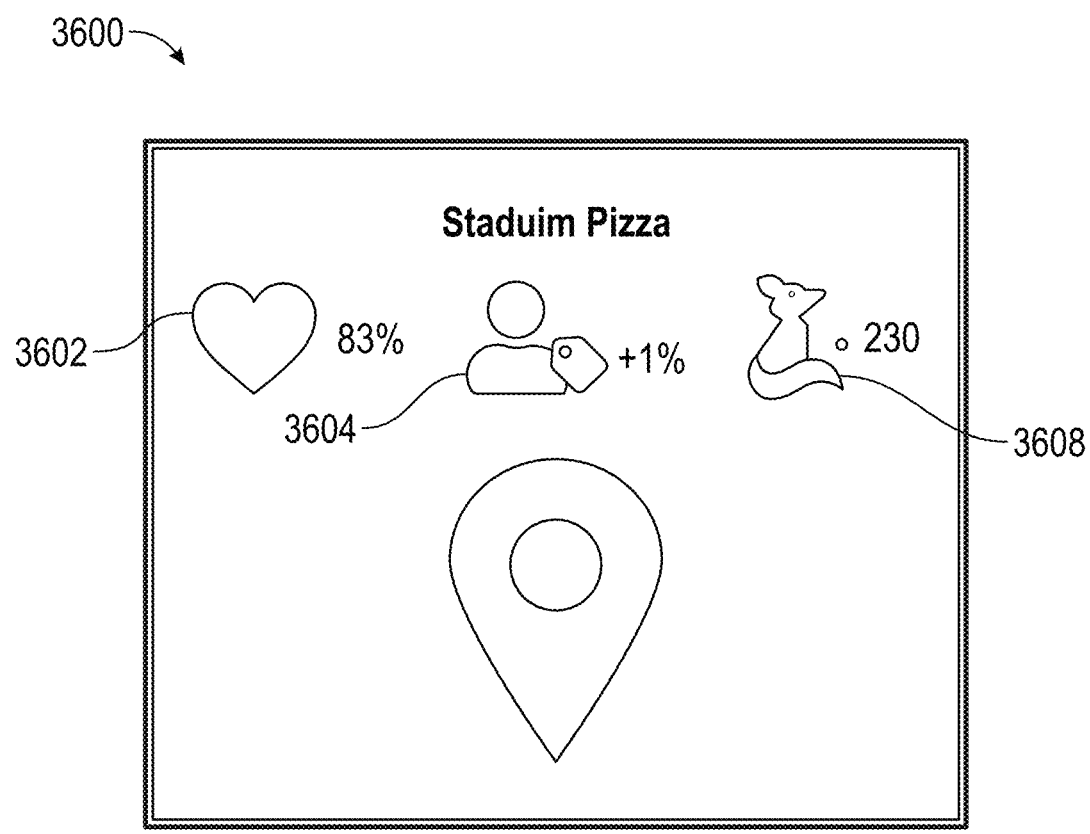
FIG. 36 illustrates a user interface of a default map marker according to some embodiments.

9. the database system can provide a group chat interface with functionality that allows event planning (selection of the place, time, suggestions, inviting more persons, who pays, adjusting to group preferences), voting, ordering, paying, receiving benefits, reviewing, and rating as a group and not as an individual 10. FIG. 36 illustrates a user interface 3600 of a default map marker according to some embodiments. The database system can provide a default map marker with specific information about group match 3602, group discount 3604 and loyalty points 3606 information (or any other dynamic discount related information).

In some embodiments, the database system can provide the following group discount and offer features:
  a. the database system can allow the merchant to create dynamic pricing group discounts conditioning the discount amount on the group size or group order size. For example: 1% discount on the group order for every person ordering in the group up to 20% max. $25 discount for every $150 spent as a group, etc.
  b. the database system can inform all the group members about expected discount and final price of each of the member order every time the discount amount changes based on changed conditions. Members that have their orders placed can observe price changing as others are ordering. Every order can be changed anytime until the final group order is placed
  c. the database system can implement an algorithm to suggest to the group how much they are missing to the next discount level
  d. the database system can allow the merchant to setup additional discount, perks, points, etc. for the group event organizer for inviting and bringing in persons new to the merchant (new customers)
  e. the database system can provide dynamic group discounting as opposed to fixed group offers
  f. the database system can provide perks for bringing new customers to the merchant (e.g., introducing your friends to new place you found)

In some embodiments, the database system can provide price conditioning for dynamic pricing based on:
  a. group size
  b. group order total price
  c. combined loyalty points of the group members
  d. amount of time the order was placed ahead of the time to provide the service—example: 2% for each day ahead of renting the bike)
  e. current day sales amount
  f. current day sales amount comparing to average sale, same day average, etc.
  g. number of open seats, tables, places
  h. Inventory levels on hand (at the location shopper order at or based on multi location inventory distribution)
  i. Available Labor at the time of service (e.g., for accommodation of larger parties)—staff availability based on information from POS team management
  j. Product labels and tags (e.g., marking product as a new service for additional Introductory discount to it or marking products as end-of-season for additional dynamic discount)

Artificial Intelligence/Machine Learning Embodiments

In some embodiments, the database system can generate personalized end-price for each shopper based on pricing conditions set upfront by individual merchants. Merchants can be provided with various inputs that they can condition the discounts upon. The inputs can be divided into certain categories. For example, certain categories can include:
  Shopper profile—information about the person searching for a product (loyalty points, distance to merchant, last visit, average purchase, etc.). This can include information about a group formed by multiple shoppers (size of group of shoppers, group order size and total price, group reviews, etc.)

POS Information—provided by POS system itself (product name, type, stock level, sales of the product in last week, daily revenue, customers in last 3 hours, available restaurant tables, available employees, etc.)

External information—public or general information (time/day, weather, traffic, events in proximity)

Artificial Intelligence (AI) assessment—feedback from the database system regarding how well current price conditions are working (shoppers group size breakdown, which condition is used most, from which location shoppers search most, product reviews and feedback, etc.)

In some embodiments, the database system includes an AI module, such as a neural network (NN). The AI module can calculate an expected outcome of specific pricing conditions for product/service or group of products/services. The AI module can receive one or more of the following inputs:

merchant information (geographical location, proximity of other businesses, type of business, number of customers per day, revenue, staff size)

merchant uses the database system (other pricing conditions, how long-ago merchant joined, average discount rate, etc.)

neighborhood such as demographics, events that are happening around, tourism season, crime.

specific product information (name, type, weight, size, service length)

set of merchant pricing conditions

In some embodiments, the database system can train the AI module to generate one or more of the following:

Expected increase in sales of the product or group of products (example: products sold per week).

Expected increase of new customers, returning customers, group customers (example: new customers per week)

In some embodiments, the database system can train the AI module using data gathered from all merchants by creating a training set formed from the inputs described above and corresponding outputs generated by the database system. The AI module can provide suggestions to merchants about how to set up pricing conditions in an optimal way. The AI module can also be used to automatically adjust pricing conditions settings for merchants either every time a change in input conditions is detected or by verifying them periodically (e.g. daily) vs. new set of inputs. Merchant can be able to set the boundaries of pricing conditions within which the AI module can adjust the pricing (for example, setting min/max discounts per product, per pricing condition).

In some embodiments, the AI module can receive as input the dynamic price (or discounted price) directly instead of merchant pricing conditions. This AI module can directly predict an assessment or outcome, such as the outputs listed above, of setting a particular discount amount for the product or products. In some embodiments, the database system can apply the AI module directly to predict an impact of a given particular discount that can be used to directly provide dynamic price for the shopper at the time of browsing menu. Various discount amounts can be tested via the AI module and the one giving the best result can be provided to shopper.

Figure 37A:
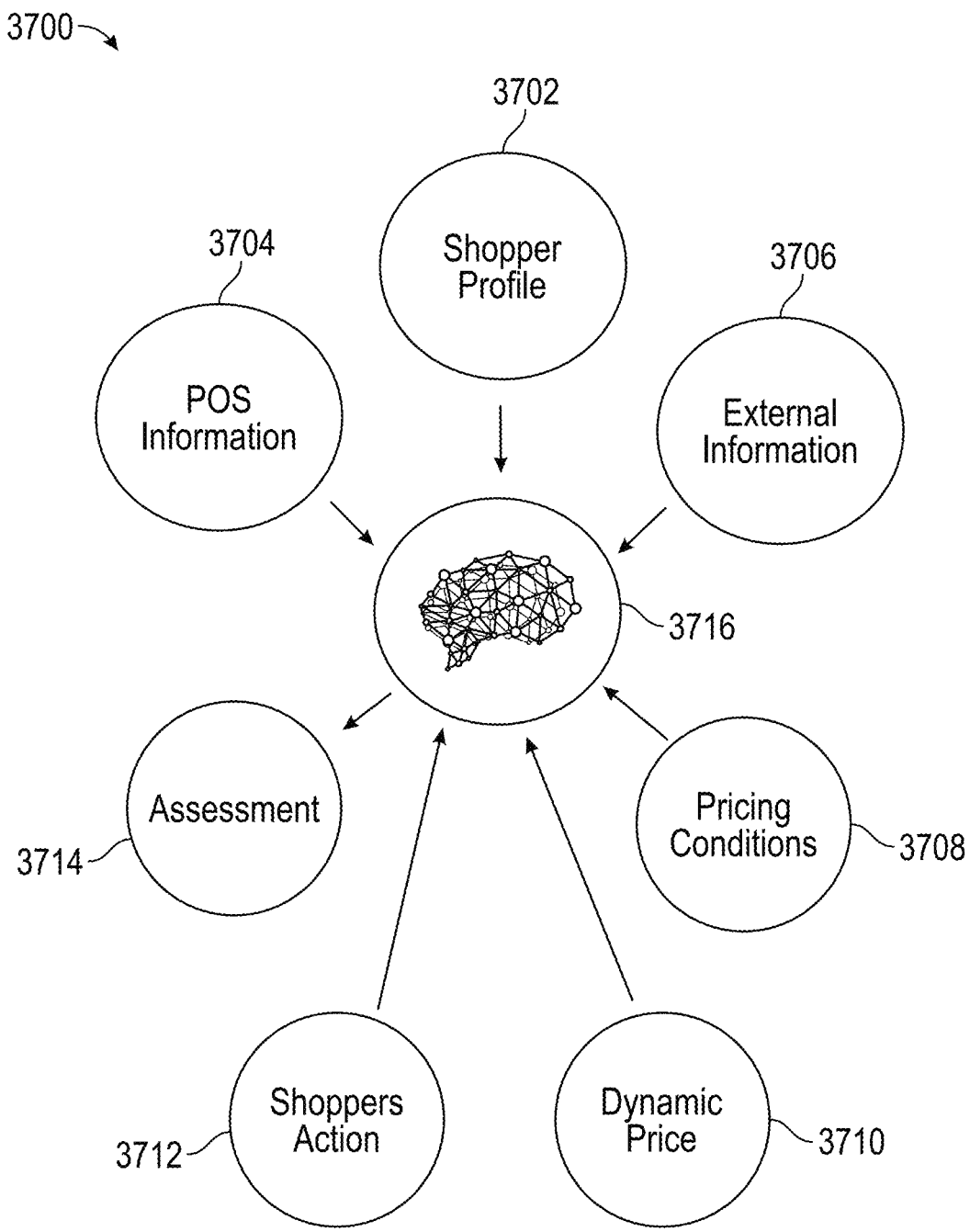
FIG. 37A illustrates an example of a flow diagram for applying artificial intelligence according to some embodiments.

FIG. 37A illustrates an example of a flow diagram for applying artificial intelligence according to some embodiments. In some embodiments, the database system can store and/or retrieve one or more shopper profiles 3702. The shopper profile can include information pertaining to a user or potential user. For example, the shopper profile can include a user's email address, name, phone number, address, other person identifiable information, and/or the like. The shopper profile can include information about a shopper's actions and/or prior actions, current state, distance to a merchant, shopping history, and/or the like. For example, the shopper profile can include prior product searches, loyalty points, current GPS location, prior reviews, and/or the like.

In some embodiments, the database system can store and/or retrieve POS information 3704. POS information can include information related to a particular merchant, such as inventory, marketing discounts and/or codes, revenue and/or sales (e.g., sales for the day or month), reviews, product types, stock level, and/or the like.

In some embodiments, the database system can enable merchants to input one or more criteria to provide dynamic pricing and/or for input to the AI module. For example, the database system can display a map to individual merchants of a geographic location (such as a surrounding location to the corresponding merchant, or a map that includes the merchant location and other surrounding areas that fit on a user interface map) and the merchants can specify one or more geographical areas or distances for applying the adjustment to the price. The merchant can select streets or portions of streets, or draw an area on the map where the adjustment to the price applies. For example, the merchant can select adjacent small streets to the merchant for users that are passing by closely to the merchant location.

In some embodiments, the database system can store and/or retrieve external information 3706. The external information can be information external to the shopper or merchant user devices. For example, the external information can include weather data, traffic data, information about a particular holiday or event occurring in a certain location, date, time, location, and/or the like. The external information can be retrieved from publicly accessible databases and/or from databases where a certain protocol is required, such as an API interface.

Advantageously, the database system can receive input from the user and process user data in the models, train the models, access sensitive data such as financial and transactional data, and user personal information to generate relevant offers and pricing for the user. This may allow the database system to access sensitive data on external databases (because the system would not be sharing this information with the user and/or merchant systems). Such processing by the database system can be performed on the server side. Because one or more of the processes of the database system can process sensitive on the server side, remote from a client computing device, the processors can analyze large amounts of data, run complexed algorithms, and have access to databases that may not be able to be performed on a client computing device, such as a mobile phone or a laptop. Accordingly, this practical application is a technological improvement, as the processing can be performed without being dependent on the hardware, operating system, and/or software of a client computing device. Moreover, such processing on the server side can result in faster processing with more processing power of servers, rather than being limited to the processing power of a client device (such as a mobile phone or laptop). Furthermore, remote processing can improve on data privacy and network communication security, as sensitive data, such as financial or personal do not have to be passed to and from the user device or the merchant over the Internet.

In some embodiments, the database system can receive pricing conditions 3708 and/or generate dynamic pricing 3710 based on the merchant's pricing conditions. The merchant can create a set of rules, triggers, or conditions that determine how much of a discount a certain shopper receives. For example, the merchant can set conditions where loyalty points are rewarded higher discounts than the distance the shopper is from the merchant.

In some embodiments, the database system can receive or identify a shopper's action 3712 to the dynamic pricing given to the shopper. For example, shoppers can receive a 10% discount and the database system can retrieve whether individual shoppers fulfilled their order with the 10% discount. The database system can do the same with other discount amounts. The database system can communicate with a mobile application that displays the dynamic price to the shopper and indicates back to the database system whether the shopper fulfilled the order by applying the discount.

In some embodiments, the database system includes an artificial intelligence 3716 (or machine learning) algorithm. The artificial intelligence can receive as input the dynamic price provided to shoppers and shoppers action to the dynamic price to generate an assessment for the merchant or for particular shoppers. For example, the artificial intelligence module can generate a return on investment amount for a particular dynamic price. The artificial intelligence module can generate an optimal dynamic price for a particular shopper in the future.

In some embodiments, the artificial intelligence module can receive as input other data, such as the POS information, shopper profile, and/or external information. The artificial intelligence module can generate the assessment for the dynamic price based on these inputs. For example, the artificial intelligence module can generate an assessment for dynamic price for a particular shopper that has certain loyalty points and distance to the merchant while also considering the merchant's pricing conditions.

In some embodiments, the database system can return an assessment such as an ROI for the generated dynamic pricing. In some embodiments, the database system can make an assessment across multiple dynamic prices and determine the optimal price for the merchant. Such pricing can be specific for the individual and can take into account the particular pricing conditions of the merchant and other external information. For example, if there is a lot of traffic or bad weather conditions between the shopper and the merchant, the database system may provide a higher discount for the shopper.

In some embodiments, the database system can connect directly with financial accounts, such as shopper accounts and merchant accounts. In some embodiments, the database system can apply the artificial intelligence to make an assessment across multiple dynamic prices for a shopper and automatically establish a dynamic price for the shopper or for a shopper group. Once the group makes a payment for the item or service (such as on a mobile application), the database system can receive payment from a user's financial account system into the database system account and send the same (or lesser) amount to the merchant for the user's purchase.

Figure 37B:
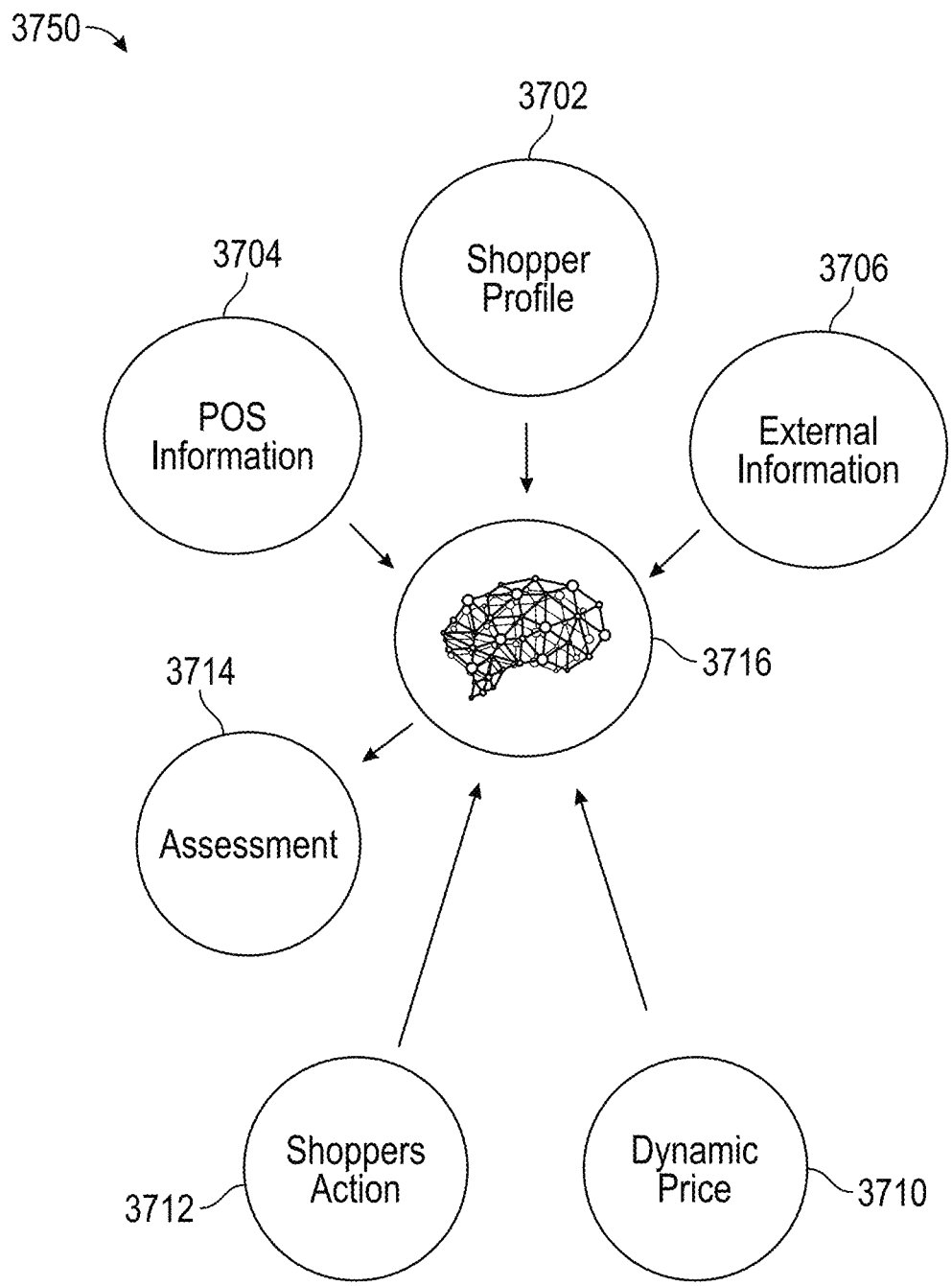
FIG. 37B illustrates an example of a flow diagram for applying artificial intelligence based directly on dynamic pricing according to some embodiments.
Figure 38A:
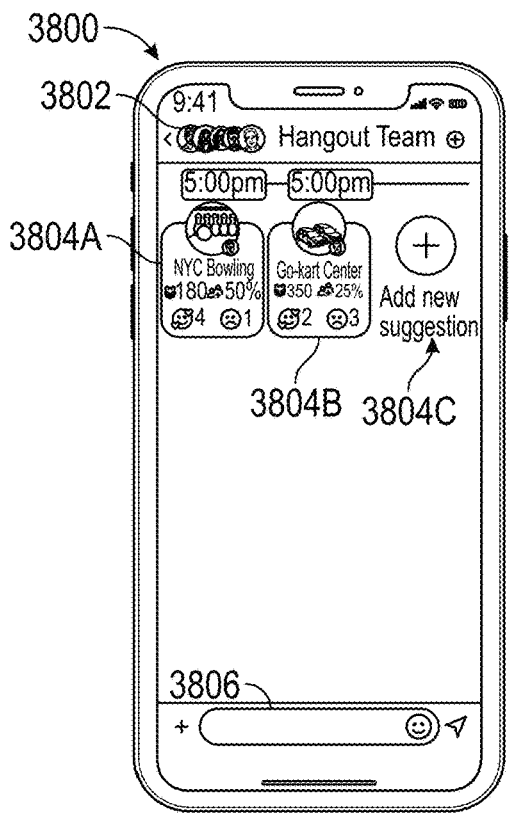
FIGS. 38A-38D illustrate user interfaces for identifying merchants in a group setting according to some embodiments.
Figure 38B:
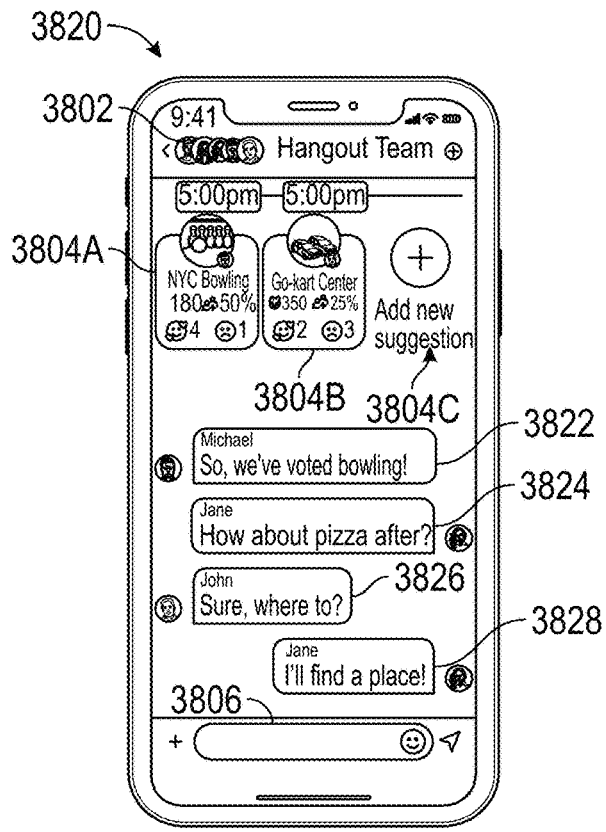
Figure 38C:
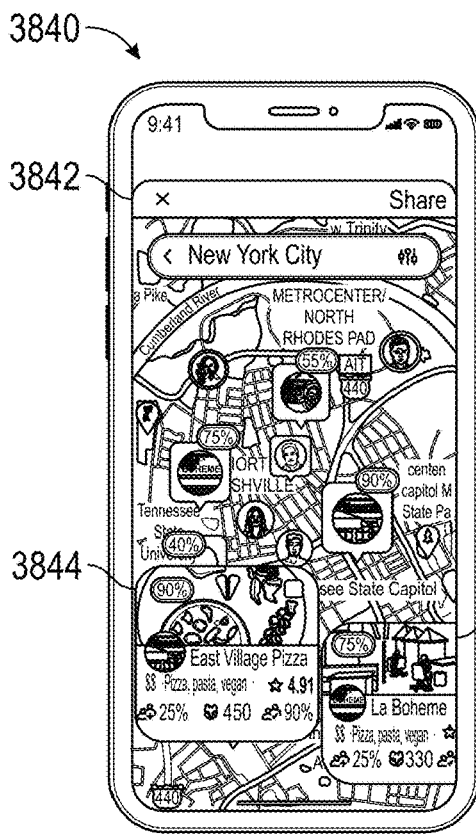
Figure 38D:
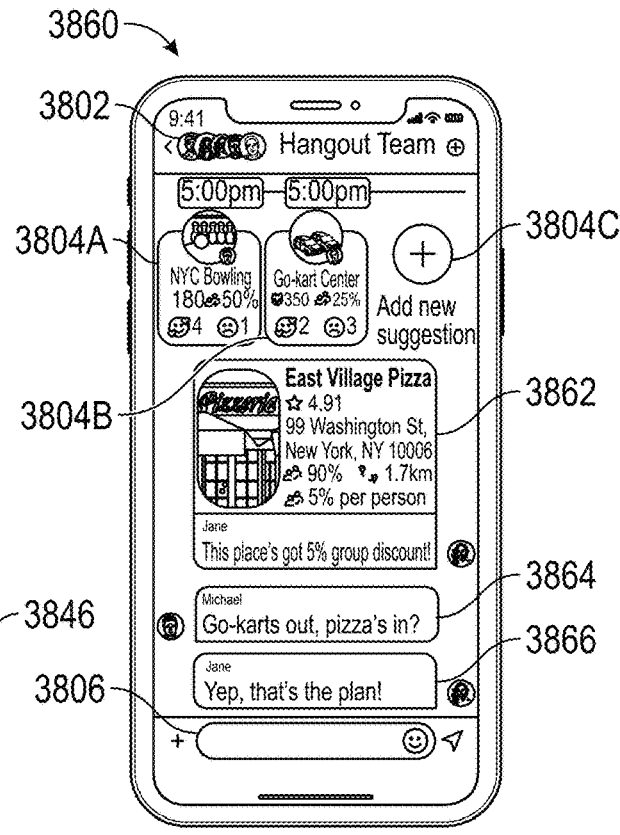
Figure 39A:
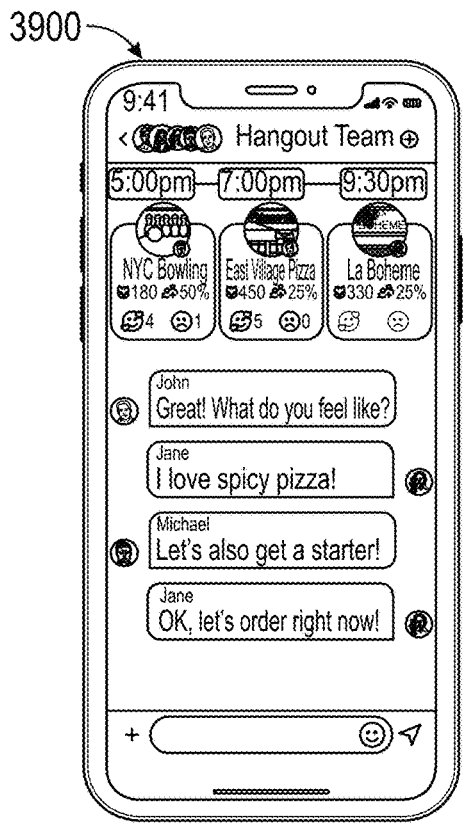
FIGS. 39A-39D illustrate user interfaces for placing an order in a group setting according to some embodiments.
Figure 39B:
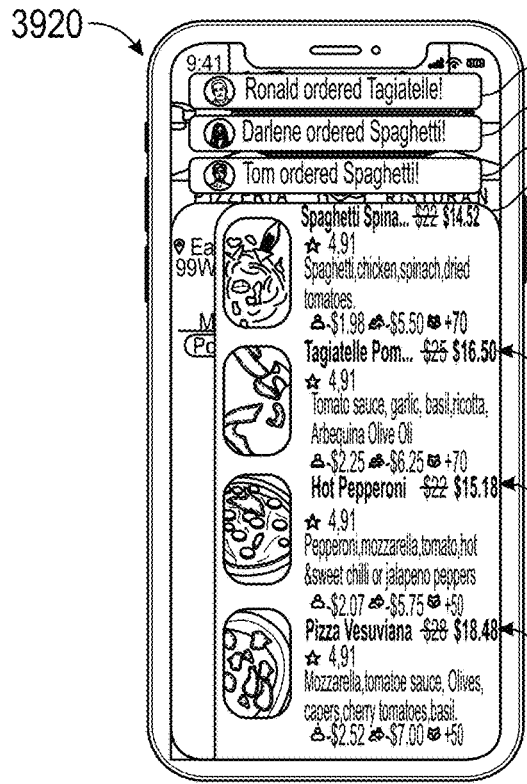
Figure 39C:
Figure 39D:
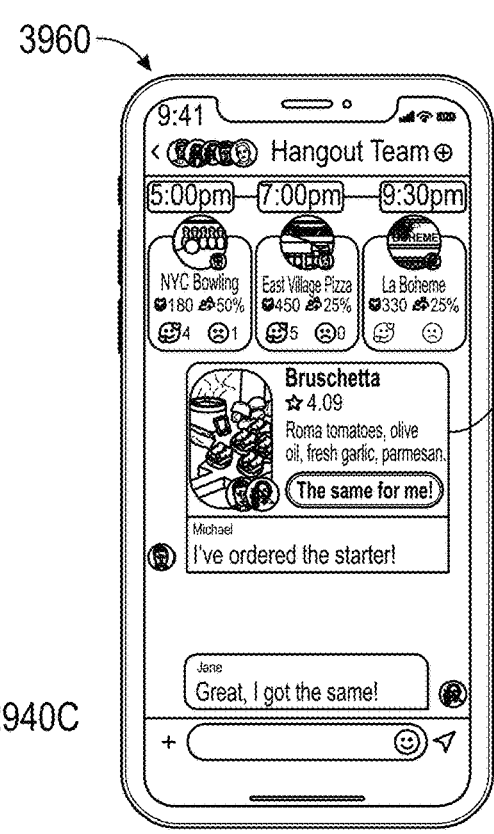
Figure 40A:
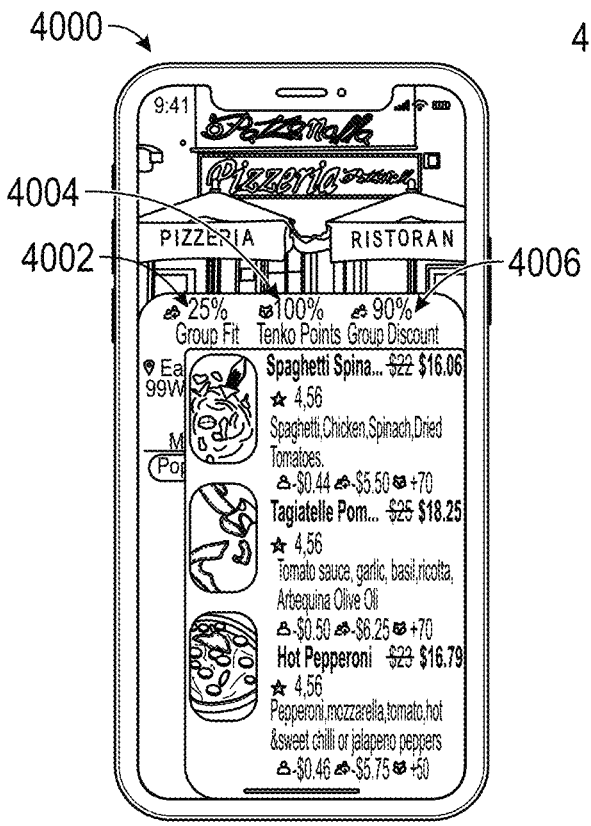
FIGS. 40A-40D illustrate user interfaces for applying dynamic pricing based on individual characteristics of members in a group according to some embodiments.
Figure 40B:
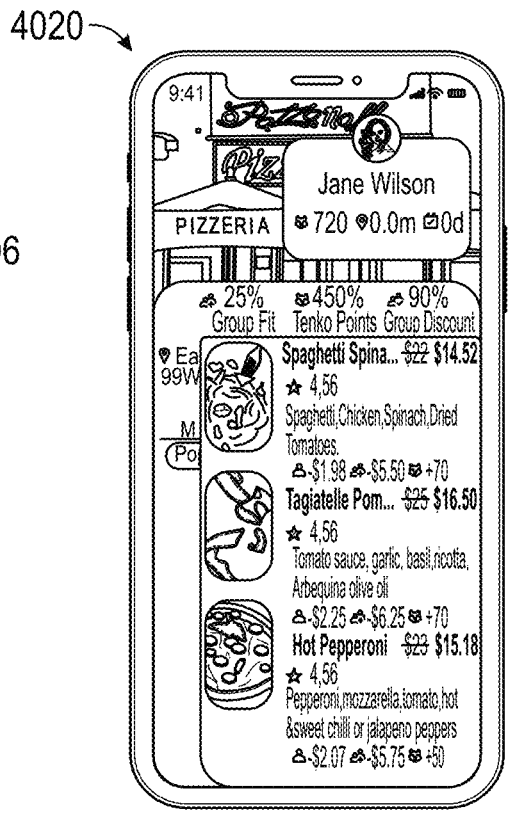
Figure 40C:
Figure 40D:
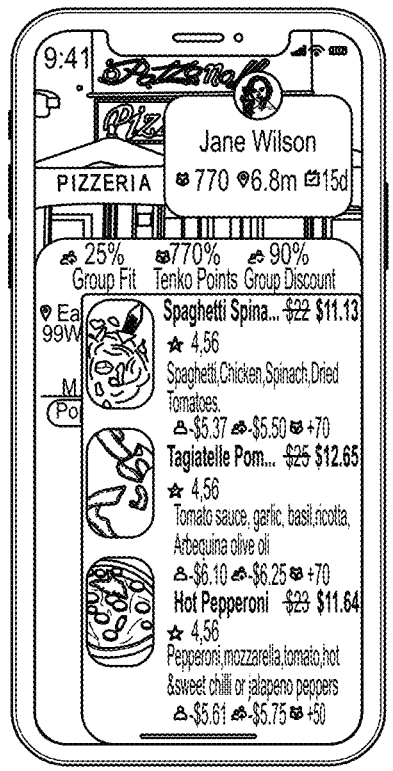

FIG. 37B illustrates an example of a flow diagram 3750 for applying artificial intelligence based directly on dynamic pricing according to some embodiments. In some embodiments, the AI module can receive as input direct dynamic pricing 3710 that was provided by the merchant and make its assessment of the efficacy and/or the optimal price for another shopper based on such information.

Advantageously, the database system can include an executable instruction set that can be generated and deployed to a client computing device (e.g., onto the downloadable electronic file). The database system and/or the client computing device can automatically adjust the dynamic pricing parameters for the preferred outcome (e.g., the desired promotion or ROI). Advantageously, the dynamic pricing parameters that were previously stored in the client computing device can be automatically enhanced by the executable instruction set to perform according to the preferred outcome (e.g., increasing the previously set discount amount based on a user characteristic, query, location, and/or the like or some other external factor). The dynamic pricing parameters are subsequently and automatically enhanced by the executable instruction set to provide an output that is optimized and/or configured according to the preferred outcome. Thus, client computing devices can solve the technical problem of dynamic pricing generation across massive datasets via a practical application of a self-adjusting downloadable electronic file that automatically adjusts dynamic pricing parameters within the downloadable electronic file, which previously required large network throughput of data and high processing speed by having to move around the massive datasets for the analysis.

In some embodiments, the database system can apply the AI module to generate the dynamic pricing and initiate an alert on a computing device of the shopper (such as when the application is in an unlaunched state, similar to other embodiments described herein).

In some embodiments, when the user selects to complete a purchase based on dynamic pricing, the database system can connect with the merchant system to apply the discount corresponding to the dynamic pricing, and the database system can display a user interface within the application user interface that shows at least a portion of the merchant checkout webpage. Advantageously to the embodiments herein, the consumer can complete the purchase all within a single user interface, a single browser website, without having to open a new tab on a browser, and without being redirected to another website. The database system can generate a composite website that does not lure visitor traffic away from the database system. As such, the automatic composition of the database system website and the checkout page of the merchant system provides improved user interfaces and an improved web browsing experience and solves the particular Internet-centric problem of user interfaces and web browsing. In some embodiments, once the consumer clicks to complete the purchase, the web page may display a checkout interface that is overlaid on top of the database web page.

Moreover, systems and methods described herein include training a machine learning network to generate an assessment of a dynamic price and/or generate an optimal price for the user. The machine learning network can be trained to take into consideration factors such as shopper information, merchant or POS information, and other external information. The machine learning algorithm can be trained using historical information that include certain prices provided to users and how the users reacted (such as whether the users completed the purchase, whether the users clicked on the advertisement, how long the user stayed on the webpage, whether the user clicked to certain other webpages, etc.)

Training of models, such as artificial intelligence models is necessarily rooted in computer technology and improves on models by using training data to train such models and thereafter applying the models to new inputs to make inferences on the new inputs. Here, the new inputs can be a front and back picture of a government issued ID of a new consumer and a selfie taken of the consumer. The trained machine learning model can determine whether the user is in-fact the same person on the government issued ID.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new data (such as new consumer data) and make predictions that the model was trained for based on the weights or scores that were adjusted during training. Such training reduces false positives and increases the performance of correct user authentication.

In some embodiments, the information received from the merchant and/or external information can be of a different format. The database system can configure data from multiple different databases that are in their own non-standardized format into a single standardized format. For example, the zipcode of an address can be updated to only include the first 5 digits or weather data can be converted into Celsius. As such, messages can be automatically generated to communicate with shopper devices using the standardized format. Moreover, assessments and decisioning made by the database system can be applied to merchant devices by reapplying non-standardized formatting of the merchant.

FIGS. 38A-38D illustrate user interfaces 3800, 3820, 3840, 3860 for identifying merchants in a group setting according to some embodiments. In some embodiments, the database system enables a plurality of shoppers to join a hangout team 3802. In the user interface 3800, the shoppers can add suggestions on where the group should go. For example, the hangout team has an NYC bowling suggestion 3804A, a go-kart center suggestion 3804B, and an option to add a new suggestion 3804C. The users can enter in chat in the chat bar 3806, where the users can chat with each other 3822, 3824, 3826, 3828.

In some embodiments, the users can add a new suggestion by selecting the option 3804C. the database system can display a map, such as shown in user interface 3840. The search bar 3842 can be used to enter in a location such as New York City, or a zipcode or address. The database system can display merchants in the nearby area, such as merchants 3844 and 3846.

In some embodiments, the database system can provide a dynamic price for a certain merchant. For example, in user interface 3860, a 5% discount is provided for the group. The database system can apply such a discount based on a distance of one or more members from the merchant, loyalty points, and/or the like. The group can discuss the potential merchant in the chatroom 3864, 3866.

FIGS. 39A-39D illustrate user interfaces 3900, 3920, 3940, 3960 for placing an order in a group setting according to some embodiments. In some embodiments, the database system can enable a group to place an order directly with the application. The dynamic pricing specific for the group can be applied to the checkout. The users can decide to make an order, such as shown in the user interface 3900.

In some embodiments, the application can display a menu of the items provided by the merchant. The database system can provide dynamic pricing for each of the items, such as the discounts 3922, 3924, 3926, 3928. Such pricing can be for the entire group and/or for the individual that is placing their own order. The database system can display what other individuals in the group has ordered 3930A, 3930B, 3930C. The user interface 3940 can display the discount provided to the individual 2940A, the total discount of the group 2940B, and/or the amount of loyalty points that would be awarded for the purchase 2940C. Once the order has been placed, the order for the individual can be displayed 3962 in the user chat, such as shown in user interface 3960.

FIGS. 40A-40D illustrate user interfaces 4000, 4020, 4040, 4060 for applying dynamic pricing based on individual characteristics of members in a group according to some embodiments. User interface 4000 illustrates discounts provided for the group based on the total group's characteristics. For example, individuals in the group can desire certain types of food which can increase the group fit 4002. The collective group can have a certain number of loyalty points 4004. The distance of the group from the merchant (e.g., average distance, closest person distance, farthest person distance) can be a factor in the dynamic pricing. Based on one or more factors of the group, the database system can apply a discount for the particular group 4006.

In some embodiments, the database system can provide a dynamic price (and/or a further discount from the group's dynamic price) based on characteristics of the individual shopper. For example, Jane Wilson can have 770 loyalty points which reduce the price of one or more items on the menu specifically for Jane Wilson, as shown in user interface 4020. Jane Wilson can be 6.8 miles from the merchant which reduce the price of one or more items on the menu specifically for Jane Wilson, as shown in user interface 4040. Ordering now can be 15 days from the day of the event for Jane Wilson, and thus ordering today can reduce the price of one or more items on the menu specifically for Jane Wilson, as shown in user interface 4060.

Figure 41A:
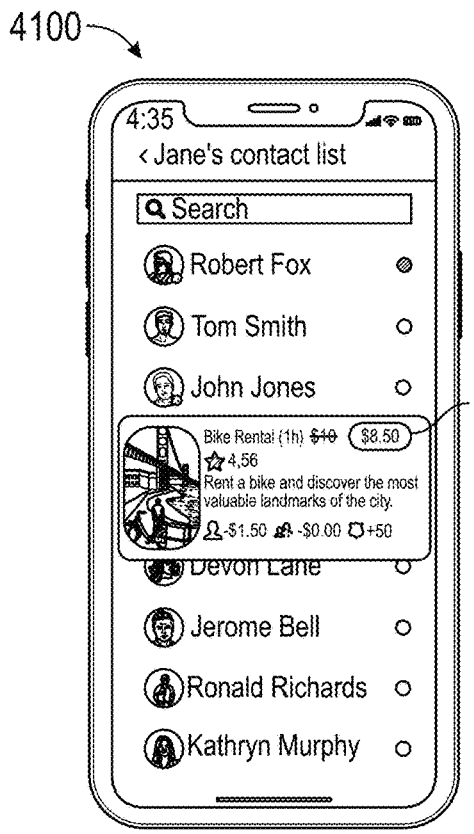
FIGS. 41A-41C illustrate user interfaces for applying dynamic pricing based on newly added members to a group according to some embodiments.
Figure 41B:
Figure 41C:
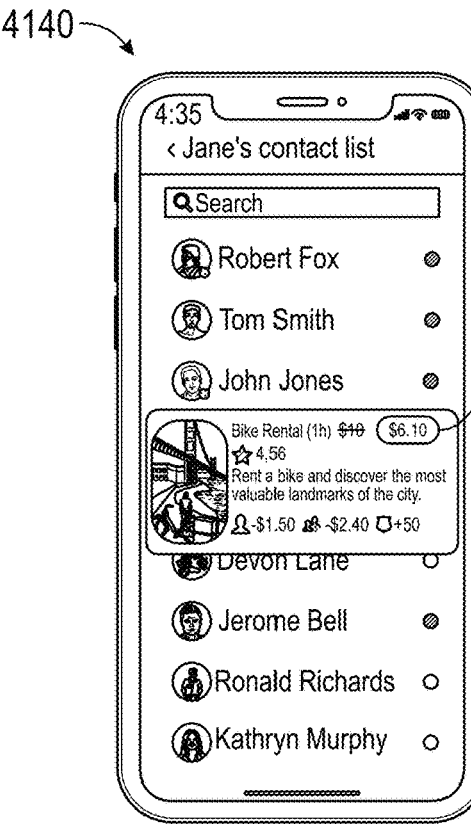
Figure 42A:
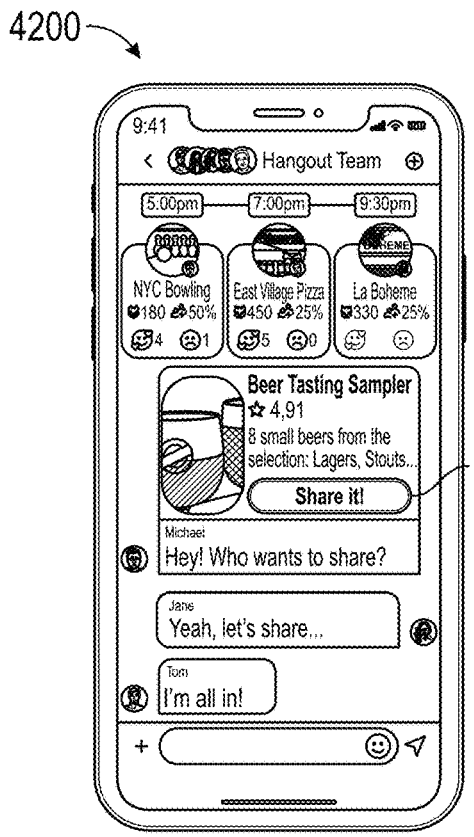
FIGS. 42A-42D illustrate user interfaces for reviewing prior reviews of individuals in the group for a certain merchant according to some embodiments.
Figure 42B:
Figure 42C:
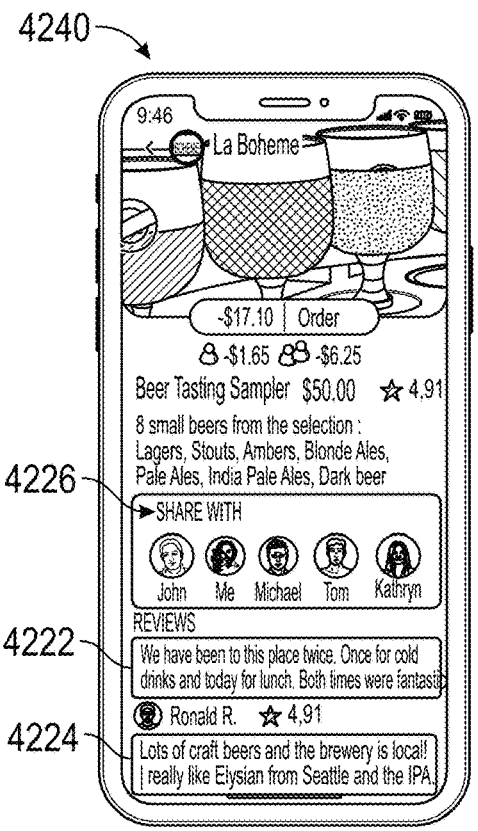
Figure 42D:
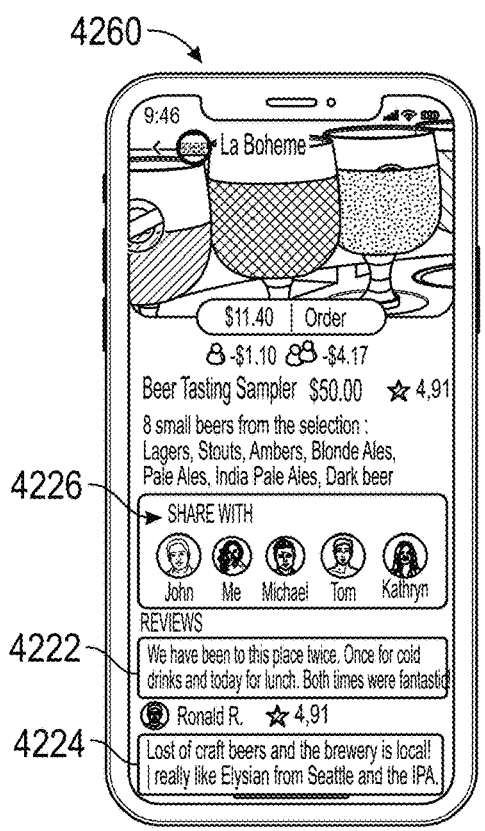
Figure 43A:
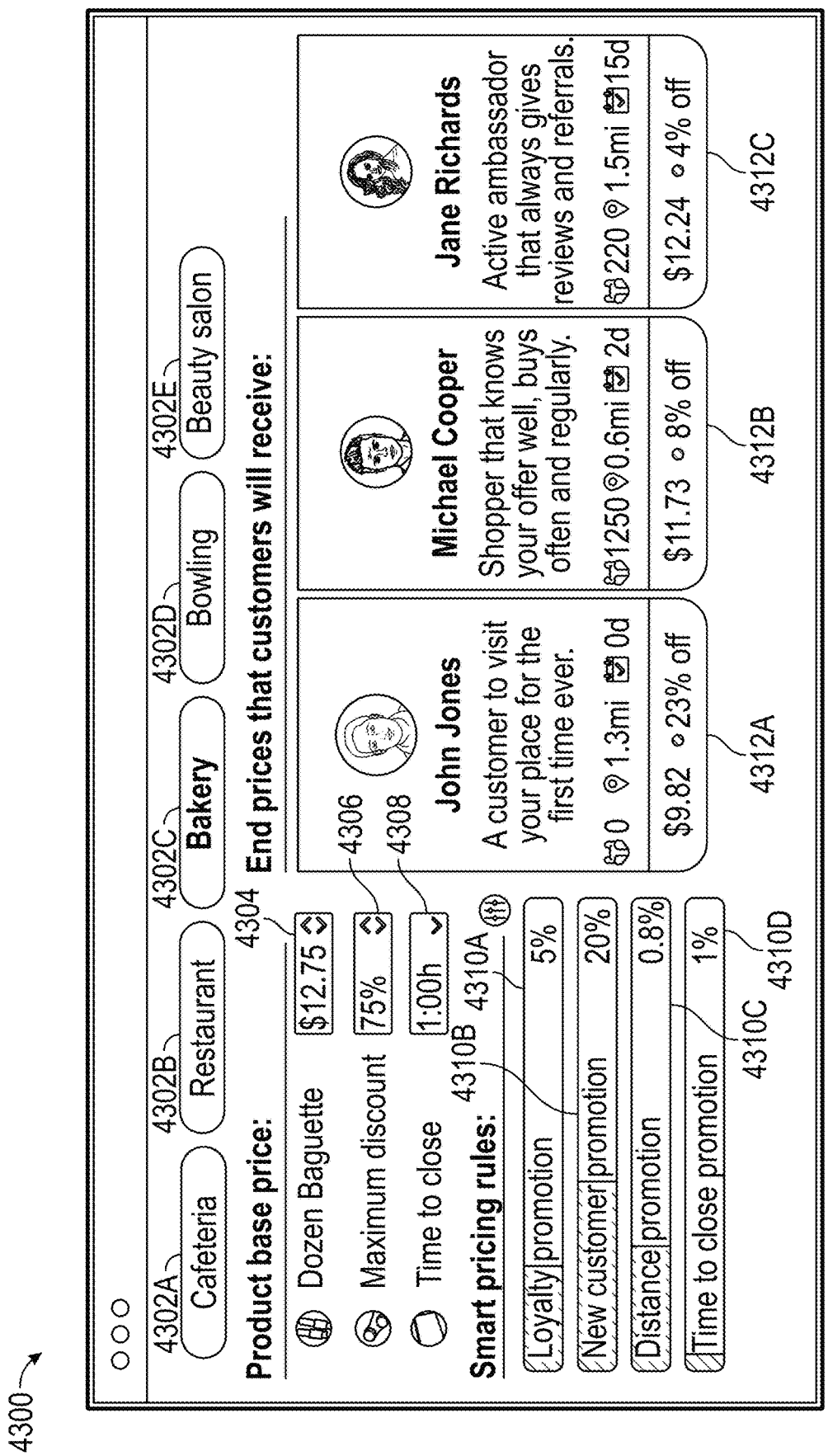
FIGS. 43A-43E illustrate user interfaces for setting merchant pricing conditions according to some embodiments.
Figure 43B:
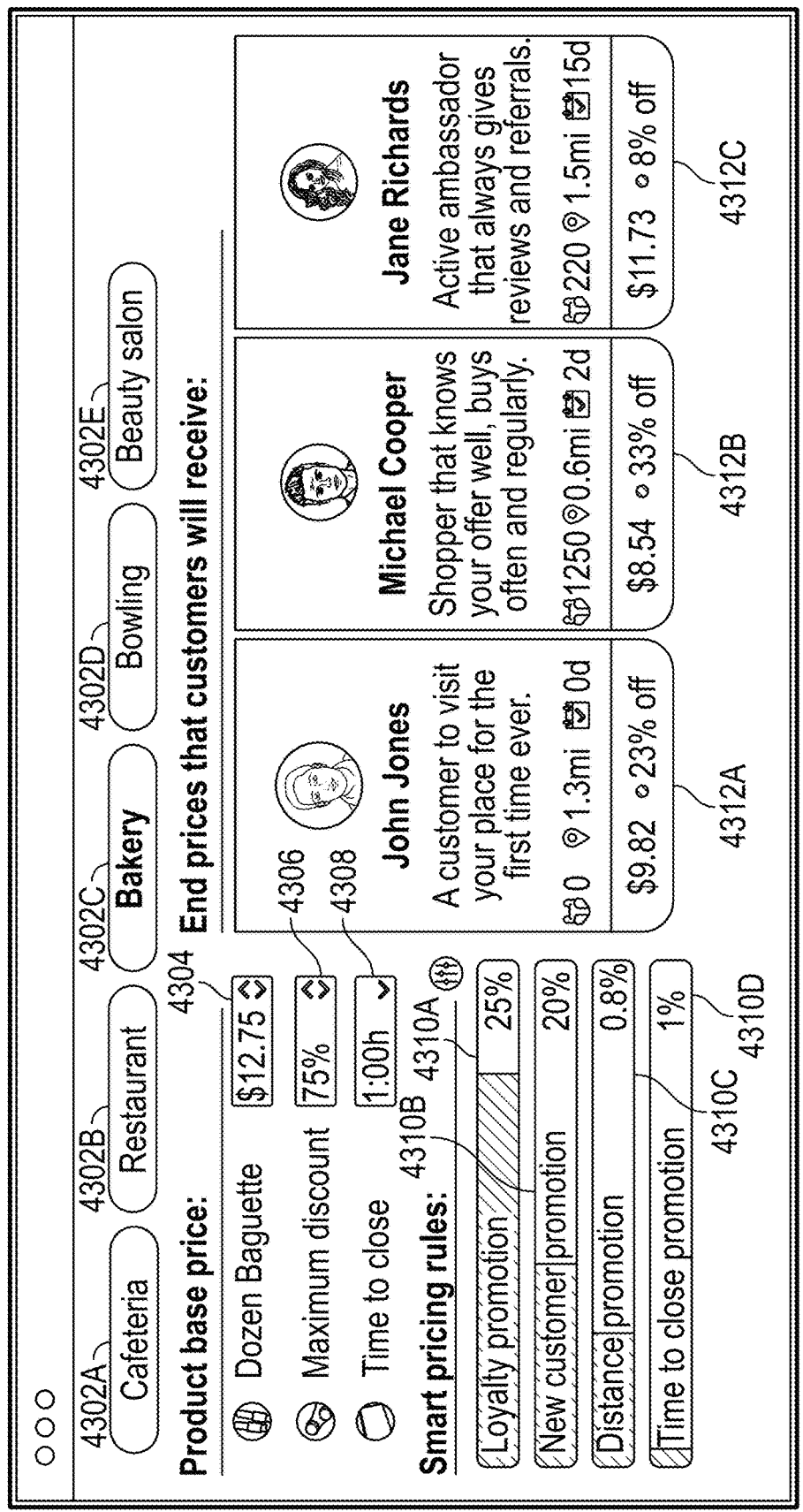
Figure 43C:
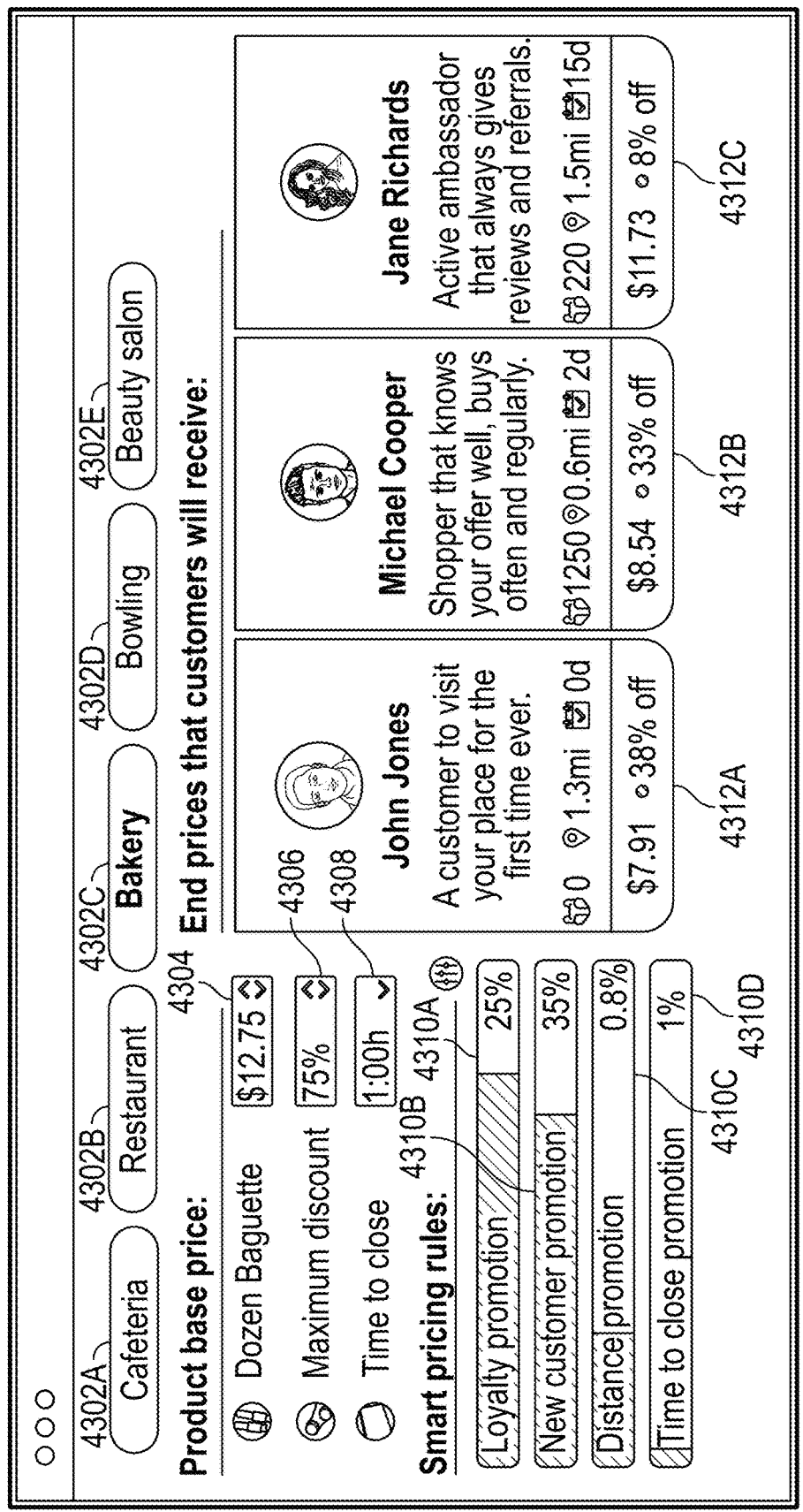
Figure 43D:
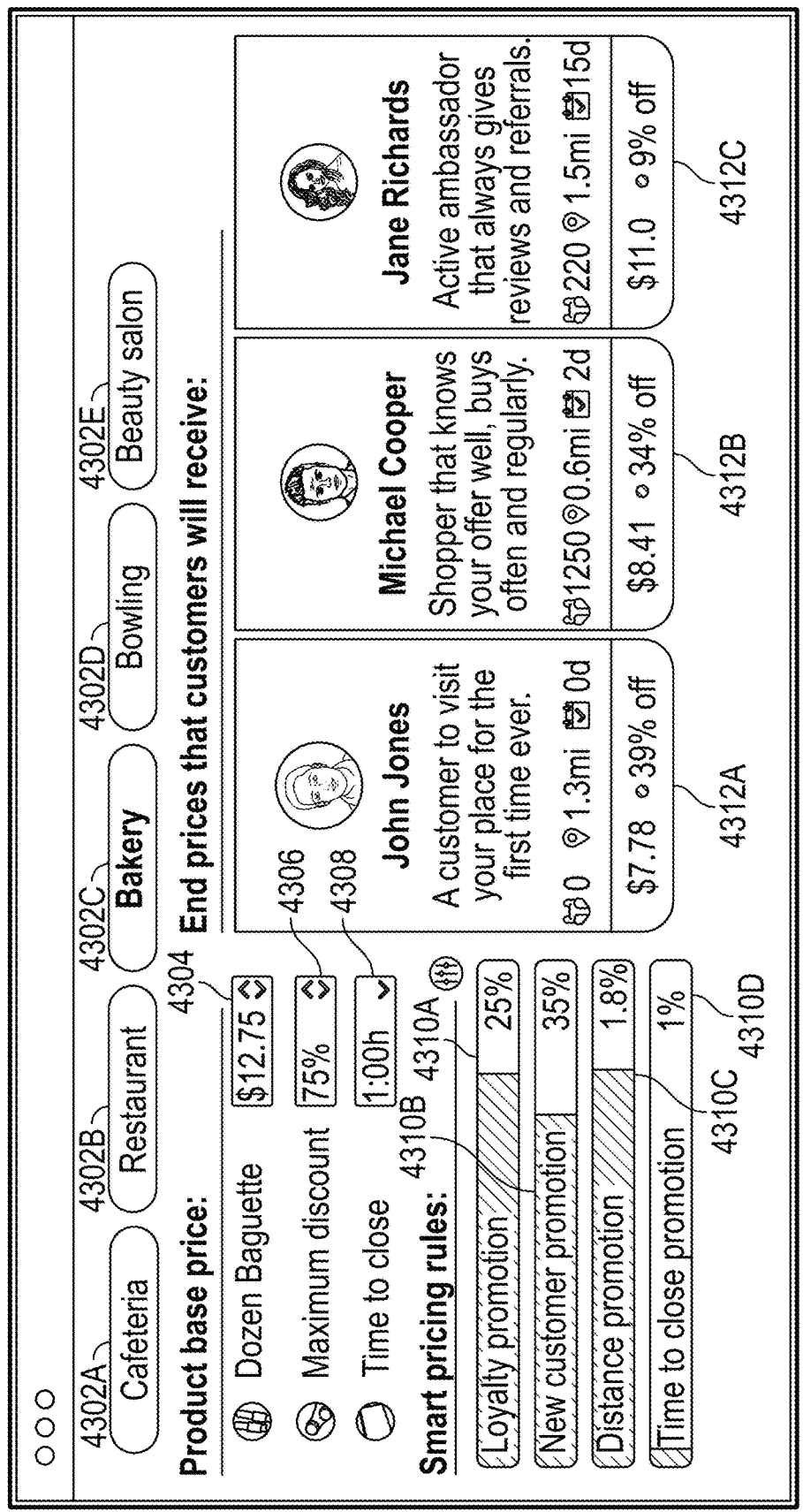
Figure 43E:
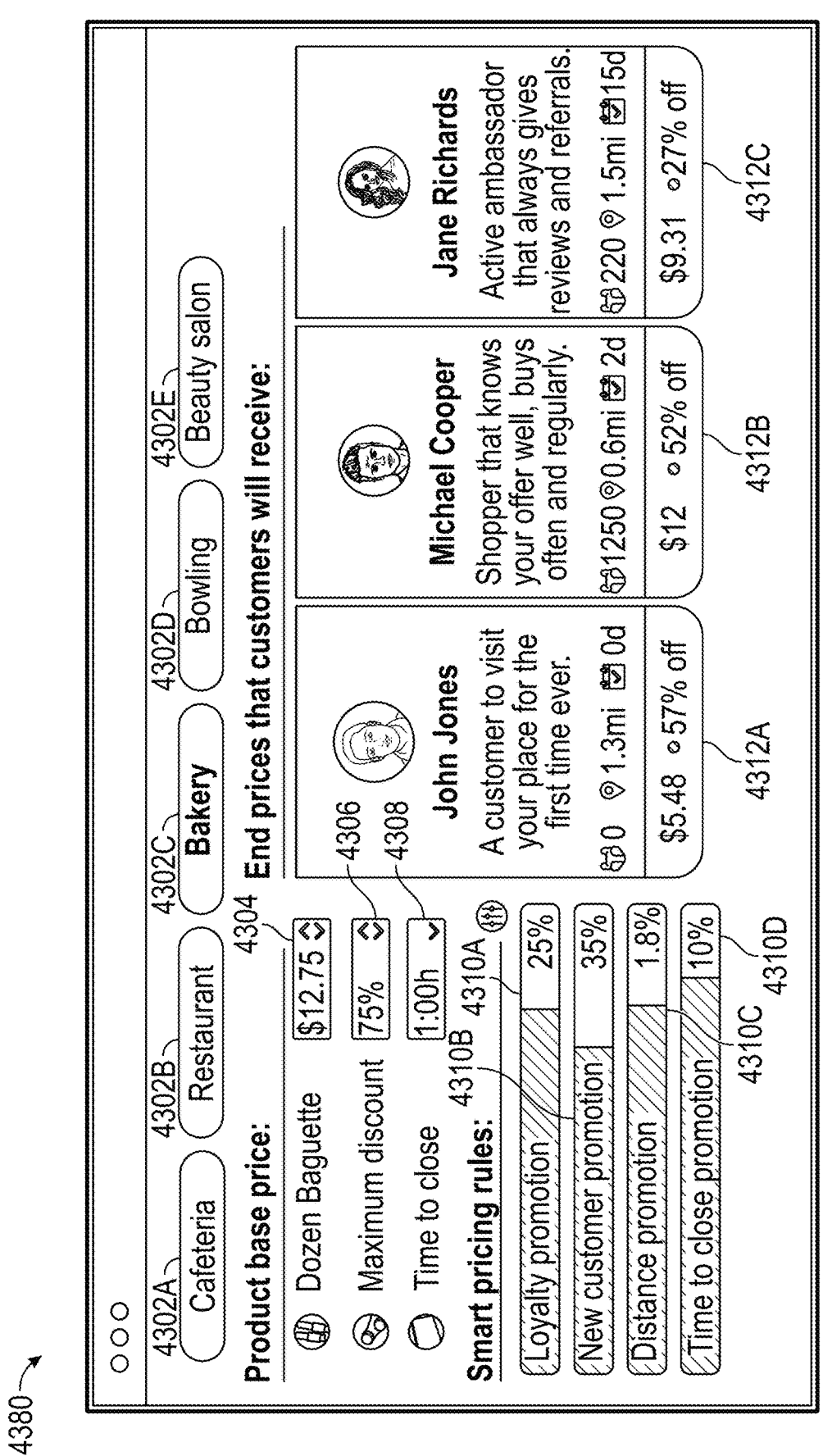

FIGS. 41A-41C illustrate user interfaces 4100, 4120, 4140 for applying dynamic pricing based on newly added members to a group according to some embodiments. User interface 4100 illustrates a discount 4100 for Jane when she adds Robert Fox to the group. User interface 4120, 4140 illustrates additional discounts with Tom Smith an John Jones added to the group.

FIGS. 42A-42D illustrate user interfaces 4200, 4220, 4240, 4260 for reviewing prior reviews of individuals in the group for a certain merchant and sharing costs according to some embodiments. User interface 4200 includes a user selectable button 4200 that enables the group to share a certain merchant with other individuals. User interfaces 4220, 4240, 4260 illustrate sharing of the item and/or merchant with other individuals 4226, such as with John, Michael, Tom, and Kathryn. As more individuals accept the recommended product, the cost is reduced for the individual shopper, such as when one user accepts in user interface 4240 and when two users accept in user interface 4260.

FIGS. 43A-43E illustrate user interfaces 4300, 4320, 4340, 4360, 4380 for setting merchant pricing conditions according to some embodiments. The merchants can add a category for their store, such as categories 4302A, 4302B, 4302C, 4302D, 4302E. The merchants can add certain products and their base price 4304. The merchants can set other characteristics, such as a maximum available discount 4306 and/or a time to close the discount 4308.

In some embodiments, the merchant can adjust their smart pricing rules, such as loyalty rules 4310A, new customer promotions 4310B, distance promotions 4310C, and/or time to close promotions 4310D. The database system can display certain customers to the merchant, showing what discounts these shoppers would receive. As shown in user interfaces 4300, 4320, 4340, 4360, 4380, as the merchant adjusts their smart pricing rules, the database system can display the adjusted discounts for each shopper.

Figure 44:
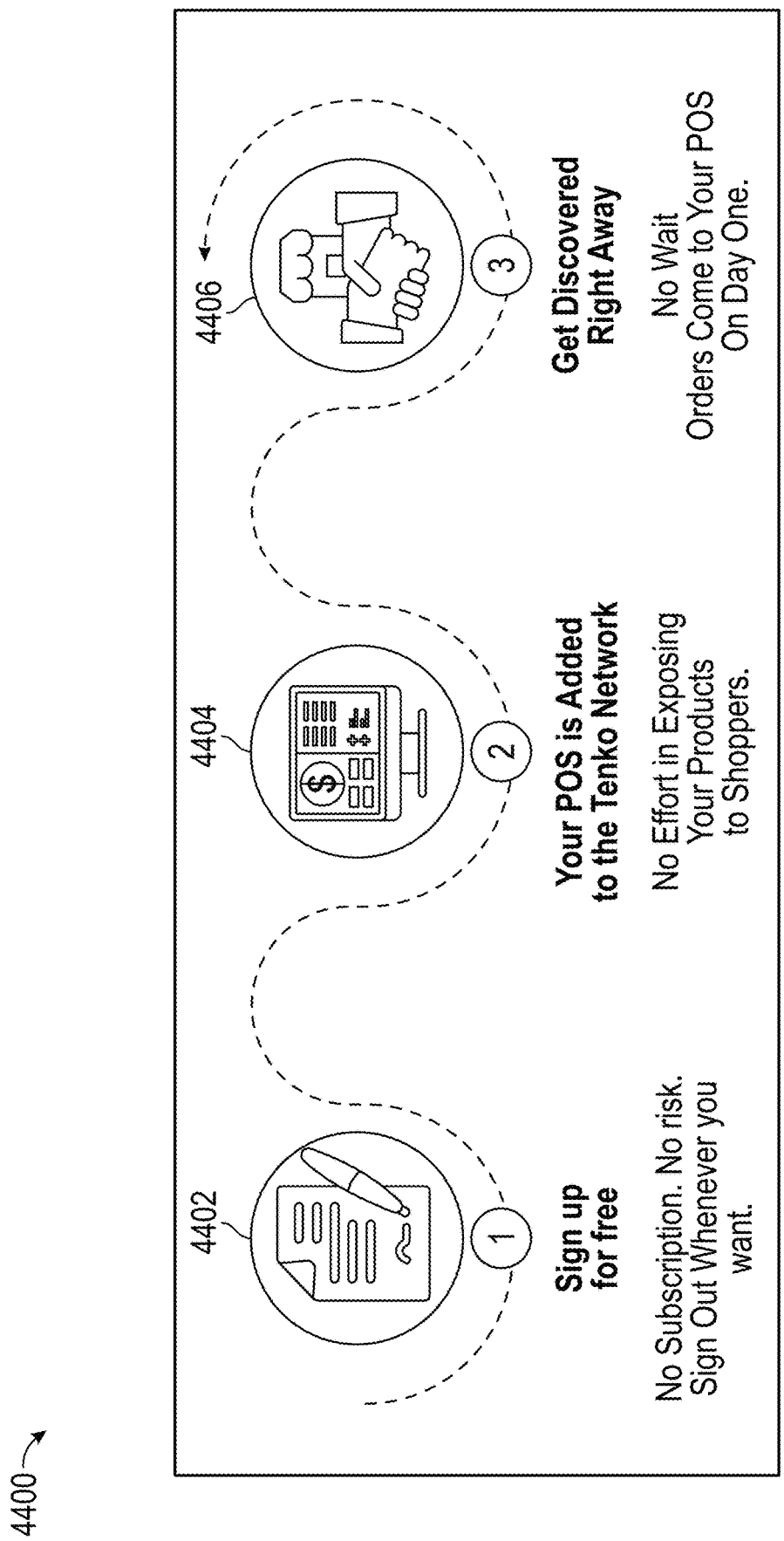
FIG. 44 illustrates a flow diagram for merchants joining the database system according to some embodiments.

FIG. 44 illustrates a flow diagram 4400 for merchants joining the database system according to some embodiments. The merchants can sign up with the database system 4402 and add their point of sale devices such that the database system can access pricing and initiate payment for individuals or groups of shoppers 4404. Once the merchant completes the on-boarding process, the database system can enable the merchant to be discovered by shoppers right away 4406.

Additional Embodiments

In some embodiments, the term voucher or event notifications is used, rules or triggers are used, coupon or event notification content is used, promotion to event notification content value is used, discount or event notification content value adjustment is used, database query or user query, or shopper, consumer, or user is used to describe certain embodiments. However, it is understood that the embodiments disclosed herein apply to either of these terms.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate embodiments are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for providing dynamic pricing based on information from a merchant's point of sale device, comprising:

a memory; and one or more servers configured to:

connect to a plurality of Point of Sale (POS) merchant devices of a plurality of merchants via an Application Programming Interface (API) specific to the corresponding merchant;

connect to a plurality of computing devices of a plurality of users;

enable the plurality of merchants to input one or more criteria to provide dynamic pricing specific to users;

receive merchant related information from a corresponding POS device, wherein at least one of the one or more criteria relate to the received merchant related information, the merchant related information including a current inventory level indicating an amount of a product stored by the merchant;

determine an adjustment to a price for the product associated with the merchant by applying the one or more criteria and the current inventory level indicating the amount of the product stored by the merchant to an artificial intelligence machine learning model, the current inventory level on hand being associated with the inventory level at the time the adjustment to the price is determined, the artificial intelligence machine learning model configured to determine adjustments to prices based on pricing criteria and current inventory levels, the artificial intelligence machine learning model trained to generate a higher adjustment to the price in response to a higher current inventory level; and provide the adjustment of the price to a first computing device.

2. The system of claim 1, wherein the one or more servers are configured to display a map to individual merchants of a surrounding location to the corresponding merchant and enable merchant to specify one or more geographical areas for applying the adjustment to the price.

3. The system of claim 1, wherein to determine the adjustment to the price comprises applying the merchant related information and the one or more criteria to the artificial intelligence machine learning model and determining the adjustment to the price based on the output of the artificial intelligence machine learning model.

4. The system of claim 3, wherein the one or more servers are configured to train the artificial intelligence machine learning model using historical merchant related information, historical merchant criteria, and historical conversion rates.

5. The system of claim 1, wherein the merchant related information comprises at least one of: a number of sales for the product over a time interval.

6. The system of claim 1, wherein to determine the adjustment is further based on computing device data received from the plurality of computing devices.

7. The system of claim 6, wherein the adjustment is specific to each user based on the received computing device data.

8. The system of claim 6, wherein the received computing device data comprises Global Positioning System (GPS) data of the corresponding computing device.

9. The system of claim 6, wherein the received computing device data comprises loyalty points.

10. The system of claim 9, wherein the loyalty points are specific to individual users, wherein loyalty points are accumulated based on at least one of: past purchases with the corresponding merchant, referrals to the corresponding merchant, or reviews written for the corresponding merchant.

11. The system of claim 6, wherein the received computing device data comprises user product search history or distance to a corresponding merchant.

12. The system of claim 1, wherein the merchant related information including historical price adjustments provided to a first consumer and historical purchases of a product or service with the merchant by the first consumer, wherein to determine the adjustment is further based on based on a historical conversion rate for the first consumer, the historical conversation rate for the first consumer being based on the historical purchases of the product or service with the merchant by the first consumer in response to historical price adjustments provided to the first consumer.

13. A method comprising:
connecting to a plurality of Point of Sale (POS) merchant devices of a plurality of merchants via an Application Programming Interface (API) specific to the corresponding merchant;
connecting to a plurality of computing devices of a plurality of users;
enabling the plurality of merchants to input one or more criteria to provide dynamic pricing specific to users;
receiving merchant related information from a corresponding POS device, wherein at least one of the one or more criteria relate to the received merchant related information, the merchant related information including a current inventory level indicating an amount of a product stored by the merchant;
determine an adjustment to a price for the product associated with the merchant by applying the one or more criteria and the current inventory level indicating the amount of the product stored by the merchant to an artificial intelligence machine learning model, the current inventory level on hand being associated with the inventory level at the time the adjustment to the price is determined, the artificial intelligence machine learning model configured to determine adjustments to prices based on pricing criteria and current inventory levels, the artificial intelligence machine learning model trained to generate a higher adjustment to the price in response to a higher current inventory level; and
providing the adjustment of the price to a first computing device.

14. The method of claim 13, wherein the one or more criteria comprises specifying a time period.

15. The method of claim 14, wherein the time period comprises at least one of: peak hours, weekends, or holidays.

16. The method of claim 13, wherein the one or more criteria comprises a distance or proximity of a user's location to the corresponding merchant.

17. The method of claim 13, wherein the one or more criteria comprises a distance or proximity of a user's searched location to the corresponding merchant.

18. The method of claim 13, wherein the method further comprises enabling a plurality of users to join a group, wherein to determine the adjustment to the price for the product is applied to the group.

19. The method of claim 18, wherein the adjustment to the price for the product is also based on a number of users in the group.

20. The method of claim 18, wherein the method further comprises further adjusting the price for individual users in the group based on characteristics of individual user profiles.

21. A non-transitory computer storage medium storing computer-executable instructions that, when executed by a processor of a computing system, cause the processor to perform operations comprising:
connecting to a plurality of Point of Sale (POS) merchant devices of a plurality of merchants via an Application Programming Interface (API) specific to the corresponding merchant;
connecting to a plurality of computing devices of a plurality of users;
enabling the plurality of merchants to input one or more criteria to provide dynamic pricing specific to users;
receiving merchant related information from a corresponding POS device, wherein at least one of the one or more criteria relate to the received merchant related information, the merchant related information including a current inventory level indicating an amount of a product stored by the merchant;
determine an adjustment to a price for the product associated with the merchant by applying the one or more criteria and the current inventory level indicating the amount of the product stored by the merchant to an artificial intelligence machine learning model, the current inventory level on hand being associated with the inventory level at the time the adjustment to the price is determined, the artificial intelligence machine learning model configured to determine adjustments to prices based on pricing criteria and current inventory levels, the artificial intelligence machine learning model trained to generate a higher adjustment to the price in response to a higher current inventory level; and
providing the adjustment of the price to a first computing device.

22. The non-transitory computer storage medium of claim 21, wherein to determine the adjustment is further based on a current date or time.

23. The non-transitory computer storage medium of claim 21, wherein to determine the adjustment is further based on external data from a database external to the merchants and users.

24. The non-transitory computer storage medium of claim 23, wherein the external data comprises weather data for an area surrounding the corresponding merchant.

25. The non-transitory computer storage medium of claim 23, wherein the external data comprises traffic data for an area surrounding the corresponding merchant.

26. The non-transitory computer storage medium of claim 23, wherein the external data comprises traffic data for an area between the user and the merchant.

27. The non-transitory computer storage medium of claim 21, wherein the one or more processors are further configured to provide merchants with a projected assessment for the adjustment to the price.

* * * * *